US012581309B2

(12) United States Patent
Lei et al.

(10) Patent No.: US 12,581,309 B2
(45) Date of Patent: Mar. 17, 2026

(54) SLICE SERVICE VERIFICATION METHOD AND APPARATUS

(71) Applicant: HUAWEI TECHNOLOGIES CO., LTD., Shenzhen (CN)

(72) Inventors: Zhongding Lei, Singapore (SG); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 565 days.

(21) Appl. No.: 18/063,525

(22) Filed: Dec. 8, 2022

(65) Prior Publication Data

US 2023/0102604 A1      Mar. 30, 2023

Related U.S. Application Data

(63) Continuation of application No. PCT/CN2021/098545, filed on Jun. 7, 2021.

(30) Foreign Application Priority Data

Jun. 10, 2020      (CN) .......................... 202010525590.5

(51) Int. Cl.
*H04W 12/06*          (2021.01)
*H04W 12/106*        (2021.01)
*H04W 12/30*          (2021.01)

(52) U.S. Cl.
CPC ........... *H04W 12/35* (2021.01); *H04W 12/06* (2013.01); *H04W 12/106* (2021.01)

(58) Field of Classification Search
CPC .............................. H04W 12/06; H04W 12/35
See application file for complete search history.

(56) References Cited

U.S. PATENT DOCUMENTS

| | | | |
|---|---|---|---|
| 2008/0293409 A1 | 11/2008 | Gillot et al. | |
| 2017/0012956 A1* | 1/2017 | Lee ..................... | H04L 63/0428 |
| 2018/0007552 A1 | 1/2018 | Bae et al. | |
| 2018/0343249 A1* | 11/2018 | Hahn .................. | H04L 63/0869 |

(Continued)

FOREIGN PATENT DOCUMENTS

| | | |
|---|---|---|
| CN | 108012267 A | 5/2018 |
| CN | 109104726 A | 12/2018 |
| CN | 110035433 A | 7/2019 |

(Continued)

OTHER PUBLICATIONS

LG Electronics, "Clarification on Slice for SMS," 3GPP TSG-WG SA2 Meeting #138E, S2-2002812, Elbonia, Apr. 20-24, 2020, 17 pages.

(Continued)

*Primary Examiner* — Michael T Vu
(74) *Attorney, Agent, or Firm* — Fish & Richardson P.C.

(57) ABSTRACT

Implementations of this application disclose slice service verification methods and apparatuses. In an implementation, a method comprises: receiving a first message sent by a terminal device, wherein the first message comprises an identifier of a first network slice and a first message authentication code, verifying the first message authentication code based on a second network identifier, and sending the second network identifier to an authentication server in response to the verifying the first message authentication code being successful.

10 Claims, 16 Drawing Sheets

(56)                    References Cited

U.S. PATENT DOCUMENTS

2019/0166493  A1      5/2019   You et al.

FOREIGN PATENT DOCUMENTS

| CN | 111641949 A | 9/2020 |
| WO | 2020034106 A1 | 2/2020 |
| WO | 2021026927 A1 | 2/2021 |

OTHER PUBLICATIONS

3GPP TS 33.220 V16.0.0, "3rd Generation Partnership Project; Technical Specification Group Services and System Aspects; Generic Authentication Architecture (GAA); Generic Bootstrapping Architecture (GBA) (Release 16)," Sep. 2019, 93 pages.
3GPP TR 33.813 V0.6.0, "3rd Generation Partnership Project; Technical Specification Group Services and System Aspects; Security Aspects; Study on Security Aspects of Enhanced Network Slicing (Release 16)," Aug. 2019, 34 pages.
Office Action in Chinese Appln. No. 202010525590.5, dated Dec. 29, 2022, 7 pages.
International Search Report and Written Opinion in International Appln. No. PCT/CN2021/098545, mailed on Sep. 7, 2021, 15 pages (with English translation).

* cited by examiner

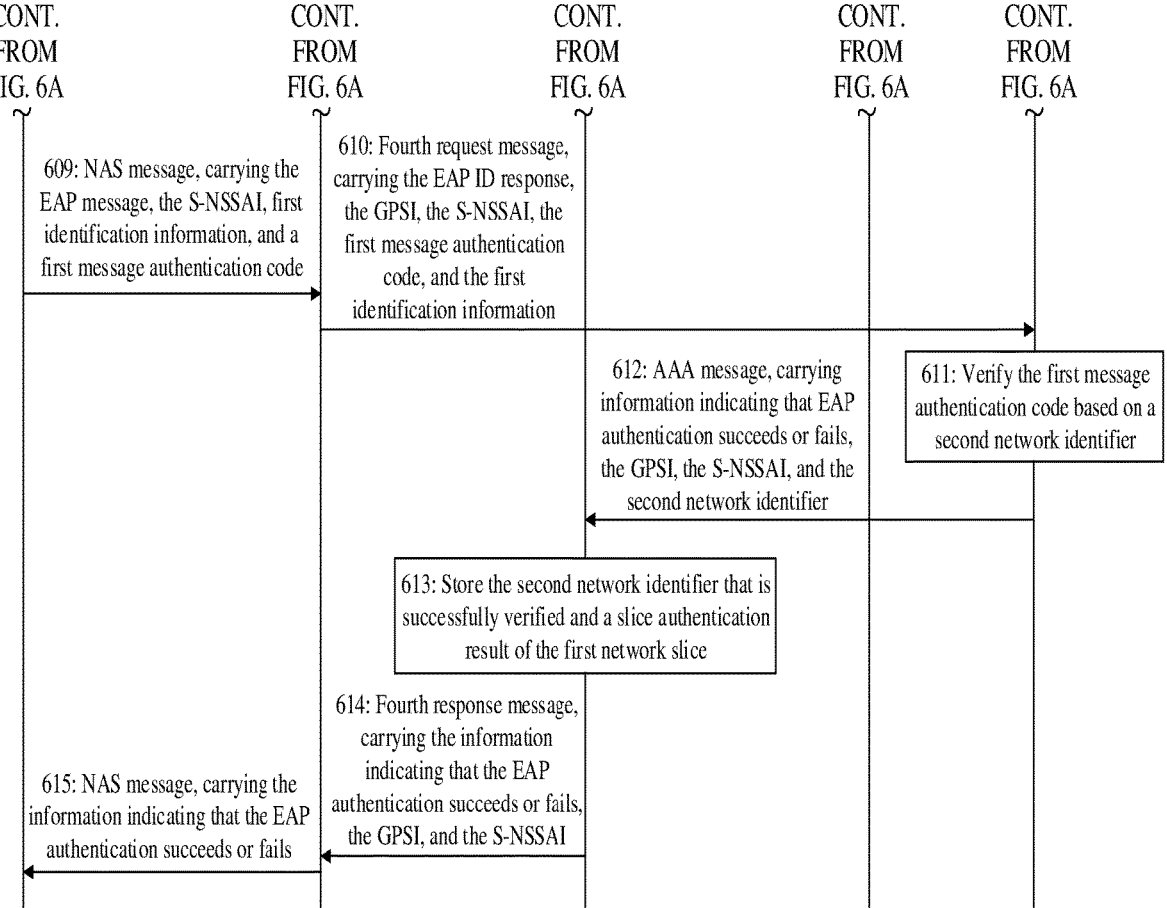

CONT.
FROM
FIG. 6A

CONT.
FROM
FIG. 6A

CONT.
FROM
FIG. 6A

CONT.
FROM
FIG. 6A

CONT.
FROM
FIG. 6A

609: NAS message, carrying the EAP message, the S-NSSAI, first identification information, and a first message authentication code 610: Fourth request message, carrying the EAP ID response, the GPSI, the S-NSSAI, the first message authentication code, and the first identification information 611: Verify the first message authentication code based on a second network identifier 612: AAA message, carrying information indicating that EAP authentication succeeds or fails, the GPSI, the S-NSSAI, and the second network identifier 613: Store the second network identifier that is successfully verified and a slice authentication result of the first network slice 614: Fourth response message, carrying the information indicating that the EAP authentication succeeds or fails, the GPSI, and the S-NSSAI 615: NAS message, carrying the information indicating that the EAP authentication succeeds or fails

FIG. 6B

SLICE SERVICE VERIFICATION METHOD AND APPARATUS

CROSS-REFERENCE TO RELATED APPLICATIONS

This application is a continuation of International Application No. PCT/CN2021/098545 filed on Jun. 7, 2021, which claims priority to Chinese Patent Application No. 202010525590.5, filed on Jun. 10, 2020. The disclosures of the aforementioned applications are hereby incorporated by reference in their entireties.

TECHNICAL FIELD

This application relates to the communications field, and in particular, to a slice service verification method and apparatus.

BACKGROUND

Network slicing is an on-demand networking mode, and allows operators to create a plurality of end-to-end virtual networks on a common infrastructure. Each network slice includes a radio access network, a transport network, and a core network, and the network slices are logically isolated from each other in terms of the radio access network, the transport network, and the core network, to adapt to various types of applications.

A terminal device accesses a serving network, and may use a slice service of a network slice provided by the serving network. For a roaming scenario in a mobile network, to be specific, when a terminal device roams to a visited network, the terminal device may access the visited network, and may further use a slice service of a network slice provided by the visited network. If the terminal device uses the slice service provided by the visited network, the visited network may charge a home network of the terminal device for the slice service.

However, the home network cannot determine whether the visited network provides the slice service for the terminal. As a result, the visited network may falsely report to the home network that the visited network provides the slice service for the terminal device or that the visited network provides the terminal device with a slice service of a network slice having higher performance, and therefore charges the home network a higher service fee. This causes poor network security.

SUMMARY

Embodiments of this application provide a slice service verification method and apparatus, to improve network security.

A first aspect of embodiments of this application provides a slice service verification method, including:

A slice service verification function entity receives a first message sent by a terminal device, where the first message carries an identifier of a first network slice and a first message authentication code, and the first message authentication code is calculated based on a first network identifier. Then, the slice service verification function entity verifies the first message authentication code based on a second network identifier. The slice service verification function entity sends the second network identifier to an authentication server when the verification succeeds.

In this embodiment, the slice service verification function entity verifies, based on the second network identifier, the first message authentication code sent by the terminal device. When the verification succeeds, the slice service verification function entity may determine that a slice service of the first network slice is provided by a network corresponding to the second network identifier for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in a slice authentication process and/or a use process of the network slice.

In a possible implementation, that the slice service verification function entity verifies the first message authentication code based on a second network identifier includes: The slice service verification function entity obtains a second integrity key $K_{NSSAAF}$. Then, the slice service verification function entity generates a second message authentication code based on the second integrity key $K_{NSSAAF}$ and the second network identifier, and matches the first message authentication code with the second message authentication code to obtain a verification result.

In this implementation, because the first message authentication code is obtained after integrity protection is performed on the first network identifier, the slice service verification function entity generates the second message authentication code by using the second integrity key $K_{NSSAAF}$ and the second network identifier, and compares the received first message authentication code with the second message authentication code, to verify the first message authentication code. This provides a specific verification manner.

In another possible implementation, that the slice service verification function entity generates a second message authentication code based on the second integrity key $K_{NSSAAF}$ and the second network identifier includes: The slice service verification function entity obtains the second message authentication code based on the second integrity key $K_{NSSAAF}$, the identifier of the first network slice, and the second network identifier.

In this implementation, in a process of generating the first message authentication code, the terminal device further uses the identifier of the first network slice as a parameter for generating the first message authentication code. In this way, when generating the first message authentication code, the slice service verification function entity needs to use the received identifier of the first network slice as a parameter for generating the first message authentication code. This helps verify the first message authentication code depending on whether the network corresponding to the second network identifier provides the slice service of the first network slice for the terminal device.

In another possible implementation, the slice service verification function entity is a network slice-specific authentication and authorization function (network slice-specific authentication and authorization function, NSSAAF) entity. That the slice service verification function entity obtains a second integrity key $K_{NSSAAF}$ includes: The slice service verification function entity receives the second integrity key $K_{NSSAAF}$ sent by an authentication server function (authentication server function, AUSF) entity, where the second integrity key $K_{NSSAAF}$ is generated by the AUSF entity based on a first intermediate key $K_{AUSF}$.

In this implementation, the terminal device and the AUSF entity separately generate the first intermediate key $K_{AUSF}$ after primary authentication of the terminal device, and the second integrity key $K_{NSSAAF}$ is derived by the AUSF entity from the first intermediate key $K_{AUSF}$. In this way, the first message authentication code can be verified only when the second integrity key $K_{NSSAAF}$ is available. In a roaming scenario, only a related network element entity in the home network of the terminal device has the second integrity key $K_{NSSAAF}$, to be specific, the visited network cannot verify or tamper with the first message authentication code, to prevent the visited network from deceiving the home network in the slice authentication process and/or the use process of the network slice.

In another possible implementation, that the slice service verification function entity verifies the first message authentication code based on a second network identifier includes: The slice service verification function entity generates a second message authentication code based on a first intermediate key $K_{AUSF}$ and the second network identifier. Then, the slice service verification function entity matches the first message authentication code with the second message authentication code to obtain a verification result.

In this implementation, the terminal device and an AUSF entity separately generate the first intermediate key $K_{AUSF}$ after primary authentication of the terminal device. In this way, the first message authentication code can be verified only when the first intermediate key $K_{AUSF}$ is available. In a roaming scenario, only a related network element entity in the home network of the terminal device has the first intermediate key $K_{AUSF}$, to be specific, the visited network cannot verify or tamper with the first message authentication code, to prevent the visited network from deceiving the home network in the slice authentication process and/or the use process of the network slice.

In another possible implementation, the first message further includes first identification information, and the second network identifier is determined by the slice service verification function entity based on the first identification information. The first identification information includes an identifier of a first network or an identifier of a function entity in the first network, and the first network is a network currently accessed by the terminal device.

This implementation provides a plurality of forms of identification information of the first network carried in the first message.

In another possible implementation, the identifier of the first network includes:

an identity (serving network identity, SN-ID) of the first network, a public land mobile network (public land mobile network, PLMN) identifier corresponding to the first network, a name (serving network name, SNN) of the first network, or a network identifier (network identifier, NID) of the first network; and
the identifier of the function entity in the first network includes:

an identifier of an access and mobility management function (access and mobility management function, AMF) entity, a name of the AMF entity, or a globally unique identifier of the AMF entity, where the AMF entity is a function entity that is in the first network and that initiates slice authentication of the first network slice for the terminal device.

This implementation provides a plurality of forms of identifiers representing the first network and a plurality of forms of identifiers representing the function entity in the first network.

A second aspect of embodiments of this application provides a slice service verification method, including:

A terminal device generates a first message authentication code based on a first network identifier. Then, the terminal device sends a first message to a slice service verification function entity, where the first message carries an identifier of a first network slice and the first message authentication code.

In this embodiment, the terminal device generates the first message authentication code based on the first network identifier, and sends the first message including the first message authentication code to the slice service verification function entity, so that the slice service verification function entity verifies the first message authentication code, to avoid or prevent a behavior that a visited network currently accessed by the terminal device deceives a home network of the terminal device. This improves network security.

In a possible implementation, before that a terminal device generates a first message authentication code based on a first network identifier, the method further includes: The terminal device generates a first intermediate key $K_{AUSF}$ based on a first cipher key (cypher key, CK) and a first integrity key (integrity key, IK). Then, the terminal device generates a second integrity key $K_{NSSAAF}$ based on the first intermediate key $K_{AUSF}$. That a terminal device generates a first message authentication code based on a first network identifier includes:

The terminal device generates the first message authentication code based on the first network identifier and the second integrity key $K_{NSSAAF}$.

This possible implementation provides a manner of generating the second integrity key $K_{NSSAAF}$ by the terminal device. The second integrity key $K_{NSSAAF}$ is generated by using the first cipher key CK and the first integrity key IK that are generated after primary authentication of the terminal device.

In another possible implementation, before that a terminal device generates a first message authentication code based on a first network identifier, the method further includes: The terminal device generates a second cipher key CK' and a third integrity key IK' based on a first cipher key CK and a first integrity key IK. The terminal device generates a first intermediate key $K_{AUSF}$ based on the second cipher key CK' and the third integrity key IK'. The terminal device generates a second integrity key $K_{NSSAAF}$ based on the first intermediate key $K_{AUSF}$. That a terminal device generates a first message authentication code based on a first network identifier includes:

The terminal device generates the first message authentication code based on the first network identifier and the second integrity key $K_{NSSAAF}$.

This possible implementation provides another manner of generating the second integrity key $K_{NSSAAF}$ by the terminal device.

In another possible implementation, before that a terminal device generates a first message authentication code based on a first network identifier, the method further includes: The terminal device generates a first intermediate key $K_{AUSF}$ based on a first cipher key CK and a first integrity key IK. That a terminal device generates a first message authentication code based on a first network identifier includes: The terminal device generates the first message authentication code based on the first network identifier and the first intermediate key $K_{AUSF}$.

In this possible implementation, the terminal device and an AUSF entity separately generate the first intermediate key $K_{AUSF}$ after primary authentication of the terminal device, and the terminal device generates the first message authentication code by using the first intermediate key $K_{AUSF}$. In a roaming scenario, only a related network element entity in the home network of the terminal device has the first intermediate key $K_{AUSF}$, to be specific, the visited network cannot verify or tamper with the first message authentication code, to prevent the visited network from deceiving the home network in a slice authentication process and/or a use process of the network slice.

In another possible implementation, that the terminal device generates the first message authentication code based on the first network identifier and the second integrity key $K_{NSSAAF}$ includes: The terminal device generates the first message authentication code based on the second integrity key $K_{NSSAAF}$, the identifier of the first network slice, and the first network identifier.

In this possible implementation, the terminal device may further generate the first message authentication code with reference to the identifier of the first network slice, to help the slice service verification function entity verify, by using the first message authentication code, whether a first network corresponding to the first network identifier provides a slice service of the first network slice for the terminal device.

In another possible implementation, the first message further includes first identification information, and the first network identifier corresponds to the first identification information. The first identification information is an identifier of a first network or an identifier of a function entity in the first network, and the first network is a network currently accessed by the terminal device. This possible implementation provides identifier information carried in the first identification information.

In another possible implementation, the identifier of the first network includes:

an identity SN-ID of the first network, a PLMN identifier corresponding to the first network, a name SNN of the first network, or a network identifier NID of the first network; and the identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

This implementation provides a plurality of forms of identifiers representing the first network and a plurality of forms of identifiers representing the function entity in the first network.

A third aspect of embodiments of this application provides a slice service verification method, including:

An authentication server receives a second message sent by a terminal device, where the second message carries an identifier of a first network slice and a first message authentication code, and the first message authentication code is calculated based on a second network identifier. Then, the authentication server verifies the first message authentication code based on the second network identifier. When the verification succeeds, the authentication server determines that a slice service of the first network slice is provided by a network corresponding to the second network identifier for the terminal device.

In this possible implementation, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in a slice authentication process and/or a use process of the network slice.

In a possible implementation, that the authentication server verifies the first message authentication code based on the second network identifier includes: The authentication server verifies the first message authentication code based on a first credential and the second network identifier, where the first credential is for slice authentication between the terminal device and the authentication server for the first network slice.

This possible implementation provides a specific verification manner in which the authentication server verifies the first message authentication code. The terminal device side generates the first message authentication code by using the first credential, to improve security of the first message authentication code and prevent the first message authentication code from being tampered with in a transmission process. Correspondingly, the authentication server verifies the first message authentication code based on the first credential.

In another possible implementation, the first credential is a public key and a private key that are of the terminal device. That the authentication server verifies the first message authentication code based on a first credential and the second network identifier specifically includes: The authentication server decrypts the first message authentication code based on the public key of the terminal device to obtain a first digest. Then, the authentication server generates a second digest based on the second network identifier and a first preset key derivation function, and matches the first digest with the second digest to obtain a verification result.

In this possible implementation, the first credential is a public-private key pair of the terminal device. Correspondingly, the authentication server verifies the first message authentication code by using the public-private key pair of the terminal device.

In another possible implementation, the first credential is a first password. That the authentication server verifies the first message authentication code based on a first credential and the second network identifier specifically includes: The authentication server generates a second message authentication code based on the first password and the second network identifier, and matches the first message authentication code with the second message authentication code to obtain a verification result.

In this possible implementation, the first credential is the first password. Correspondingly, the authentication server verifies the first message authentication code by using the first password.

In another possible implementation, that the authentication server verifies the first message authentication code based on the second network identifier includes: generating a second message authentication code based on a first key Kemsk and the second network identifier, and matching the first message authentication code with the second message authentication code to obtain a verification result. The first key Kemsk is a key generated in an extensible authentication protocol (extensible authentication protocol, EAP) authentication procedure for the first network slice of the terminal device.

This possible implementation provides another manner in which the authentication server verifies the first message authentication code, where the verification is performed by using the key generated in the EAP authentication procedure for the first network slice.

In another possible implementation, the second message further carries first identification information, and the second network identifier is determined by the authentication server based on the first identification information. The first identification information includes an identifier of a first network or an identifier of a function entity in the first network, and the first network is a network currently accessed by the terminal device.

This implementation provides a plurality of forms of identification information of the first network carried in the first message.

In another possible implementation, the identifier of the first network includes:

an identity SN-ID of the first network, a public land mobile network PLMN identifier corresponding to the first network, a name SNN of the first network, or a network identifier NID of the first network; and
  the identifier of the function entity in the first network includes:
  an identifier of an AMF entity, a name of the AMF entity, or a globally unique identifier of the AMF entity, where the AMF entity is a function entity that is in the first network and that initiates slice authentication of the first network slice for the terminal device.

This implementation provides a plurality of forms of identifiers representing the first network and a plurality of forms of identifiers representing the function entity in the first network.

A fourth aspect of embodiments of this application provides a slice service verification method, including:

A terminal device generates a first message authentication code based on a first network identifier. Then, the terminal device sends a second message to an authentication server, where the second message carries an identifier of a first network slice and the first message authentication code.

In this embodiment, the terminal device generates the first message authentication code based on the first network identifier, and sends the second message including the first message authentication code to the authentication server, so that the authentication server verifies the first message authentication code, to avoid or prevent a behavior that a visited network currently accessed by the terminal device deceives a home network of the terminal device. This improves network security.

In a possible implementation, that a terminal device generates a first message authentication code based on a first network identifier includes: The terminal device generates the first message authentication code based on a first credential and the first network identifier, where the first credential is for slice authentication between the terminal device and the authentication server for the first network slice.

In this possible implementation, the terminal device generates the first message authentication code by using the first credential for the slice authentication between the terminal device and the authentication server for the first network slice, to implement integrity protection of the first message authentication code and prevent the first message authentication code from being tampered with in a transmission process.

In another possible implementation, the first credential is a public key and a private key that are of the terminal device. That the terminal device generates the first message authentication code based on a first credential and the first network identifier includes: The terminal device generates a first digest based on the first network identifier and a first preset key derivation function. Then, the terminal device encrypts the first digest based on the private key of the terminal device to obtain the first message authentication code.

In this possible implementation, the terminal device generates the first message authentication code by using the private key of the terminal device, to implement the integrity protection of the first message authentication code and prevent the first message authentication code from being tampered with in the transmission process.

In another possible implementation, the first credential is a first password. That the terminal device generates the first message authentication code based on a first credential and the first network identifier includes: The terminal device generates the first message authentication code based on the first password and the first network identifier.

In this possible implementation, the terminal device generates the first message authentication code by using the first password used in an EAP authentication procedure, to implement the integrity protection of the first message authentication code and prevent the first message authentication code from being tampered with in the transmission process.

In another possible implementation, that a terminal device generates a first message authentication code based on a first network identifier includes: The terminal device generates the first message authentication code based on a first key Kemsk and the first network identifier, where the first key Kemsk is a key generated in an EAP authentication procedure for the first network slice of the terminal device.

In this possible implementation, the terminal device generates the first message authentication code by using the key generated in the EAP authentication procedure for the first network slice of the terminal device, to implement integrity protection of the first message authentication code and prevent the first message authentication code from being tampered with in a transmission process.

In another possible implementation, the second message further carries first identification information, and the first identification information corresponds to the first network identifier. The first identification information includes an identifier of a first network or an identifier of a function entity in the first network, and the first network is a network currently accessed by the terminal device. This implementation provides a plurality of forms of identification information of the first network carried in the first message.

In another possible implementation, the identifier of the first network includes:

an identity SN-ID of the first network, a PLMN identifier corresponding to the first network, a name SNN of the first network, or a network identifier NID of the first network; and
  the identifier of the function entity in the first network includes:
  an identifier of an AMF entity, a name of the AMF entity, or a globally unique identifier of the AMF entity, where the AMF entity is a function entity that is in the first network and that initiates slice authentication of the first network slice for the terminal device.

This implementation provides a plurality of forms of identifiers representing the first network and a plurality of forms of identifiers representing the function entity in the first network.

A fifth aspect of embodiments of this application provides a slice service verification method, including:

An AMF entity updates a second key $K_{AMF}$ based on an identifier of a first network slice to obtain an updated second key $K_{AMF}$, where the first network slice is a network slice that is of a terminal device and whose slice authentication has succeeded, the updated second key $K_{AMF}$ is for transmission (including slice data transmission or signaling transmission) between the terminal device and a first network, and the first network is a network currently accessed by the terminal device.

In this embodiment, in a roaming scenario, a home network of the terminal device can determine, by using the updated first key $K_{AMF}$, that a slice service of the first network slice is provided by the first network for the terminal device. The slice service of the first network slice includes the slice data transmission or the signaling transmission. Therefore, the foregoing solution can avoid or prevent a behavior that a visited network currently accessed by the terminal device deceives the home network of the terminal device, to improve network security.

In a possible implementation, the method further includes: The AMF entity sends second indication information to the terminal device, where the second indication information indicates to update the second key $K_{AMF}$ for the first network slice. In this possible implementation, the AMF entity indicates, by using the second indication information, the terminal device to update the second key $K_{AMF}$.

In another possible implementation, that an AMF entity updates a second key $K_{AMF}$ based on an identifier of a first network slice includes: The AMF entity updates the second key $K_{AMF}$ based on the identifier of the first network slice and a third key, where the third key is a key generated or a credential used in an EAP authentication procedure for the first network slice of the terminal device.

In another possible implementation, the method further includes: The AMF entity receives a completion notification message sent by the terminal device, where the completion notification message is for notifying the AMF entity that the terminal device completes updating the second key $K_{AMF}$.

A sixth aspect of embodiments of this application provides a slice service verification method, including:

A terminal device receives second indication information sent by an AMF entity. Then, the terminal device updates a second key $K_{AMF}$ based on the second indication information, where an updated second key $K_{AMF}$ is for transmission (including slice data transmission or signaling transmission) between the terminal device and a first network, and the first network is a network currently accessed by the terminal device.

In a possible implementation, that the terminal device updates a second key $K_{AMF}$ based on the second indication information includes: The terminal device determines, based on the second indication information, to update the second key $K_{AMF}$ for a first network slice. Then, the terminal device updates the second key $K_{AMF}$ based on an identifier of the first network slice.

In another possible implementation, that the terminal device updates the second key $K_{AMF}$ based on an identifier of the first network slice includes: The terminal device updates the second key $K_{AMF}$ based on the identifier of the first network slice and a third key, where the third key is a key generated or a credential used in an EAP authentication procedure for the first network slice of the terminal device.

In another possible implementation, the method further includes: The terminal device sends a completion notification message to the AMF entity, where the completion notification message is for notifying the AMF entity that the terminal device completes updating the second key $K_{AMF}$.

A seventh aspect of embodiments of this application provides a slice service verification function entity, including:

a transceiver module, configured to receive a first message sent by a terminal device, where the first message carries an identifier of a first network slice and a first message authentication code, and the first message authentication code is calculated based on a first network identifier; and a processing module, configured to verify the first message authentication code based on a second network identifier.

The transceiver module is configured to send the second network identifier to an authentication server when the verification succeeds.

In a possible implementation, the processing module is specifically configured to:

obtain a second integrity key $K_{NSSAAF}$;

generate a second message authentication code based on the second integrity key $K_{NSSAAF}$ and the second network identifier; and match the first message authentication code with the second message authentication code to obtain a verification result.

In another possible implementation, the processing module is specifically configured to:

obtain the second message authentication code based on the second integrity key $K_{NSSAAF}$, the identifier of the first network slice, and the second network identifier.

In another possible implementation, the slice service verification function entity is an NSSAAF entity, and the processing module is specifically configured to:

receive the second integrity key $K_{NSSAAF}$ sent by an AUSF entity, where the second integrity key $K_{NSSAAF}$ is generated by the AUSF entity based on a first intermediate key $K_{AUSF}$.

In another possible implementation, the processing module is specifically configured to:

generate a second message authentication code based on a first intermediate key $K_{AUSF}$ and the second network identifier; and match the first message authentication code with the second message authentication code to obtain a verification result.

In another possible implementation, the first message further includes first identification information, and the second network identifier is determined by the slice service verification function entity based on the first identification information. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network; and the identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

An eighth aspect of embodiments of this application provides a terminal device, including:

a processing module, configured to generate a first message authentication code based on a first network identifier; and a transceiver module, configured to send a first message to a slice service verification function entity, where the first message carries an identifier of a first network slice and the first message authentication code.

In a possible implementation, the processing module is further configured to:

generate a first intermediate key $K_{AUSF}$ based on a first cipher key CK and a first integrity key IK; and generate a second integrity key $K_{NSSAAF}$ based on the first intermediate key $K_{AUSF}$.

The processing module is specifically configured to:

generate the first message authentication code based on the first network identifier and the second integrity key $K_{NSSAAF}$.

In another possible implementation, the processing module is further configured to:

generate a second cipher key CK' and a third integrity key IK' based on a first cipher key CK and a first integrity key IK;

generate a first intermediate key $K_{AUSF}$ based on the second cipher key CK' and the third integrity key IK'; and generate a second integrity key $K_{NSSAAF}$ based on the first intermediate key $K_{AUSF}$.

The processing module is specifically configured to:

generate the first message authentication code based on the first network identifier and the second integrity key $K_{NSSAAF}$.

In another possible implementation, the processing module is further configured to:

generate a first intermediate key $K_{AUSF}$ based on a first cipher key CK and a first integrity key IK.

The processing module is specifically configured to:

generate the first message authentication code based on the first network identifier and the first intermediate key $K_{AUSF}$.

In another possible implementation, the processing module is specifically configured to:

generate the first message authentication code based on the second integrity key $K_{NSSAAF}$, the identifier of the first network slice, and the first network identifier.

In another possible implementation, the first message further includes first identification information, and the first network identifier corresponds to the first identification information. The first identification information is an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network; and the identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

A ninth aspect of embodiments of this application provides an authentication server, including:

a transceiver module, configured to receive a second message sent by a terminal device, where the second message carries an identifier of a first network slice and a first message authentication code, and the first message authentication code is calculated based on a second network identifier; and a processing module, configured to verify the first message authentication code based on the second network identifier.

The transceiver module is configured to: when the verification succeeds, determine that a slice service of the first network slice is provided by a network corresponding to the second network identifier for the terminal device.

In a possible implementation, the processing module is specifically configured to:

verify the first message authentication code based on a first credential and the second network identifier, where the first credential is for slice authentication between the terminal device and the authentication server for the first network slice.

In another possible implementation, the first credential is a public key and a private key that are of the terminal device, and the processing module is specifically configured to:

decrypt the first message authentication code based on the public key of the terminal device to obtain a first digest;

generate a second digest based on the second network identifier and a first preset key derivation function; and match the first digest with the second digest to obtain a verification result.

In another possible implementation, the first credential is a first password, and the processing module is specifically configured to:

generate a second message authentication code based on the first password and the second network identifier; and match the first message authentication code with the second message authentication code to obtain a verification result.

In another possible implementation, the processing module is specifically configured to:

generate a second message authentication code based on a first key Kemsk and the second network identifier; and match the first message authentication code with the second message authentication code to obtain a verification result.

In another possible implementation, the second message further carries first identification information, and the second network identifier is determined by the authentication server based on the first identification information. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network; and the identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

A tenth aspect of embodiments of this application provides a terminal device, including:

a processing module, configured to generate a first message authentication code based on a first network identifier; and a transceiver module, configured to send a second message to an authentication server, where the second message carries an identifier of a first network slice and the first message authentication code.

In a possible implementation, the processing module is specifically configured to:

generate the first message authentication code based on a first credential and the first network identifier, where the first credential is for slice authentication between the terminal device and the authentication server for the first network slice.

In another possible implementation, the first credential is a public key and a private key that are of the terminal device, and the processing module is specifically configured to:

generate a first digest based on the first network identifier and a first preset key derivation function; and encrypt the first digest based on the private key of the terminal device to obtain the first message authentication code.

In another possible implementation, the first credential is a first password, and the processing module is specifically configured to:

generate the first message authentication code based on the first password and the first network identifier.

In another possible implementation, the processing module is specifically configured to:

generate the first message authentication code based on a first key Kemsk and the first network identifier, where the first key Kemsk is a key generated in an EAP authentication procedure for the first network slice of the terminal device.

In another possible implementation, the second message further carries first identification information, and the first identification information corresponds to the first network identifier. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network; and the identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

An eleventh aspect of embodiments of this application provides an AMF entity, including:

a processing module, configured to update a second key $K_{AMF}$ based on an identifier of a first network slice to obtain an updated second key $K_{AMF}$, where the first network slice is a network slice that is of a terminal device and whose slice authentication has succeeded, the updated second key $K_{AMF}$ is for transmission between the terminal device and a first network, and the first network is a network currently accessed by the terminal device.

In a possible implementation, the AMF entity further includes a transceiver module.

The transceiver module is configured to send second indication information to the terminal device, where the second indication information indicates to update the second key $K_{AMF}$ for the first network slice.

In another possible implementation, the processing module is specifically configured to:

update the second key $K_{AMF}$ based on the identifier of the first network slice and a third key, where the third key is a key generated or a credential used in an EAP authentication procedure for the first network slice of the terminal device.

In another possible implementation, the transceiver module is further configured to:

receive a completion notification message sent by the terminal device, where the completion notification message is for notifying the AMF entity that the terminal device completes updating the second key $K_{AMF}$.

A twelfth aspect of embodiments of this application provides a terminal device, including:

a transceiver module, configured to receive second indication information sent by an AMF entity; and a processing module, configured to update a second key $K_{AMF}$ based on the second indication information, where an updated second key $K_{AMF}$ is for transmission between the terminal device and a first network, and the first network is a network currently accessed by the terminal device.

In a possible implementation, the processing module is specifically configured to:

determine, based on the second indication information, to update the second key $K_{AMF}$ for a first network slice; and update the second key $K_{AMF}$ based on an identifier of the first network slice.

In another possible implementation, the processing module is specifically configured to:

update the second key $K_{AMF}$ based on the identifier of the first network slice and a third key, where the third key is a key generated or a credential used in an EAP authentication procedure for the first network slice of the terminal device.

In another possible implementation, the transceiver module is further configured to:

send a completion notification message to the AMF entity, where the completion notification message is for notifying the AMF entity that the terminal device completes updating the second key $K_{AMF}$.

A thirteenth aspect of embodiments of this application provides a slice service verification function entity, including a processor, a memory, an input/output device, and a bus. The memory stores computer instructions. When executing the computer instructions in the memory, the processor is configured to implement any implementation of the first aspect.

In a possible implementation of the thirteenth aspect, the processor, the memory, and the input/output device are separately connected to the bus.

A fourteenth aspect of embodiments of this application provides a terminal device, including a processor, a memory, an input/output device, and a bus. The memory stores computer instructions. When executing the computer instructions in the memory, the processor is configured to implement any implementation of the second aspect.

In a possible implementation of the fourteenth aspect, the processor, the memory, and the input/output device are separately connected to the bus.

A fifteenth aspect of embodiments of this application provides an authentication server, including a processor, a memory, an input/output device, and a bus. The memory stores computer instructions. When executing the computer instructions in the memory, the processor is configured to implement any implementation of the third aspect.

In a possible implementation of the fifteenth aspect, the processor, the memory, and the input/output device are separately connected to the bus.

A sixteenth aspect of embodiments of this application provides a terminal device, including a processor, a memory, an input/output device, and a bus. The memory stores computer instructions. When executing the computer instructions in the memory, the processor is configured to implement any implementation of the fourth aspect.

In a possible implementation of the sixteenth aspect, the processor, the memory, and the input/output device are separately connected to the bus.

A seventeenth aspect of embodiments of this application provides an AMF entity, including a processor, a memory, an input/output device, and a bus. The memory stores computer instructions. When executing the computer instructions in the memory, the processor is configured to implement any implementation of the fifth aspect.

In a possible implementation of the seventeenth aspect, the processor, the memory, and the input/output device are separately connected to the bus.

An eighteenth aspect of embodiments of this application provides a terminal device, including a processor, a memory, an input/output device, and a bus. The memory stores computer instructions. When executing the computer instructions in the memory, the processor is configured to implement any implementation of the sixth aspect.

In a possible implementation of the eighteenth aspect, the processor, the memory, and the input/output device are separately connected to the bus.

A nineteenth aspect of embodiments of this application provides a computer program product including instructions. When the computer program product runs on a computer, the computer is enabled to perform any implementation of the first aspect, the second aspect, the third aspect, the fourth aspect, the fifth aspect, and the sixth aspect.

A twentieth aspect of embodiments of this application provides a computer-readable storage medium, including instructions. When the instructions are run on a computer, the computer is enabled to perform any implementation of any one of the first aspect, the second aspect, the third aspect, the fourth aspect, the fifth aspect, and the sixth aspect.

A twenty-first aspect of embodiments of this application provides a chip, including a memory and a processor. The memory is configured to store a computer program, and the processor is configured to invoke the computer program from the memory and run the computer program, so that the processor performs any implementation of any one of the first aspect, the second aspect, the third aspect, the fourth aspect, the fifth aspect, and the sixth aspect.

A twenty-second aspect of embodiments of this application provides a communication system. The communication system includes the slice service verification function entity according to the first aspect and the terminal device according to the second aspect.

A twenty-third aspect of embodiments of this application provides a communication system. The communication system includes the authentication server according to the third aspect and the terminal device according to the fourth aspect.

A twenty-fourth aspect of embodiments of this application provides a communication system. The communication system includes the AMF entity according to the fifth aspect and the terminal device according to the sixth aspect.

A twenty-fifth aspect of embodiments of this application provides a chip, including a memory and a processor. The memory is configured to store a computer program, and the processor is configured to invoke the computer program from the memory and run the computer program, so that the processor performs any implementation of any one of the first aspect, the second aspect, the third aspect, the fourth aspect, the fifth aspect, and the sixth aspect.

It can be learned from the foregoing technical solutions that embodiments of this application have the following advantages:

It can be learned from the foregoing technical solutions that the slice service verification function entity receives the first message sent by the terminal device, where the first message carries the first message authentication code, and the first message authentication code is calculated based on the first network identifier. Then, the slice service verification function entity verifies the first message authentication code based on the second network identifier. The slice service verification function entity sends the second network identifier to the authentication server when the verification succeeds. It can be learned from this that the slice service verification function entity verifies, based on the second network identifier, the first message authentication code sent by the terminal device. When the verification succeeds, the slice service verification function entity may determine that the slice service of the first network slice is provided by the network corresponding to the second network identifier for the terminal device. Therefore, the foregoing solutions can avoid or prevent the behavior that the visited network currently accessed by the terminal device deceives the home network of the terminal device, to improve the network security.

BRIEF DESCRIPTION OF DRAWINGS

FIG. 6A and FIG. 6B are a schematic diagram of another embodiment of a slice service verification method according to embodiments of this application;

DESCRIPTION OF EMBODIMENTS

Figure 1A:
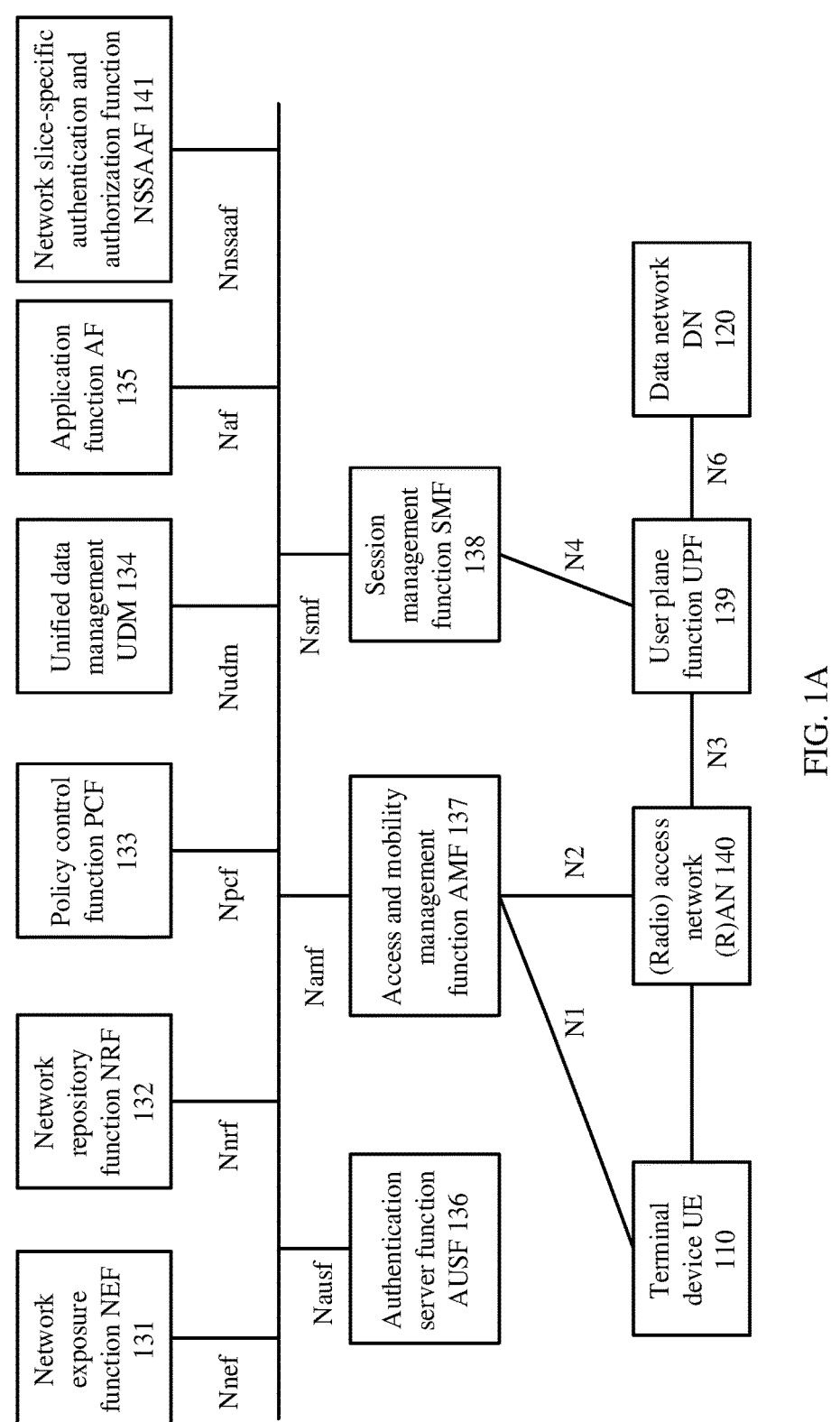
FIG. 1A is a schematic diagram of an architecture of a communication system according to an embodiment of this application.

Embodiments of this application provide a slice service verification method and apparatus, to improve network security.

To make objectives, technical solutions, and advantages of this application clearer, the following further describes this application with reference to the accompanying drawings.

The terms "include", "have", and any other variant thereof in the specification, claims, and accompanying drawings of this application are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

"Embodiment" in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, and "at least two (items)" means two or three or more. The term "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between associated objects. The term "at least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The following describes a communication system to which this application is applied.

The technical solutions provided in this application may be applied to various communication systems. In a communication system, a part operated by an operator may be referred to as a PLMN (which may also be referred to as an operator network or the like). The PLMN is a network established and operated by a government or an operator approved by the government to provide a land mobile communication service for the public, and is mainly a public network used by a mobile network operator (mobile network operator, MNO) to provide a mobile broadband access service for users. The PLMN described in this application may be specifically a network compliant with a standard of the 3rd generation partnership project (3rd generation partnership project, 3GPP), which is referred to as a 3GPP network for short. 3GPP networks usually include but are not limited to a 5th-generation mobile communication (5th-generation, 5G) network (5G network for short), a 4th-generation mobile communication (4th-generation, 4G) network (4G network for short), and the like.

For ease of description, the PLMN is used as an example for description in embodiments of this application. Alternatively, the technical solutions provided in this application may be applied to a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) communication system or a new radio (new radio, NR) system, and another future communication system, for example, a 6G communication system.

With expansion of the mobile bandwidth access service, mobile networks are developing to better support diversified business modes and meet requirements of more diversified application services and more industries. For example, to provide better and more comprehensive services for more industries, a network architecture is adjusted for the 5G network compared with that of the 4G network. For example, in the 5G network, a mobility management entity (mobility management entity, MME) in the 4G network is split into a plurality of network functions including an access and mobility management function (access and mobility management function, AMF), a session management function (session management function, SMF), and the like.

FIG. 1A is a schematic diagram of an architecture of a communication system according to an embodiment of this application. A 5G network architecture that is based on a service-oriented architecture in a non-roaming scenario and that is defined in a 3GPP standardization process is used as an example. The network architecture may include three parts: a terminal device part, a PLMN, and a data network (data network, DN).

The terminal device part may include a terminal device 110, and the terminal device 110 may also be referred to as user equipment (user equipment, UE). The terminal device 110 in this application is a device having a wireless transceiver function, and may communicate with one or more core network (core network, CN) devices (which may also be referred to as core devices) via an access network device (which may also be referred to as an access device) in a radio access network (radio access network, RAN) 140. The terminal device 110 may also be referred to as an access terminal, a terminal, a subscriber unit, a subscriber station, a mobile station, a remote station, a remote terminal, a mobile device, a user terminal, a user agent, a user apparatus, or the like. The terminal device 110 may be deployed on land, including an indoor device, an outdoor device, a handheld device, or a vehicle-mounted device; may be deployed on water (such as a ship); or may be deployed in the air (for example, on an airplane, a balloon, or a satellite). The terminal device 110 may be a cellular phone (cellular phone), a cordless phone, a session initiation protocol (session initiation protocol, SIP) phone, a smart phone (smart phone), a mobile phone (mobile phone), a wireless local loop (wireless local loop, WLL) station, a personal digital assistant (personal digital assistant, PDA), or the like. Alternatively, the terminal device 110 may be a handheld device or a computing device that has a wireless communication function, another device connected to a wireless modem, a vehicle-mounted device, a wearable device, an unmanned aerial vehicle device, a terminal in an Internet of things or Internet of vehicles, a terminal in any form in a 5G network or a future network, relay user equipment, a terminal in a future evolved PLMN, or the like. The relay user equipment may be, for example, a 5G residential gateway (residential gateway, RG). For example, the terminal device 110 may be a virtual reality (virtual reality, VR) terminal, an augmented reality (augmented reality, AR) terminal, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), or a wireless terminal in a smart home (smart home). A type or the like of the terminal device is not limited in embodiments of this application.

The PLMN may include a network exposure function (network exposure function, NEF) 131, a network repository function (network repository function, NRF) 132, a policy control function (policy control function, PCF) 133, a unified data management (unified data management, UDM) 134, an application function (application function, AF) 135, an AUSF 136, an AMF 137, a session management function (session management function, SMF) 138, a user plane function (user plane function, UPF) 139, the (radio) access network ((radio) access network, (R)AN) 140, an NSSAAF 141, and the like. In the PLMN, a part other than the (radio) access network 140 may be referred to as a core network (core network, CN).

The data network (data network, DN) 120 may also be referred to as a packet data network (packet data network, PDN), and is usually a network outside the PLMN, for example, is a third-party network. For example, the PLMN may access a plurality of data networks DNs 120, and a plurality of services may be deployed in the data network DN 120, to provide services such as a data service and/or a voice service for the terminal device 110. For example, the data network DN 120 may be a private network of a smart factory, a sensor mounted in a workshop of the smart factory may be the terminal device 110, a control server of the sensor is deployed in the data network DN 120, and the control server may provide a service for the sensor. The sensor may communicate with the control server, to obtain instructions of the control server, transmit collected sensor data to the control server according to the instructions, and so on. For another example, the data network DN 120 may be an internal office network of a company, a mobile phone or a computer of an employee of the company may be the terminal device 110, and the mobile phone or the computer of the employee may access information, data resources, and the like in the internal office network of the company. The terminal device 110 may establish a connection to the PLMN through an interface (for example, an N1 interface in FIG. 1A) provided by the PLMN, to use services such as a data service and/or a voice service provided by the PLMN. The terminal device 110 may further access the data network DN 120 through the PLMN, to use an operator service deployed in the data network DN 120 and/or a service provided by a third party. The third party may be a service provider other than the PLMN and the terminal device 110, and may provide other services such as a data service and/or a voice service for the terminal device 110. A specific representation form of the third party may be specifically determined based on an actual application scenario, and is not limited herein.

For example, the following briefly describes the network functions in the PLMN.

The (R)AN 140 is a subnet of the PLMN, and is an implementation system between a service node (or the network function) in the PLMN and the terminal device 110. To access the PLMN, the terminal device 110 first passes through the (R)AN 140, and then is connected to the service node in the PLMN via the (R)AN 140. The access network device in embodiments of this application is a device that provides a wireless communication function for the terminal device 110, and may also be referred to as an access device, a (R)AN device, a network device, or the like. For example, the access device includes but is not limited to: a next generation NodeB (next generation NodeB, gNB) in a 5G system, an evolved NodeB (evolved NodeB, eNB) in an LTE system, a radio network controller (radio network controller, RNC), a NodeB (NodeB, NB), a base station controller (base station controller, BSC), a base transceiver station (base transceiver station, BTS), a home base station (home evolved NodeB or home NodeB, HNB), a baseband unit (baseband unit, BBU), a transmission reception point (transmission reception point, TRP), a transmission point (transmission point, TP), a pico base station (pico), a mobile switching center, or a network device in a future network. It may be understood that a specific type of the access network device is not limited in this application. In systems using different radio access technologies, devices with functions of the access network device may have different names.

Optionally, in some deployment of the access device, the access device may include a central unit (central unit, CU), a distributed unit (distributed unit, DU), and the like. In some other deployment of the access device, a CU may be further divided into a CU-control plane (control plane, CP), a CU-user plane (user plane, UP), and the like. In still some other deployment of the access device, the access device may alternatively be in an open radio access network (open radio access network, ORAN) architecture or the like. A specific deployment manner of the access device is not limited in this application.

The network exposure function NEF (which may also be referred to as a NEF network function or a NEF network function entity) 131 is a control plane function provided by the operator. The NEF network function 131 securely exposes an external port of the PLMN to a third party. When the SMF network function 138 needs to communicate with a third-party network function, the NEF network function 131 may serve as a relay for communication between the SMF network function 138 and the third-party network entity. When serving as the relay, the NEF network function 131 may translate identification information of a subscriber and identification information of the third-party network function. For example, when sending a subscription permanent identifier (subscription permanent identifier, SUPI) of the subscriber from the PLMN to the third party, the NEF network function 131 may translate the SUPI into an external identity (identity, ID) corresponding to the SUPI. Conversely, when sending an external ID (an ID of the third-party network entity) to the PLMN, the NEF network function 131 may translate the external ID into a SUPI.

The network repository function NRF 132 may be configured to maintain real-time information of all network function services in the network.

The policy control function PCF 133 is a control plane function provided by the operator, and is configured to provide protocol data unit (protocol data unit, PDU) session policies for the session management function SMF 138. The policies may include a charging-related policy, a QoS-related policy, an authorization-related policy, and the like.

The unified data management UDM 134 is a control plane function provided by the operator, and is responsible for storing information such as the subscription permanent identifier (subscription permanent identifier, SUPI) of the subscriber, a security context (security context), and subscription data in the PLMN. The subscriber in the PLMN may be specifically a subscriber using a service provided by the PLMN, for example, a subscriber using a terminal device SIM card of China Telecom or a subscriber using a terminal device SIM card of China Mobile. For example, the SUPI of the subscriber may be a number of the terminal device SIM card. The security context may be a cookie (cookie), a token (token), or the like stored in a local terminal device (for example, a mobile phone). The subscription data of the subscriber may be a supporting service of the terminal device SIM card, for example, a traffic package of the mobile phone SIM card.

The application function AF 135 is configured to: perform application influence on data routing, access the network exposure function, interact with a policy framework for policy control, and so on.

The authentication server function AUSF 136 is a control plane function provided by the operator, and is usually for primary authentication, namely, authentication between the terminal device 110 (the subscriber) and the PLMN.

The network slice-specific authentication and authorization function NSSAAF 141 is a control plane function provided by the operator, and is usually for slice authentication of a network slice, namely, slice authentication performed between the terminal device 110 and an authentication server (for example, an authentication server of the operator network or an authentication server of a third-party DN).

The access and mobility management function AMF 137 is a control plane network function provided by the PLMN, and is responsible for access control and mobility management, for example, mobility state management, allocation of a temporary user identity, and user authentication and authorization, when the terminal device 110 accesses the PLMN.

The session management function SMF 138 is a control plane network function provided by the PLMN, and is responsible for managing a protocol data unit (protocol data unit, PDU) session of the terminal device 110. The PDU session is a channel for transmitting a PDU, and the terminal device needs to perform PDU transmission with the DN 120 through the PDU session. The SMF 138 may be responsible for establishment, maintenance, deletion, and the like of the PDU session. The SMF 138 includes session-related functions such as session management (for example, session establishment, modification, and release, including maintenance of a tunnel between the UPF 139 and the (R)AN 140 and the like), selection and control of the UPF 139, service and session continuity (service and session continuity, SSC) mode selection, and roaming.

The user plane function UPF 139 is a gateway provided by the operator, and is a gateway for communication between the PLMN and the DN 120. The UPF 139 includes user plane-related functions such as data packet routing and transmission, packet detection, service usage reporting, quality of service (quality of service, QoS) processing, lawful interception, uplink packet detection, and downlink data packet storage.

The network functions in the PLMN shown in FIG. 1A may further include a network slice selection function (network slice selection function, NSSF) (not shown in FIG. 1A), responsible for determining a network slice instance, selecting the AMF network function 137, and so on. The network functions in the PLMN shown in FIG. 1A may further include a unified data repository (unified data repository, UDR) and the like. Another network function included in the PLMN is not limited in embodiments of this application.

Nnef, Nausf, Nnssaaf, Nnrf, Npcf, Nudm, Naf, Namf, Nsmf, N1, N2, N3, N4, and N6 in FIG. 1A are interface sequence numbers. For example, for meanings of the interface sequence numbers, refer to meanings defined in a 3GPP standard protocol. The meanings of the interface sequence numbers are not limited in this application. It should be noted that FIG. 1A only provides descriptions by using an example in which the terminal device 110 is the UE, and the names of the interfaces between the network functions in FIG. 1A are also examples. In a specific implementation, the interfaces in the system architecture may alternatively have other names. This is not limited in this application.

A mobility management network function in this application may be the AMF 137 shown in FIG. 1A, or may be another network function having the foregoing access and mobility management function AMF 137 in a future communication system. Alternatively, a mobility management network function in this application may be a mobility management entity (mobility management entity, MME) or the like in an LTE system.

In the network architecture shown in FIG. 1A, the NSSAAF 141 is independently deployed, or the NSSAAF 141 may be integrated into another network function entity or combined with another network function entity, for example, integrated with the AUSF 136, the AF 135, or an authentication server proxy (not shown in the figure). This is not specifically limited in this application.

For ease of description, in embodiments of this application, the access and mobility management function AMF 137 is referred to as an AMF entity for short, the unified data management UDM 134 is referred to as a UDM for short, the authentication server function AUSF 136 is referred to as an AUSF entity for short, and the network slice-specific authentication and authorization function NSSAAF 141 is referred to as an NSSAAF entity for short. To be specific, in the following descriptions of embodiments of this application, an AMF entity may be replaced with an access and mobility management function, a UDM may be replaced with a unified data management, an AUSF may be replaced with an authentication server function, and an NSSAAF may be replaced with a network slice-specific authentication and authorization function.

A service-based architecture and a universal interface are used for the network architecture (for example, the 5G network architecture) shown in FIG. 1A, and a conventional network element function is split into several self-contained, self-managed, and reusable network function service modules by using a network function virtualization (network function virtualization, NFV) technology. Customized network function reconstruction may be implemented by flexibly defining a service module set, and a service process is formed externally by using a unified service invoking interface. The schematic diagram of the network architecture shown in FIG. 1A may be understood as a schematic diagram of a service-based 5G network architecture in a non-roaming scenario. In the architecture, different network functions are combined in order based on a requirement in a specific scenario, so that a network capability and a network service can be customized, thereby deploying dedicated networks for different services, and implementing 5G network slicing (network slicing). With a network slicing technology, the operator can respond to customer requirements more flexibly and quickly and support flexible allocation of network resources.

The following describes a slice and slice authentication in embodiments of this application.

In simple understanding of the slice, a physical network of an operator is spliced into a plurality of virtual end-to-end networks, these virtual networks (including a device, an access network, a transport network, and a core network in the network) are logically independent, and a fault occurring on any one of the virtual networks does not affect the remaining of the virtual networks. To meet diversified requirements and slice isolation, independent management, operation, maintenance are required for services, and customized service functions and analysis capabilities are provided. Instances of different service types may be deployed on different network slices, and different instances of a same service type may also be deployed on different network slices. A slice may include a group of a network function (network function, NF) a subnet, and/or the like. For example, a slice may include the subnet (R)AN 140, the AMF 137, the SMF 138, and the UPF 139 in FIG. 1A. It may be understood that only one network function of each type is schematically illustrated in FIG. 1A. During actual network deployment, there may be a plurality of, dozens of, or more than one hundred network functions or subnets of each type. Many slices may be deployed in a PLMN. Each slice may have different performance to meet requirements of different applications and vertical industries. The operator may "customize" a slice based on requirements of customers in the different vertical industries. The operator may alternatively allow some industrial customers to enjoy large autonomy and participate in some slice management and control functions. Slice-level authentication is a network control function with limited industry customer participation. To be specific, authentication and authorization, namely, "slice-level authentication", are performed on a slice accessed by a terminal device, where the "slice-level authentication" may also be referred to as "secondary authentication" or the like, and is referred to as "slice authentication" for short in this application.

Before being allowed to access a network or a slice, a terminal device needs to perform mutual authentication with the network and/or the slice and be authorized by the network and/or the slice. Usually, the terminal device needs to be authenticated and authorized once or twice by the network before accessing the network or the slice. First, a PLMN needs to perform authentication based on a SUPI that is used by the terminal device to subscribe to the PLMN. The authentication is referred to as primary authentication (primary authentication). Second, the PLMN needs to perform authentication based on a subscription identifier used by the terminal device in a DN. The authentication is referred to as slice authentication, secondary authentication, or the like.

FIG. 1A is used as an example. When slices are deployed in the core network, and the UE 110 needs to access a specific slice, the UE 110 may provide the requested slice for the core network. The slice requested by the UE 110 may include a requested network slice selection assistance information (requested network slice selection assistance information, requested NSSAI) set. The NSSAI set may include one or more pieces of single network slice selection assistance information (single network slice selection assistance information, S-NSSAI). One piece of S-NSSAI identifies one network slice type. This may also be understood as: The S-NSSAI identifies a slice, or the S-NSSAI is identification information of a slice. It may be understood that the slice in this application may also be referred to as a network slice, a network slice instance, S-NSSAI, or the like. An identifier of the network slice is not limited in this application. For ease of understanding, in the following descriptions, the network slice identifier, the S-NSSAI, and the like are not strictly distinguished from each other in this application, and may be interchangeably used.

Further, after the UE 110 sends a registration request to the network, a core network function (for example, the AMF network function 137 or the NSSF network function) selects, for the UE 110 based on information such as subscription data of the UE 110, the network slice requested by the UE 110, a roaming protocol, and a local configuration, a set of network slices that are allowed to be accessed. The set of network slices that are allowed to be accessed may be represented by allowed (allowed) NSSAI, and S-NSSAI included in the allowed NSSAI may be S-NSSAI that a current PLMN allows the UE 110 to access.

An example is used to describe the primary authentication and the secondary authentication. For example, with development of vertical industries and Internets of things, the data network DN 120 (for example, a DN serving the vertical industries) outside the PLMN also has an authentication and authorization requirement for the UE 110 accessing the DN 120. For example, a commercial company provides a gaming platform to provide a game service for players through a PLMN. Because the UE 110 used by a player accesses the gaming platform through the PLMN, the PLMN needs to perform authentication, authorization, or the like on an identity (a SUPI) of the UE 110, that is, perform primary authentication. The game player is a customer of the commercial company, and the commercial company also needs to perform authentication or authorization on an identity of the game player. For example, the authentication or authorization performed on the identity of the game player may be slice-specific authentication, in other words, the authentication is performed in a unit of a slice. In this case, the authentication may be referred to as slice authentication (slice authentication) or network slice-specific authentication and authorization (network slice-specific authentication and authorization, NSSAA).

It should be noted that an actual meaning of the slice authentication may be, for example, authentication performed between a terminal device and a third-party network (for example, a DN or an authentication server of the DN). A slice authentication result is for determining whether to authorize the terminal device by a PLMN to access a slice provided by the PLMN. It should be further understood that the method applied to slice authentication in this application is also applicable to a session-specific secondary authentication (secondary authentication) scenario, a slice-specific secondary authentication scenario, or the like. Details are not described herein.

It should be noted that the primary authentication and the slice authentication described above are merely intended to describe basic procedures for the primary authentication and the slice authentication. During actual application, a corresponding network should provide a service for the terminal device and a home network of the terminal device with reference to state (a roaming state or a non-roaming state) adaptability of the terminal device, to complete the primary authentication or the slice authentication. For example, when the terminal device roams to a visited network, the visited network forwards a primary authentication request for the terminal device to the home network of the terminal device, and then the home network of the terminal device performs primary authentication with the terminal device. Alternatively, the visited network initiates slice authentication for the terminal device, and then a slice authentication server subscribed to by the home network (or deployed by the home network) of the terminal device performs slice authentication with the terminal device. The home network of the terminal device initiates primary authentication and slice authentication for the terminal device when the terminal device is in the non-roaming state, and the home network or the slice authentication server performs primary authentication or slice authentication with the terminal device.

The slice service verification method provided in embodiments of this application is applicable to determining a serving network that provides a network slice service for a terminal device and the real slice service that is provided. For scenarios to which the method is applicable, the following provides examples for description.

Figures 1B, 2A:
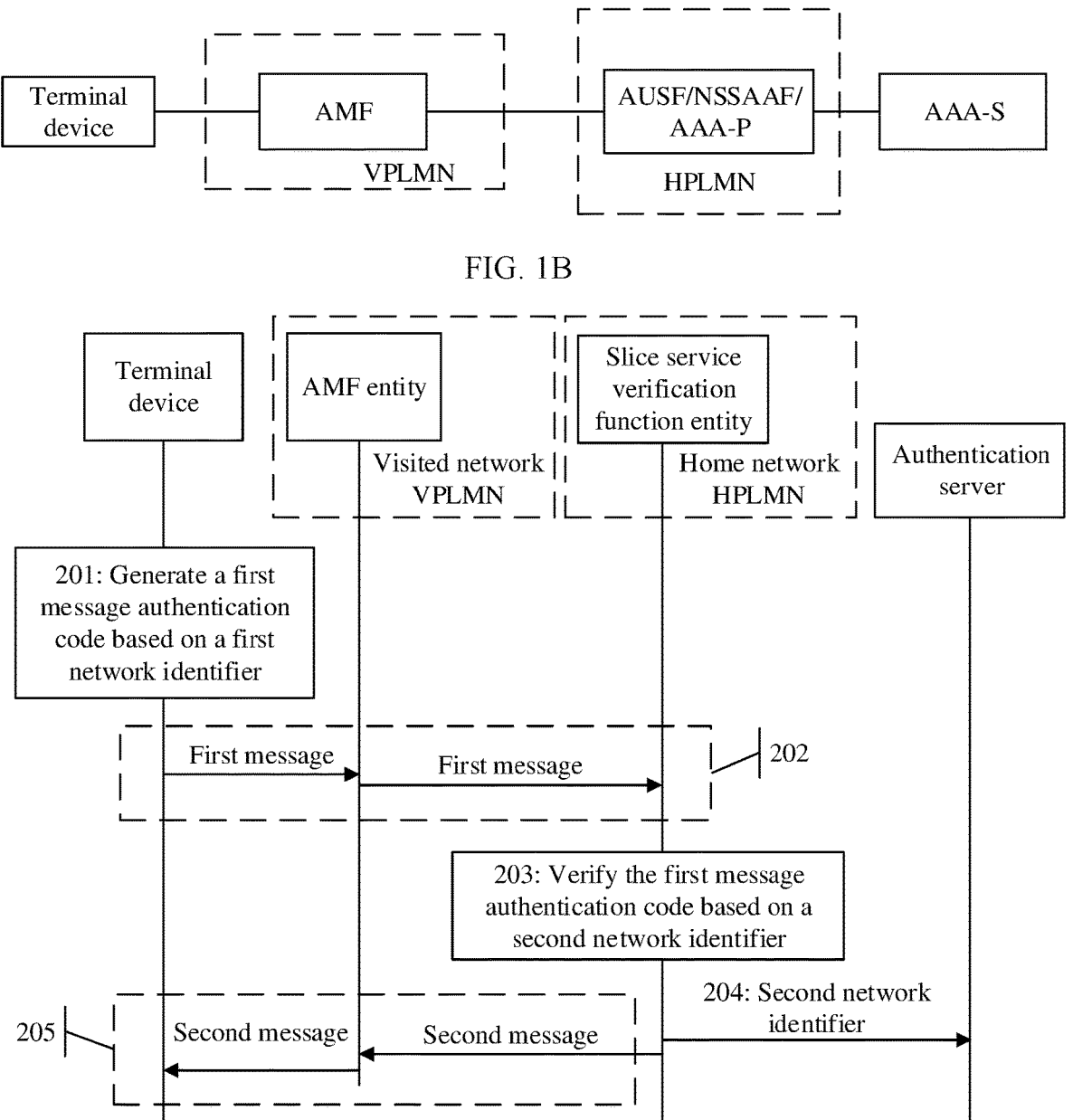
FIG. 1B is a schematic diagram of a network architecture to which an embodiment of this application is applicable.
FIG. 2A is a schematic diagram of an embodiment of a slice service verification method according to embodiments of this application.

Scenario 1: Roaming Scenario in which the Terminal Device Roams to a Visited Network The following describes the scenario 1 with reference to FIG. 1B. In FIG. 1B, in the roaming scenario, the terminal device moves to a visited public land mobile network (visited public land mobile network, VPLMN), which is referred to as the visited network for short in this application. Then, the terminal device accesses the visited network VPLMN through an AMF entity in the VPLMN, and the VPLMN provides a slice service of a first network slice for the terminal device.

A home public land mobile network (home public land mobile network, HPLMN) is a home network of the terminal device, and is referred to as the home network for short in this application. In this case, an NSSAAF entity or an AUSF entity in the HPLMN may determine, by using the slice service verification method in embodiments of this application, that the slice service of the first network slice is provided by the VPLMN for the terminal device (where for example, for a network slice on which slice authentication needs to be performed, the slice service may be slice authentication of the first network slice or another slice service of the first network slice (including transmitting data and signaling on the first network slice); for a network slice on which slice authentication does not need to be performed, the slice service may be transmitting data and signaling on the first network slice). Alternatively, an authentication, authorization, and accounting server (authentication, authorization, and accounting server, AAA-S) determines, by using the slice service verification method in embodiments of this application, that the slice service of the first network slice is provided by the VPLMN for the terminal device. In this way, a deception behavior of the visited network to the home network is prevented or avoided, thereby improving network security.

Scenario 2: Non-Roaming Scenario in which a Network Currently Accessed by the Terminal Device is a Home Network of the Terminal Device There are a plurality of AMF entities in the home network of the terminal device. To verify which AMF entity in the home network of the terminal device initiates a slice authentication service or another slice service for the terminal device, an NSSAAF entity or an AUSF entity in the HPLMN determines, by using the slice service verification method in embodiments of this application, that a slice service of a first network slice is provided by the AMF entity for the terminal device, or an AAA-S determines, by using the slice service verification method in embodiments of this application, that a slice service of a first network slice is provided by the AMF entity in the HPLMN for the terminal device. When the AMF entity, in the home network, that initiates the slice authentication or provides the another slice service for the terminal device performs an abnormal behavior, the NSSAAF entity or the AUSF entity in the HPLMN or the AAA-S may perform verification by using the slice service verification method in embodiments of this application, to improve network security.

In the following embodiments, the scenario 1 is used as an example for description.

FIG. 2A is a schematic diagram of an embodiment of a slice service verification method according to embodiments of this application. In FIG. 2A, the method includes the following steps.

201: A terminal device generates a first message authentication code based on a first network identifier.

The first message authentication code is calculated based on the first network identifier, and is for performing integrity protection on information including the first network identifier. The first network identifier is an identifier of a first network currently accessed by the terminal device. For example, in a roaming scenario, the first network identifier is an identifier of a visited network accessed by the terminal device.

Optionally, the first network identifier is the identifier of the first network or an identifier of a function entity in the first network.

The identifier of the first network includes an identity SN-ID of the first network, a PLMN identifier corresponding to the first network, a name SNN of the first network, or a network identifier NID of the first network.

The identifier of the function entity in the first network includes:

an identifier of an AMF entity, a name of the AMF entity, or a globally unique identifier of the AMF entity, where the AMF entity is a function entity that is in the first network and that initiates slice authentication of a first network slice for the terminal device.

The terminal device calculates the first message authentication code based on the first network identifier. There are a plurality of manners of generating the first message authentication code. The following separately uses examples for description.

Manner 1: The terminal device generates the first message authentication code based on the first network identifier and a second integrity key $K_{NSSAAF}$.

The second integrity key $K_{NSSAAF}$ is generated based on a first intermediate key $K_{AUSF}$.

Specifically, the terminal device calculates the second integrity key $K_{NSSAAF}$ by using the first intermediate key $K_{AUSF}$ as an input parameter of a first preset authentication code generation function.

Optionally, an input parameter of the first preset authentication code generation function further includes at least one of an identifier of a slice service verification function entity (for example, an identifier of an NSSAAF entity or an identifier of an AUSF entity), the first network identifier, an identifier S-NSSAI of the first network slice, and a freshness parameter. The freshness parameter is a random number (random number), a count (count), or a parameter FC. The parameter FC is an identifier of an instance of a key derivation function (key derivation function, KDF) specified in a 3GPP standard.

The first preset authentication code generation function includes the KDF specified in the 3GPP standard, or is any key derivation function, any hash (Hash) function, a hash-based message authentication code (Hash-based MAC, HMAC) generation function, or any integrity protection algorithm. It should be noted that the "function" may also be referred to as an "algorithm". The "function" and the "algorithm" are not distinguished in this application.

For generation of the second integrity key $K_{NSSAAF}$, the following first describes two generation manners by using examples. It should be noted that a generation manner of the second integrity key $K_{NSSAAF}$ is not limited in this embodiment.

a. The terminal device generates the first intermediate key $K_{AUSF}$ based on a first cipher key CK and a first integrity key IK, and then generates the second integrity key $K_{NSSAAF}$ based on the first intermediate key $K_{AUSF}$.

Figure 2B:
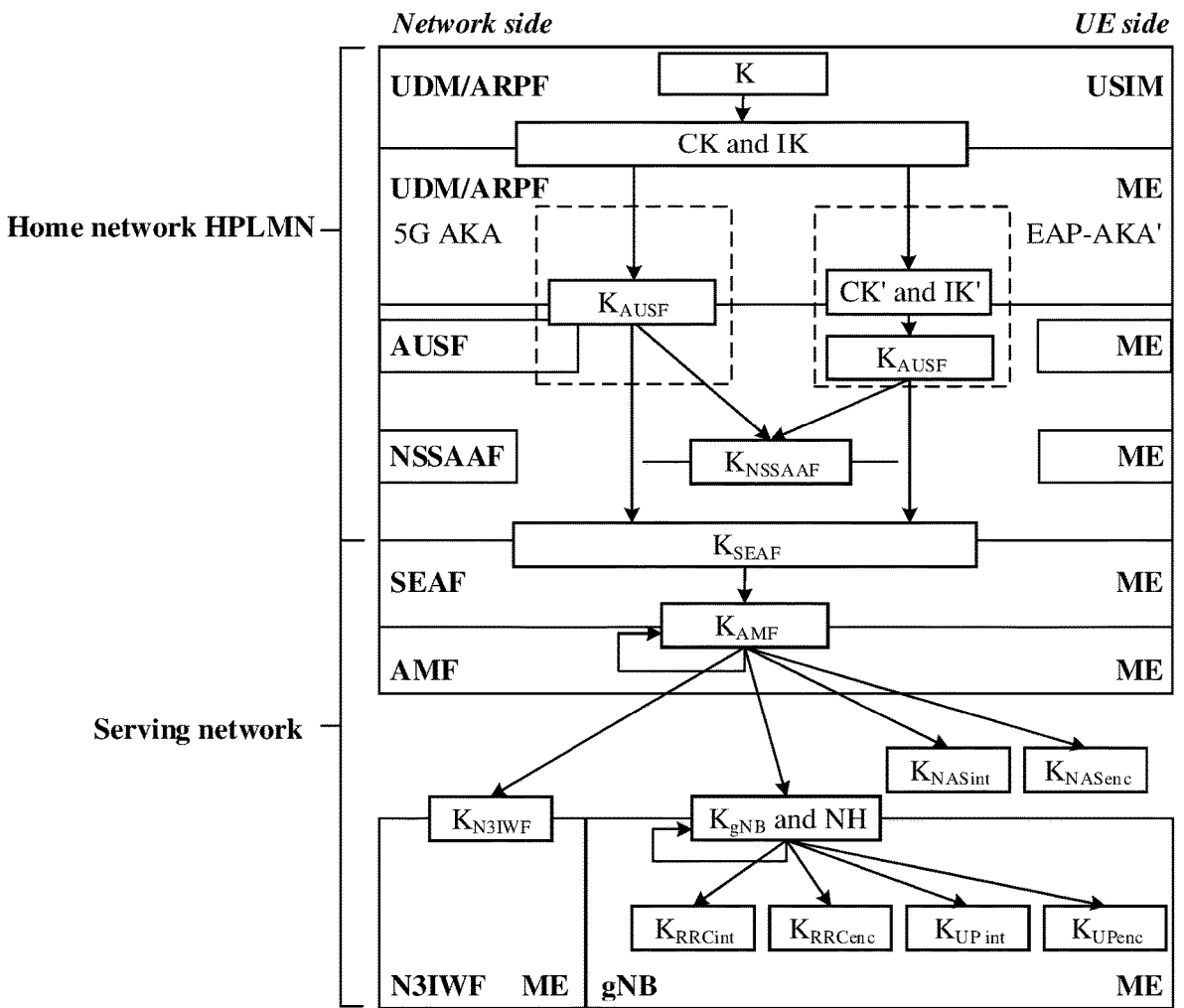
FIG. 2B is a schematic diagram of a scenario according to an embodiment of this application.

Refer to FIG. 2B. When performing primary authentication, the terminal device generates the first intermediate key $K_{AUSF}$ by using the first cipher key CK and the first integrity key IK that are generated by the terminal device. In this embodiment of this application, the terminal device derives the second integrity key $K_{NSSAAF}$ by using the first intermediate key $K_{AUSF}$.

b. The terminal device generates a second cipher key CK' and a third integrity key IK' based on a first cipher key CK and a first integrity key IK, generates the first intermediate key $K_{AUSF}$ based on the second cipher key CK' and the third integrity key IK', and then generates the second integrity key $K_{NSSAAF}$ based on the first intermediate key $K_{AUSF}$.

Refer to FIG. 2B. When performing primary authentication, the terminal device first derives the second cipher key CK' and the third integrity key IK' by using the first cipher key CK and the first integrity key IK of the terminal device. Then, the terminal device derives the first intermediate key $K_{AUSF}$ by using the second cipher key CK' and the third integrity key IK'. In this embodiment of this application, the terminal device derives the second integrity key $K_{NSSAAF}$ based on the first intermediate key $K_{AUSF}$.

Specifically, the terminal device calculates the first message authentication code by using the first network identifier and the second integrity key $K_{NSSAAF}$ as input parameters of the first preset authentication code generation function. It should be noted that the preset authentication code generation function for calculating the first message authentication code may further include another input parameter. The another input parameter is not limited in this application. For example, an input parameter of the first preset authentication code generation function further includes at least one of the identifier S-NSSAI of the first network slice, a count of the authentication code, and the random number.

For related descriptions of the first preset authentication code generation function, refer to the foregoing descriptions. Details are not described herein again.

For example, the first network identifier is the SN-ID, and the first message authentication code MAC-I=KDF (key=$K_{NSSAAF}$, the SN-ID, the S-NSSAI, . . . ). " . . . " represents any other input parameter.

Manner 2: The terminal device generates the first message authentication code based on the first network identifier and a first intermediate key $K_{AUSF}$.

There are the following two possible implementations of generating the first intermediate key $K_{AUSF}$:

a. The terminal device generates the first intermediate key $K_{AUSF}$ based on a first cipher key CK and a first integrity key IK.

b. The terminal device generates a second cipher key CK' and a third integrity key IK' based on a first cipher key CK and a first integrity key IK, and then generates the first intermediate key $K_{AUSF}$ based on the second cipher key CK' and the third integrity key IK'.

Specifically, the terminal device calculates the first message authentication code by using the first network identifier and the first intermediate key $K_{AUSF}$ as input parameters of a first preset authentication code generation function. For related descriptions of the first preset authentication code generation function and related descriptions of the input parameter of the first preset authentication code generation function, refer to the foregoing related descriptions. Details are not described herein again. It should be noted that the preset authentication code generation function for calculating the first message authentication code may further include another input parameter. The another input parameter is not limited in this application.

202: The terminal device sends a first message to the slice service verification function entity.

The first message carries the first message authentication code. The first message authentication code is calculated based on the first network identifier, and is for performing integrity protection on the first network identifier (and other information).

Optionally, the slice service verification function entity is a function entity in a home network of the terminal device.

Optionally, the first message further carries either or both of the following information:

the identifier of the first network slice or first identification information.

The first identification information carries the first network identifier.

When the first message further carries the identifier of the first network slice, the terminal device notifies the slice service verification function entity of the identifier of the first network slice by using the identifier of the first network slice carried in the first message.

When the first message further carries the first identification information, the terminal device notifies the slice service verification function entity of the first network identifier by using the first identification information carried in the first message.

In a possible implementation, the first message carries both the first identification information and the identifier of the first network slice. In this implementation, optionally, the first message authentication code is calculated based on the first identification information and the identifier of the first network slice, and may be for performing integrity protection on the first identification information and the identifier of the first network slice.

The first network identifier is the identifier of the first network or the identifier of the function entity in the first network that is included in the first identification information. For details, refer to the related descriptions of the identifier of the first network or the identifier of the function entity in the first network in step 201. The details are not described herein again.

The following describes a possible case in which the first message sent by the terminal device carries the first identification information and a possible case in which the first message sent by the terminal device does not carry the first identification information.

Case 1: The first message sent by the terminal device carries the first identification information.

In this implementation, the AMF entity may also send the first identification information to the slice service verification function entity, where the first identification information is carried in the first message sent by the terminal device or carried in another message.

Case 2: The first message sent by the terminal device does not carry the first identification information.

In this implementation, the AMF entity sends the first identification information to the slice service verification function entity, where the first identification information is carried in the first message sent by the terminal device or carried in another message.

In a possible implementation of the case 1, when the first message sent by the terminal device carries the first identification information, the slice service verification function entity may determine a second network identifier based on the first identification information, and then verify the first message authentication code based on the second network identifier.

In another possible implementation of the case 1, when the AMF entity also sends the first identification information to the slice service verification function entity, the slice service verification function entity determines a second network identifier based on the first identification information sent by the AMF entity instead of the first identification information carried in the first message sent by the terminal device. Then, the slice service verification function entity verifies the first message authentication code based on the second network identifier. The AMF entity may send the first identification information by using the first message or another message. For example, the first identification information is carried in a token (token) of the first message.

Optionally, in the case 1, the slice service verification function entity may further verify the second network identifier. For example, the slice service verification function entity determines whether the second network identifier verified by using the first message authentication code is the same as the network identifier included in the first identification information carried in the first message sent by the terminal device. Alternatively, the slice service verification function entity determines whether the second network identifier verified by using the first message authentication code is the same as the network identifier included in the first identification information sent by the AMF entity. The AMF entity may send the first identification information by using the first message or another message. For example, the first identification information is carried in a token (token) of the first message.

In a possible implementation of the case 2, when the first message sent by the terminal device does not carry the first identification information, the slice service verification function entity may determine a second network identifier based on the first identification information sent by the AMF entity. Then, the slice service verification function entity verifies the first message authentication code based on the second network identifier. The AMF entity may send the first identification information by using the first message or another message. For example, the first identification information is carried in a token (token) of the first message.

203: The slice service verification function entity verifies the first message authentication code based on the second network identifier.

In this embodiment, the slice service verification function entity may determine the second network identifier based on the first identification information sent by the AMF entity or based on the first identification information carried in the first message sent by the terminal device. For related descriptions of the first identification information, refer to the related descriptions in step 202. Details are not described herein again.

With reference to the generation manner in which the terminal device generates the first message authentication code in step 201, the following describes a process in which the slice service verification function entity verifies the first message authentication code:

1. Based on the manner 1 in step 201, step 203 specifically includes step 203a to step 203c.

Step 203a: The slice service verification function entity obtains the second integrity key $K_{NSSAAF}$.

Specifically, the slice service verification function entity is the NSSAAF entity, and the NSSAAF entity receives the second integrity key $K_{NSSAAF}$ sent by the AUSF entity.

The second integrity key $K_{NSSAAF}$ is generated by the AUSF entity based on the first intermediate key $K_{AUSF}$. A generation manner in which the AUSF entity generates the first intermediate key $K_{AUSF}$ is similar to the generation manner in which the terminal device generates the first intermediate key $K_{AUSF}$ in step 201. For details, refer to the related descriptions in step 201. The details are not described herein again.

Step 203*b*: The slice service verification function entity generates a second message authentication code based on the second integrity key $K_{NSSAAF}$ and the second network identifier.

Specifically, in this implementation, the NSSAAF entity calculates the second message authentication code by using the second network identifier and the second integrity key $K_{NSSAAF}$ as input parameters of the first preset authentication code generation function. The generation manner in which the slice service verification function entity generates the second message authentication code is similar to the manner in which the terminal device generates the first message authentication code. For details, refer to the related descriptions in the manner 1 in step 201.

Step 203*c*: The slice service verification function entity matches the first message authentication code with the second message authentication code to obtain a verification result.

Specifically, the slice service verification function entity matches the first message authentication code with the second message authentication code. When the first message authentication code is the same as the second message authentication code, the slice service verification function entity determines that the verification succeeds. When the first message authentication code is different from the second message authentication code, the slice service verification function entity determines that the verification fails.

When the first message authentication code is the same as the second message authentication code, the slice service verification function entity may determine that a slice service of the first network slice is provided by the first network for the terminal device. When the first message authentication code is different from the second message authentication code, the slice service verification function entity may determine that the second network identifier has been tampered with, and therefore determine that a slice service of the first network slice is not provided by a network corresponding to the second network identifier for the terminal device.

It should be noted that, for a network slice on which slice authentication needs to be performed, the slice service of the first network slice includes slice authentication of the first network slice and/or transmission of slice data or signaling on the first network slice. For a network slice on which slice authentication does not need to be performed, the slice service of the first network slice includes transmission of slice data or signaling on the first network slice.

2. Based on the manner 2 in step 201, step 203 specifically includes step 203*d* and step 203*e*.

Step 203*d*: The slice service verification function entity generates a second message authentication code based on the first intermediate key $K_{AUSF}$ and the second network identifier.

Specifically, in this implementation, the slice service verification function entity is the AUSF entity. The AUSF entity calculates the second message authentication code by using the second network identifier and the first intermediate key $K_{AUSF}$ as input parameters of the first preset authentication code generation function. The first preset authentication code generation function may further include another input parameter. This is not limited in this embodiment. The generation manner in which the AUSF entity generates the second message authentication code is similar to the generation manner in which the terminal device generates the first message authentication code. For details, refer to the related descriptions in the manner 2 in step 201.

Step 203*e*: The slice service verification function entity matches the first message authentication code with the second message authentication code to obtain a verification result.

Step 203*e* is similar to step 203*c*. For details, refer to the related descriptions in step 203*c*. The details are not described herein again.

204: The slice service verification function entity sends the second network identifier to an authentication server when the verification succeeds.

It should be noted that when the verification fails, the slice service verification function entity may determine that the second network identifier has been tampered with. In this case, the slice service verification function entity determines that the slice service of the first network slice is not provided by the network corresponding to the second network identifier for the terminal device.

In a possible implementation, the embodiment shown in FIG. 2A further includes step 205.

Step 205: The NSSAAF entity sends a second message to the terminal device.

Specifically, the NSSAAF entity sends the second message to the AMF entity, and then the AMF entity sends the second message to the terminal device. The second message is an authentication request message, an authentication response message, or a verification success message. For example, in a slice authentication process of a first network slice shown in FIG. 3A and FIG. 3B, the second message may be understood as an authentication request message or an authentication response message.

Optionally, in this embodiment, after verifying the first message authentication code based on the second network identifier, the NSSAAF entity stores the verification result of the first message authentication code or stores the second network identifier that is successfully verified. Further optionally, the NSSAAF entity stores a slice authentication result of the first network slice when the slice authentication of the first network slice is completed.

Specifically, the NSSAAF entity may forward the verification result of the first message authentication code or the second network identifier that is successfully verified and/or the slice authentication result of the first network slice to another network function entity (for example, a UDM), and the network function entity (for example, the UDM) stores the verification result of the first message authentication code or the second network identifier that is successfully verified and/or the slice authentication result of the first network slice.

It should be noted that when the terminal device simultaneously accesses a plurality of network slices on which slice authentication needs to be separately performed, for example, the first network slice and a second network slice, the terminal device generates the first message authentication code based on the first network identifier, the identifier of the first network slice, and an identifier of the second network slice. Optionally, the terminal device may further generate the first message authentication code based on the second integrity key $K_{NSSAAF}$ or the first intermediate key $K_{AUSF}$ and another parameter. Correspondingly, the slice service verification function entity verifies the first message authentication code based on the second network identifier, the identifier of the first network slice, and the identifier of the second network slice. A specific verification process is similar to the process in step 203, and may be understood with reference to the related descriptions in step 203.

In this embodiment of this application, the terminal device sends the first message to the slice service verification function entity, where the first message carries the identifier of the first network slice and the first message authentication code, and the first message authentication code is obtained after the integrity protection is performed on the first network identifier. Then, the slice service verification function entity verifies the first message authentication code based on the second network identifier, and sends the second network identifier to the authentication server when the verification succeeds. It can be learned from this that the slice service verification function entity verifies, based on the second network identifier, the first message authentication code sent by the terminal device. When the verification succeeds, the slice service verification function entity may determine that the slice service of the first network slice is provided by the network corresponding to the second network identifier for the terminal device. Therefore, the foregoing solution can avoid or prevent a behavior that the visited network currently accessed by the terminal device deceives the home network of the terminal device, to improve network security. For example, the slice service verification method in this embodiment of this application can enhance control of the home network on access of the terminal device and use of the network slice by the terminal device, to prevent the visited network from deceiving the home network in a slice authentication process and/or a use process of the network slice.

In the embodiment shown in FIG. 2A, descriptions are provided by using an example in which the slice service verification function entity sends the second network identifier to the authentication server after the slice service verification function entity verifies the first message authentication code and when the verification succeeds. During actual application, the slice service verification function entity may send the second network identifier and first indication information to the authentication server when the slice service verification function entity does not verify the second network identifier. The first indication information indicates that the second network identifier is not verified. This is not specifically limited in this application.

In embodiments of this application, descriptions are merely provided in the embodiment shown in FIG. 2A by using an example in which the terminal device generates the first message authentication code based on the first network identifier. Optionally, this application further provides another embodiment. This implementation is similar to the embodiment shown in FIG. 2A, and differences lie in step 201, step 202, step 203, and step 204.

Step 201 may be replaced with: A terminal device generates a first message authentication code based on an identifier of a first network slice.

The first message authentication code is obtained after integrity protection is performed on the identifier of the first network slice, and the identifier of the first network slice is an ID of the first network slice or first network slice selection assistance information NSSAI.

In different PLMNs, the identifier of the first network slice of the terminal device may vary with a PLMN currently accessed by the terminal device, and a PLMN corresponding to the identifier of the first network slice may be determined based on the variation. Therefore, the terminal device may generate the first message authentication code by using the identifier of the first network slice. In this way, when successfully verifying the first message authentication code, a slice service verification function entity determines a network that provides a slice service of the first network slice for the terminal device.

The terminal device generates the first message authentication code in a plurality of manners, and the following uses examples for description.

Manner 1: The terminal device generates the first message authentication code based on the identifier of the first network slice and a second integrity key $K_{NSSAAF}$.

For a generation manner of the second integrity key $K_{NSSAAF}$, refer to the related descriptions in step 201 in the embodiment shown in FIG. 2A. Details are not described herein again.

Specifically, the terminal device calculates the first message authentication code by using the identifier of the first network slice and the second integrity key $K_{NSSAAF}$ as input parameters of a first preset authentication code generation function.

It should be noted that the preset authentication code generation function for calculating the first message authentication code may further include another input parameter. The another input parameter is not limited in this application. For example, an input parameter of the first preset authentication code generation function further includes at least one of a second network identifier, a count of the authentication code, and a random number RAND.

For related descriptions of the first preset authentication code generation function, refer to the related descriptions in the embodiment shown in FIG. 2A. Details are not described herein again.

Manner 2: The terminal device generates the first message authentication code based on the identifier of the first network slice and a first intermediate key $K_{AUSF}$.

For a generation manner of the first intermediate key $K_{AUSF}$, refer to the related descriptions in step 201 in the embodiment shown in FIG. 2A. Details are not described herein again.

Specifically, the terminal device calculates the first message authentication code by using the identifier of the first network slice and the first intermediate key $K_{AUSF}$ as input parameters of a first preset authentication code generation function.

For related descriptions of the first preset authentication code generation function and related descriptions of the input parameter of the first preset authentication code generation function, refer to the related descriptions in step 201 in the embodiment shown in FIG. 2A. Details are not described herein again.

It should be noted that the preset authentication code generation function for calculating the first message authentication code may further include another input parameter. The another input parameter is not limited in this application.

Step 203 may be replaced with: The slice service verification function entity verifies the first message authentication code based on a first identifier.

The first identifier is determined by the slice service verification function entity based on the identifier of the first network slice sent by the AMF entity, or is determined by the slice service verification function entity based on the identifier of the first network slice carried in the first message sent by the terminal device.

The slice service verification function entity verifies the first message authentication code based on the manner in which the terminal device generates the first message authentication code. The following provides descriptions separately.

1. Based on the manner 1 of replaced step 201, step 203 shown in FIG. 2A includes step 203*a* to step 203*c*. A difference lies in step 203*b*. This is described below.

Step 203*b* may be replaced with: The slice service verification function entity generates a second message authentication code based on the second integrity key $K_{NSSAAF}$ and the first identifier.

Specifically, in this implementation, the slice service verification function entity is the NSSAAF entity. The slice service verification function entity calculates the second message authentication code by using the second integrity key $K_{NSSAAF}$ and the first identifier as input parameters of the first preset authentication code generation function. The generation manner in which the slice service verification function entity generates the second message authentication code is similar to the manner in which the terminal device generates the first message authentication code. For details, refer to the related descriptions in the manner 1 in replaced step 201.

2. Based on the manner 2 of replaced step 201, step 203 in the embodiment shown in FIG. 2A specifically includes step 203*d* and step 203*e*. A difference lies in step 203*d*. This is described below.

Step 203*d* may be replaced with: The slice service verification function entity generates a second message authentication code based on the first intermediate key $K_{AUSF}$ and the first identifier.

Specifically, in this implementation, the slice service verification function entity is the AUSF entity. The AUSF entity calculates the second message authentication code by using the first identifier and the first intermediate key $K_{AUSF}$ as input parameters of the first preset authentication code generation function.

The first preset authentication code generation function may further include another input parameter. This is not limited in this embodiment. The generation manner in which the AUSF entity generates the second message authentication code is similar to the generation manner in which the terminal device generates the first message authentication code. For details, refer to the related descriptions in the manner 2 in replaced step 201.

Step 204 may be replaced with: The slice service verification function entity sends the first identifier to an authentication server when the verification succeeds.

Optionally, the first message carries the first identification information. For related descriptions of the first identification information, refer to the related descriptions in step 202 in the embodiment shown in FIG. 2A. Details are not described herein again.

Second, for details about whether the first message carries identification information of the first network slice, refer to the related descriptions in step 202 in the embodiment shown in 2A. The details are not described herein again.

Optionally, the slice service verification function entity may alternatively generate the first message authentication code based on the first network identifier and the identifier of the first network slice. Details are similar to the descriptions in step 202 to step 205 in the embodiment shown in 2A, and are not described herein again.

In this embodiment of this application, optionally, the first message carries the first identification information. In this case, the slice service verification function entity determines the second network identifier by using the first identification information. This manner is used as an example for description in the following embodiments.

In this embodiment of this application, a method for primary authentication between the terminal device and an HPLMN is not limited in this application. A server responsible for slice authentication is an AAA-S, and the AAA-S may be deployed inside the HPLMN or outside the HPLMN/a VPLMN. When the AAA-S is deployed outside the network, the terminal device may be connected to the AAA-S through a proxy service provided by an AAA-proxy (AAA-proxy, AAA-P) deployed inside the HPLMN, to implement authentication message exchange between the UE and the AAA-S. Further, in some deployment manners, the AAA-P and the NSSAAF may be separately deployed; in some other deployment manners, the AAA-P and the NSSAAF (or the AUSF) may be deployed together. Therefore, a deployment manner of the AAA-P and the NSSAAF (or the AUSF) is not limited in this embodiment of this application.

In the following embodiments, descriptions are provided by using an example in which the AAA-P and the NSSAAF (or the AUSF) are separately deployed and the AAA-S is deployed outside the HPLMN, to be specific, the terminal device is connected to the AAA-S through the proxy service provided by the AAA-P inside the HPLMN, to implement the slice authentication. This embodiment of this application is also applicable to another deployment case.

The embodiment shown in FIG. 2A is executed in the slice authentication process of the first network slice or after the slice authentication of the first network slice is completed. The following separately provides descriptions by using an embodiment shown in FIG. 3A and FIG. 3B and an embodiment shown in FIG. 4. The slice service verification function entity is the NSSAAF entity, the AUSF entity, or another NF. This is not specifically limited in this application.

Figure 3A:
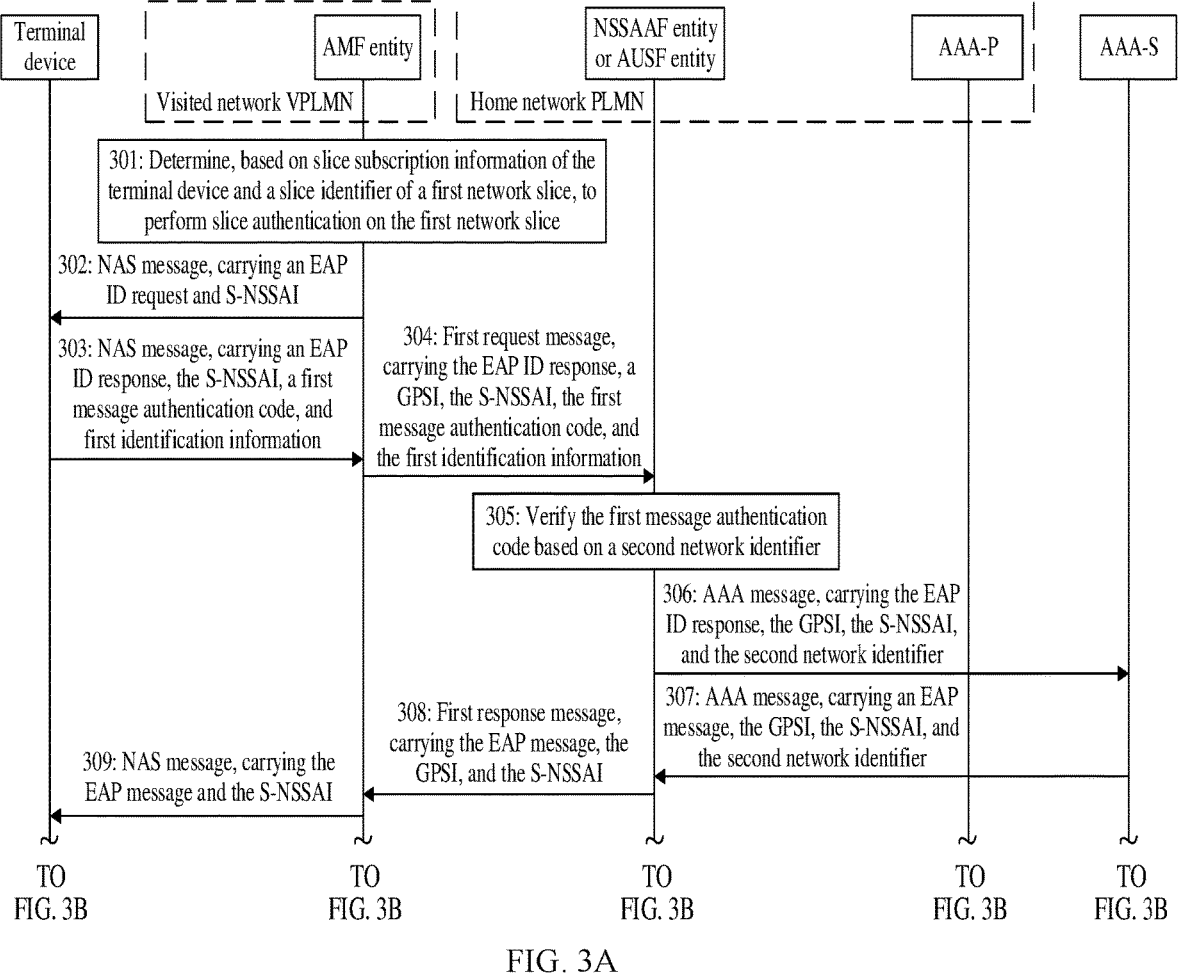
FIG. 3A and FIG. 3B are a schematic diagram of another embodiment of a slice service verification method according to embodiments of this application.
Figure 3B:
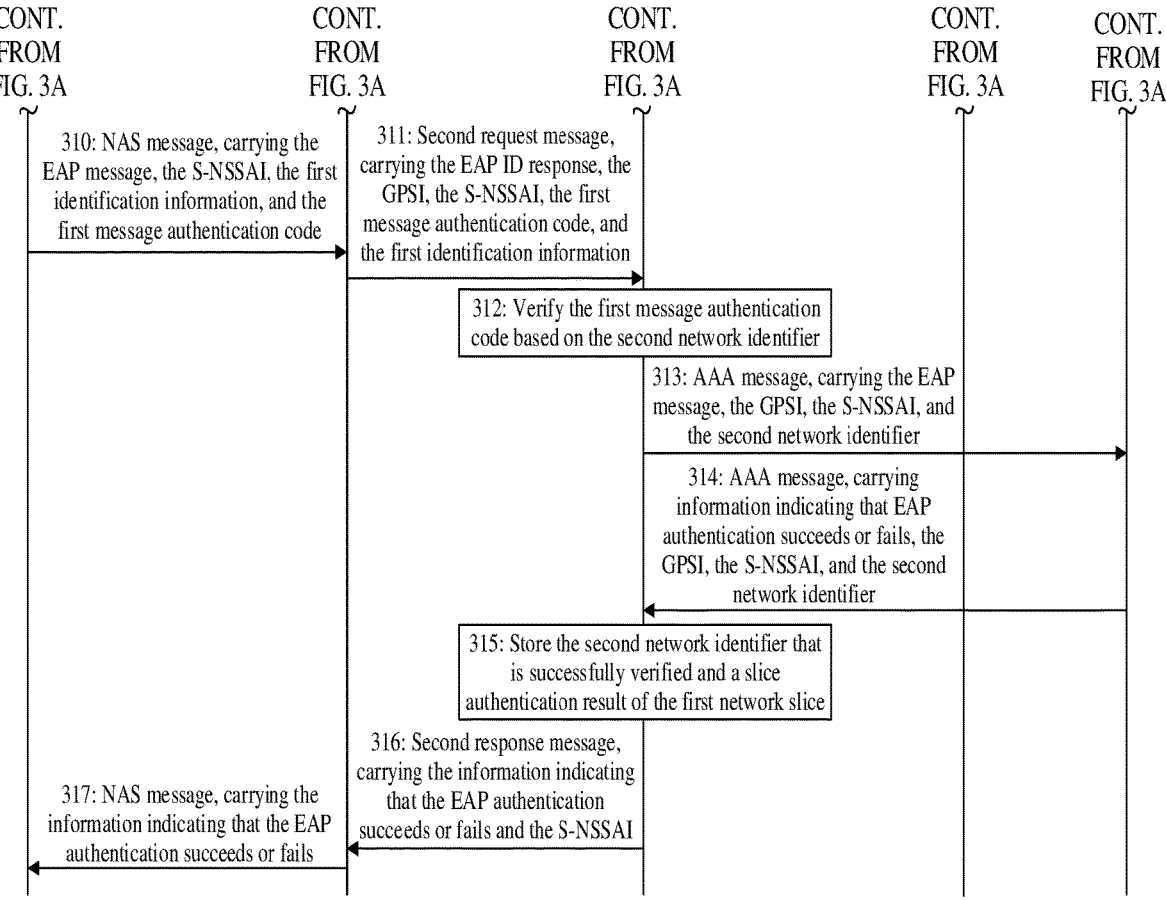

In the embodiment shown in FIG. 3A and FIG. 3B, an example in which the slice service verification function entity is the NAASSF entity is used to describe verification performed by the NAASSF entity on the first message authentication code in the slice authentication process of the first network slice of the terminal device. Optionally, the AUSF entity or the another NF may alternatively verify the first message authentication code in the slice authentication process of the first network slice of the terminal device. This is not specifically limited in this application.

Figure 4:
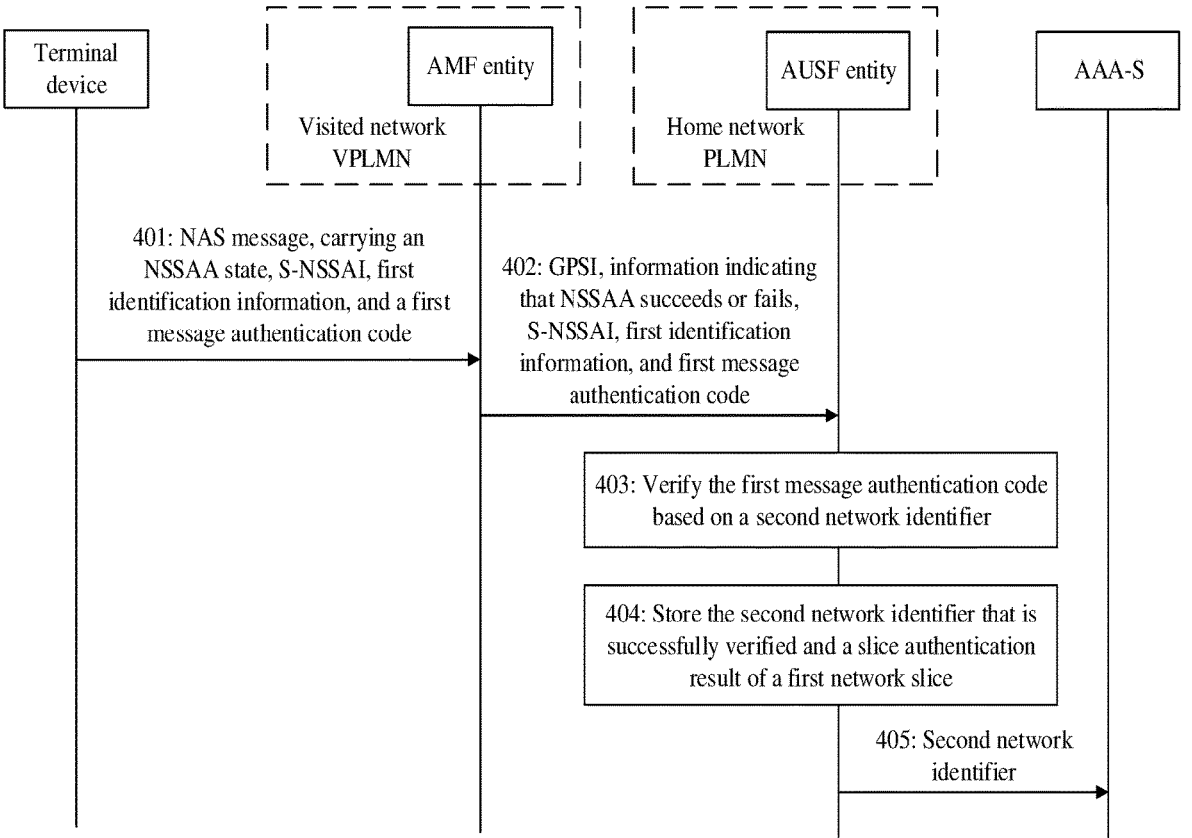
FIG. 4 is a schematic diagram of another embodiment of a slice service verification method according to embodiments of this application.

In the embodiment shown in FIG. 4, an example in which the slice service verification function entity is the AUSF entity is used to describe a verification process performed by the AUSF entity on the first message authentication code after the slice authentication of the first network slice of the terminal device is completed. Optionally, the NSSAAF entity or the another NF may alternatively verify the first message authentication code after the slice authentication of the first network slice of the terminal device is completed. This is not specifically limited in this application.

FIG. 3A and FIG. 3B are a schematic diagram of another embodiment of a slice service verification method according to embodiments of this application. In FIG. 3A and FIG. 3B, the slice service verification method includes the following steps.

301: An AMF entity determines, based on slice subscription information of a terminal device and a slice identifier of a first network slice, to perform slice authentication on the first network slice.

The AMF entity obtains the slice subscription information of the terminal device from a UDM. Then, the AMF entity determines, based on the slice identifier of the first network slice and an authentication state that is of the first network slice and that is stored in the AMF entity, whether the slice authentication needs to be performed on the first network slice of the terminal device. If the slice authentication needs to be performed, the AMF entity performs step 302. If the slice authentication does not need to be performed, the AMF entity sends, to the terminal device, a message for allowing access to the first network slice.

It should be noted that when the slice subscription information of the terminal device indicates that the first network slice is not subscribed to, the AMF entity sends, to the terminal device, a message for rejecting access to the first network slice.

302: The AMF entity sends a NAS message to the terminal device, where the NAS message carries an EAP ID request (request) for the slice authentication and an identifier S-NSSAI of the first network slice. Correspondingly, the terminal device receives the NAS message.

EAP is developed by the international standards organization, namely, the Internet Engineering Task Force (internet engineering task force, IETF). The EAP ID request may be carried in a non-access stratum (non-access stratum, NAS) message in a 3GPP network. The identifier S-NSSAI of the first network slice may indicate that the EAP ID request is a slice authentication request for the first network slice. Alternatively, the EAP ID request and the identifier S-NSSAI of the first network slice may be carried in another type of message (a non-NAS message). A carrying message is not limited in this application.

303: The terminal device sends a NAS message to the AMF entity, where the NAS message carries an EAP ID response, the identifier S-NSSAI of the first network slice, a first message authentication code, and first identification information.

The first identification information is identification information corresponding to a first network identifier. For content of the first identification information, refer to the related descriptions in step 201 in the embodiment shown in FIG. 2A. Optionally, the NAS message may not include the first identification information. Alternatively, the EAP ID response, the identifier S-NSSAI of the first network slice, the first message authentication code, and the first identification information may be carried in another type of message (a non-NAS message). A carrying message is not limited in this application.

The first message authentication code is obtained by performing integrity protection on the first network identifier. For a specific generation manner of the first message authentication code, refer to step 201 in the embodiment shown in FIG. 2A. Details are not described herein again.

It may be understood that, for ease of description, an identifier of a network slice below is represented by S-NSSAI. Identification information of UE may be represented by a generic public subscription identifier (generic public subscription identifier, GPSI) or a SUPI. However, this should not be construed as a limitation on embodiments of this application.

304: The AMF entity sends a first request message to an NSSAAF entity, where the first request message carries the EAP ID response (response), the GPSI, the identifier S-NSSAI of the first network slice, the first message authentication code, and the first identification information. Optionally, the first request message does not include the first identification information. The first request message is a slice authentication request message.

305: The NSSAAF entity verifies the first message authentication code based on a second network identifier.

For related descriptions of step 305, refer to the detailed descriptions of step 203 shown in FIG. 2A. It can be learned from step 203 that the NSSAAF entity obtains a related parameter, and generates a second message authentication code; then, the NSSAAF entity matches the first message authentication code with the second message authentication code to obtain a verification result.

If the first message authentication code is the same as the second message authentication code, the NSSAAF entity determines that the verification succeeds, to be specific, it indicates that the second network identifier carried in the received first identification information has not been tampered with. In this way, the NSSAAF entity determines that a network that provides a slice service of the first network slice for the terminal device is the first network. For example, the NSSAAF entity may determine that the slice authentication of the first network slice is initiated by the first network for the terminal device.

Optionally, the first request message further carries an AMF ID. It should be noted that a message sent by the AMF entity to the NSSAAF entity usually includes a token (token) used by the NSSAAF entity to verify that the AMF entity is an authorized AMF entity. The token includes an AMF entity identity, for example, the AMF ID, that can be verified by the NSSAAF entity. It can be learned from a format of the AMF ID that a part of the AMF ID represents a PLMN ID, in other words, the PLMN ID may be obtained from the AMF ID. For example, the first identification information is an SNN. A part of the SNN also represents a PLMN ID. The NSSAAF entity may determine whether the PLMN ID in the AMF ID is consistent with or the same as the PLMN ID in the first identification information SNN. If the PLMN IDs are the same, the NSSAAF entity determines that the AMF entity performs no deception, and further determines trustworthiness of the AMF entity.

306: The NSSAAF entity sends an AAA message to an AAA-S, where the AAA message carries the EAP ID response, the GPSI, the identifier S-NSSAI of the first network slice, and the second network identifier.

If the AAA-S is deployed outside an HPLMN, the NSSAAF entity first sends the AAA message to an AAA-P, and then the AAA-P sends the AAA message to the AAA-S. Alternatively, the EAP ID response, the GPSI, the identifier S-NSSAI of the first network slice, and the second network identifier may be carried in another type of message. A carrying message is not limited in this application.

307: The AAA-S sends an AAA message to the NSSAAF entity, where the AAA message carries an EAP message, the GPSI, the identifier S-NSSAI of the first network slice, and the second network identifier.

Optionally, the GPSI, the identifier S-NSSAI of the first network slice, and the second network identifier are parameters carried in the EAP message. Alternatively, the EAP message, the GPSI, the identifier S-NSSAI of the first network slice, and the second network identifier may be carried in another type of message. A carrying message is not limited in this application.

A specific type of the EAP message is not limited in this application. For example, in different EAP authentication methods, the EAP message may have different names, types, or the like. It may be understood that the descriptions are also applicable to the following.

308: The NSSAAF entity sends a first response message to the AMF entity, where the first response message carries the EAP message, the GPSI, and the S-NSSAI of the first network slice. The first response message is a slice authentication response message.

309: The AMF entity sends a NAS message to the terminal device, where the NAS message carries the EAP message and the identifier S-NSSAI of the first network slice.

Optionally, the identifier S-NSSAI of the first network slice is a parameter carried in the EAP message. Alternatively, the EAP message and the identifier S-NSSAI of the first network slice may be carried in another type of message (a non-NAS message). A carrying message is not limited in this application.

310: The terminal device sends a NAS message to the AMF entity, where the NAS message carries the EAP message, the identifier S-NSSAI of the first network slice, the first identification information, and the first message authentication code.

Step 310 is similar to step 303. For details, refer to the related descriptions in step 303.

This embodiment provides an implementation in which the terminal device sends the identifier S-NSSAI of the first network slice and the first message authentication code to the AMF entity for a plurality of times in a slice authentication process and the NSSAAF entity verifies the first message authentication code each time the first message authentication code is received.

However, during actual application, the terminal device may send the first message authentication code only once or more than once in the slice authentication process. The NSSAAF entity verifies the first message authentication code once, and stores the verification result of the first message authentication code. Therefore, the NSSAAF entity does not need to verify the first message authentication code for a plurality of times. For example, in the embodiment shown in FIG. 3A and FIG. 3B, the terminal device may send the first message authentication code only in step 303, and does not need to send the first message authentication code again in step 310. In this case, after performing step 305, the NSSAAF entity stores the verification result of the first message authentication code.

311: The AMF entity sends a second request message to the NSSAAF entity, where the second request message carries the EAP ID response, the GPSI, the identifier S-NSSAI of the first network slice, the first identification information, and the first message authentication code.

312: The NSSAAF entity verifies the first message authentication code based on the second network identifier.

313: The NSSAAF entity sends an AAA message to the AAA-S, where the AAA message carries the EAP message, the GPSI, the identifier S-NSSAI of the first network slice, and the second network identifier.

Step 311 to step 313 are similar to step 304 to step 306. For details, refer to the related descriptions in step 304 to step 306. The details are not described herein again.

314: The AAA-S sends an AAA message to the NSSAAF entity, where the AAA message carries information indicating that the EAP authentication succeeds or fails, the GPSI, the identifier S-NSSAI of the first network slice, and the second network identifier.

In a possible implementation, this embodiment further includes step 315.

315: The NSSAAF entity stores the second network identifier that is successfully verified and a slice authentication result of the first network slice.

Optionally, the NSSAAF entity further stores the identifier of the first network slice and a terminal identifier of the terminal device.

For example, the NSSAAF entity stores the GPSI of the terminal device, slice information (for example, the S-NSSAI) of the first network slice, information about the first network (a VPLMN) initiating the slice authentication for the terminal device, namely, the second network identifier (for example, an SN ID of the VPLMN) that is successfully verified, and the information indicating that the slice authentication succeeds or fails.

Optionally, the NSSAAF entity stores, to the UDM, the second network identifier that is successfully verified and the slice authentication result of the first network slice. Specifically, the NSSAAF entity forwards, to the UDM, the second network identifier that is successfully verified and the slice authentication result of the first network slice, and the UDM stores the second network identifier that is successfully verified and the slice authentication result of the first network slice.

It should be noted that step 315 merely provides a manner in which the NSSAAF entity stores the second network identifier that is successfully verified. Optionally, the NSSAAF entity may alternatively store a network identifier that fails to be verified, and correspondingly mark the network identifier to indicate that the network identifier fails to be verified.

316: The NSSAAF entity sends a second response message to the AMF entity, where the second response message carries the information indicating that the EAP authentication succeeds or fails and the identifier S-NSSAI of the first network slice.

317: The AMF entity sends a NAS message to the terminal device, where the NAS message carries the information indicating that the EAP authentication succeeds or fails.

In the embodiment shown in FIG. 3A and FIG. 3B, in a possible implementation, the AAA messages sent by the NSSAAF entity to the AAA-S all carry the second network identifier. However, during actual application, the NSSAAF entity may include the second network identifier in only one of the AAA messages sent to the AAA-S. Alternatively, the NSSAAF entity may not include the second network identifier in the AAA message sent to the AAA-S. Because session identifiers (Session IDs) in the EAP messages in step 303 to step 317 are the same, the AAA-S may determine the second network identifier by using the session ID.

It should be noted that, if step 302 and step 303 in the embodiment shown in FIG. 3A and FIG. 3B are optional steps in the EAP authentication process, in other words, some EAP authentication methods do not include step 302 and step 303, the first request message does not carry the first message authentication code in step 304, and the second network identifier or the first message authentication code is not verified in step 305. The terminal device may include the first message authentication code and the identifier S-NSSAI of the first network slice in step 310, so that the NSSAAF entity performs step 312 to verify the first message authentication code.

If the NSSAAF entity does not verify the second network identifier, optionally, the NSSAAF entity may not send the second network identifier to the AAA-S, or the NSSAAF entity may send the second network identifier and first indication information to the AAA-S, where the first indication information indicates that the second network identifier is not verified. For example, as shown in FIG. 3A and FIG. 3B, the NSSAAF entity does not perform step 305, but directly performs step 306. In this case, the AAA message in step 306 may carry the first indication information.

It should be noted that, if step 315 does not need to be performed, the second network identifier may not be carried in step 306 and step 313. In other words, in this embodiment, the NSSAAF entity/an AUSF entity optionally sends the second network identifier to the AAA-S.

In this embodiment of this application, in the slice authentication process of the first network slice of the terminal device, the terminal device sends the first message authentication code, the identifier of the first network slice, and the first identification information to the NSSAAF entity. Then, the NSSAAF entity determines the second network identifier based on the first identification information, and verifies the first message authentication code based on the second network identifier. The NSSAAF entity sends the second network identifier to the AAA-S when the verification succeeds. It can be learned from this that the NSSAAF entity verifies, based on the second network identifier, the first message authentication code sent by the terminal device. When the verification succeeds, the NSSAAF entity may determine that the slice authentication of the first network slice is provided by the first network for the terminal device. Therefore, the foregoing solution can avoid or prevent a behavior that the visited network currently accessed by the terminal device deceives the home network of the terminal device, to improve network security. For example, the slice service verification method in this embodiment of this application can enhance control of the home network on access of the terminal device and use of the network slice by the terminal device, to prevent the visited network from deceiving the home network in the slice authentication process and/or a use process of the network slice.

FIG. 4 is a schematic diagram of another embodiment of a slice service verification method according to embodiments of this application. In FIG. 4, the slice service verification method includes the following steps.

401: A terminal device sends a NAS message to an AMF entity, where the NAS message carries a network slice-specific authentication and authorization (network slice-specific authentication and authorization, NSSAA) state (successful or failed) of a first network slice, an identifier S-NSSAI of the first network slice, first identification information, and a first message authentication code.

The first identification information is identification information corresponding to a first network identifier. For content of the first identification information, refer to the related descriptions in step 201 in the embodiment shown in FIG. 2A. The first message authentication code is obtained by performing integrity protection on either or both of the first network identifier and the identifier of the first network slice. For a specific generation manner of the first message authentication code, refer to step 201 in the embodiment shown in FIG. 2A. Details are not described herein again.

Alternatively, the NSSAA state (successful or failed) of the first network slice, the identifier S-NSSAI of the first network slice, the first identification information, and the first message authentication code may be carried in another type of message (a non-NAS message). A carrying message is not limited in this application.

In this embodiment, the terminal device sends the first message authentication code to an HPLMN (for example, an AUSF entity or an NSSAAF entity) after slice authentication of the first network slice is completed, and the HPLMN verifies the first message authentication code. The terminal device may perform a slice authentication process of the first network slice based on an existing slice authentication process.

402: The AMF entity sends, to the AUSF entity, a GPSI, the information indicating that slice authentication NSSAA of the first network slice succeeds or fails, the identifier S-NSSAI of the first network slice, the first identification information, and the first message authentication code.

It should be noted that the information about the NSSAA state (successful or failed) may not be included in step 401 and step 402. Optionally, the terminal device may preconfigure or pre-agree that the terminal device performs step 401 only for a network slice whose slice authentication succeeds. In other words, if the slice authentication fails, the terminal device does not perform step 401.

403: The AUSF entity verifies the first message authentication code based on a second network identifier.

Step 402 and step 403 are similar to step 304 and step 305 in the embodiment shown in FIG. 3A and FIG. 3B. For details, refer to the related descriptions in step 304 and step 305. The details are not described herein again.

It should be noted that the AUSF entity in this embodiment has a different function from the NSSAAF entity or the AUSF entity in Embodiment 1. Specifically, the NSSAAF entity or the AUSF entity in Embodiment 1 has a function of assisting in slice authentication. However, the AUSF entity in this embodiment may not have the function of assisting in slice authentication.

In a possible implementation, this embodiment further includes step 404 and step 405.

404: The AUSF entity stores the second network identifier that is successfully verified and a slice authentication result of the first network slice.

Optionally, the AUSF entity further stores the identifier of the first network slice and a terminal identifier of the terminal device.

Step 404 is similar to step 315 in the embodiment shown in FIG. 3A and FIG. 3B. For details, refer to the related descriptions in step 315.

405: The AUSF entity sends the second network identifier to an AAA-S.

In this implementation, when the AAA-S needs to learn of the second network identifier, the AUSF entity may send the second network identifier to the AAA-S. For example, if the AMF entity does not send the second network identifier to the AAA-S in an existing slice authentication process, or the NSSAAF entity sends, to the AAA-S, a second network identifier that is not verified, the AUSF entity may send the second network identifier to the AAA-S.

The embodiment shown in FIG. 4 provides a process in which the terminal device sends the first message authentication code, the identifier of the first network slice, and the first identification information to the AUSF entity after the slice authentication of the first network slice is completed and the AUSF entity verifies the first message authentication code based on the second network identifier. During actual application, the terminal device may simultaneously perform slice authentication on a plurality of network slices. In this case, after the authentication of all the network slices or a plurality of network slices of the terminal device is completed, the terminal device may send, to the AUSF entity, slice authentication results of all the network slices or the plurality of network slices and message authentication codes corresponding to all the network slices or the plurality of network slices together, so that the AUSF entity verifies the message authentication codes, to reduce signaling overheads. Alternatively, when the slice authentication of each network slice is completed (for example, in any step after a slice authentication result is determined but before a slice authentication process ends), the terminal device may send the slice authentication result of the network slice to the AUSF entity. This is not specifically limited in this application.

In this embodiment of this application, the terminal device sends the first message authentication code, the identifier of the first network slice, and the first identification information to the AUSF entity after the slice authentication of the first network slice of the terminal device is completed. The AUSF entity verifies the first message authentication code based on the second network identifier. The AUSF entity sends the second network identifier to the AAA-S when the verification succeeds. It can be learned from this that the AUSF entity verifies, based on the second network identifier, the first message authentication code sent by the terminal device. When the verification succeeds, the AUSF entity may determine that the slice authentication of the first network slice is provided by a first network for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in the slice authentication process and/or a use process of the network slice.

The foregoing describes a case in which the slice service verification function entity performs the slice service verification method provided in embodiments of this application. The slice service verification method in embodiments of this application may alternatively be performed by an authentication server. The following provides descriptions with reference to FIG. 5.

Figure 5:
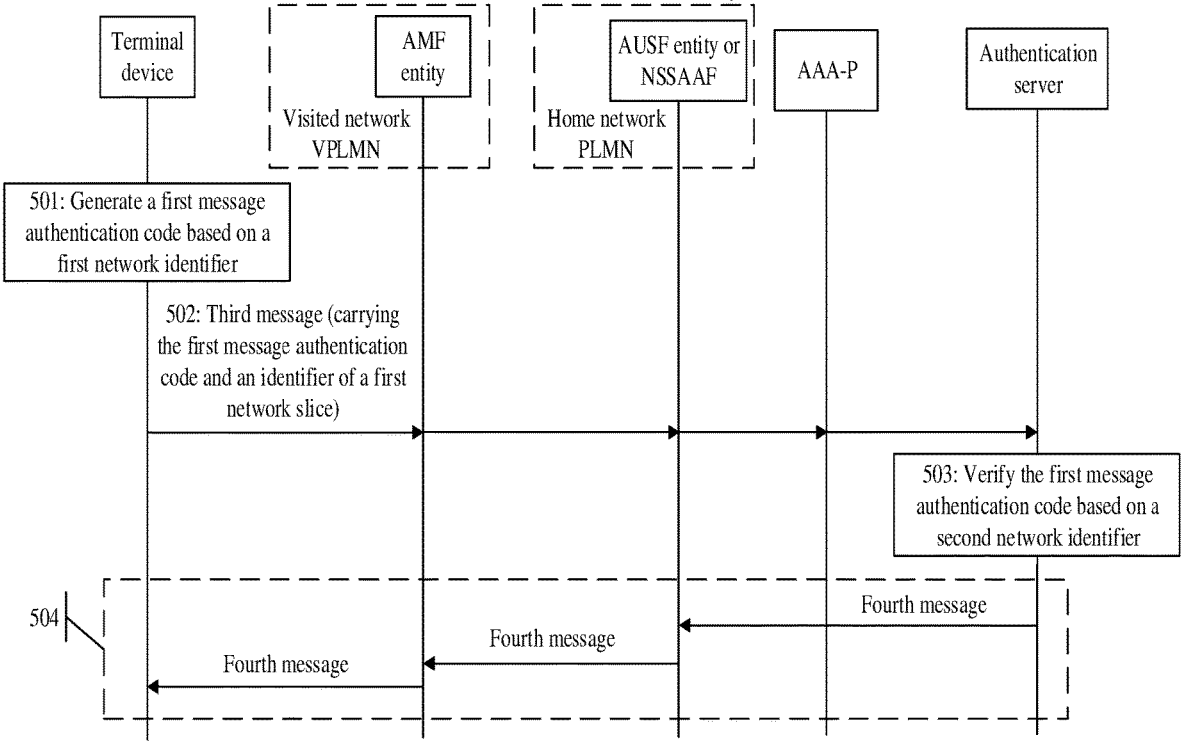
FIG. 5 is a schematic diagram of another embodiment of a slice service verification method according to embodiments of this application.

FIG. 5 is a schematic diagram of another embodiment of a slice service verification method according to embodiments of this application. In FIG. 5, the method includes the following steps.

501: A terminal device generates a first message authentication code based on a first network identifier.

The first network identifier is similar to the first network identifier in step 201 in the embodiment shown in FIG. 2A. For details, refer to the related descriptions of the first network identifier in step 201 in the embodiment shown in FIG. 2A. The details are not described herein again.

The first message authentication code is calculated based on the first network identifier, and is for integrity protection of the first network identifier.

The terminal device generates the first message authentication code to implement the integrity protection of the first network identifier. There are a plurality of manners of generating the first message authentication code. The following separately uses examples for description.

Manner 1: The terminal device generates the first message authentication code based on a first credential and the first network identifier.

The first credential is for slice authentication between the terminal device and an authentication server for a first network slice.

Specifically, the terminal device calculates the first message authentication code by using the first credential and the first network identifier as input parameters of a second preset authentication code generation function.

Optionally, an input parameter of the second preset authentication code generation function further includes at least one of an identifier S-NSSAI of the first network slice, a count of the authentication code, and a random number RAND. The second preset authentication code generation function is a function similar to the first preset authentication code generation function in the embodiment shown in FIG. 2A.

In a possible implementation, the first credential is a credential (EAP credential) used in an EAP authentication procedure included in a slice authentication process of the first network slice. For example, the first message authentication code MAC-I=function (key=the EAP credential, an SN-ID, the S-NSSAI).

Because there are a plurality of EAP authentication methods, and the EAP authentication methods may use different credentials, there may be different manners of generating the first message authentication code. The following enumerates two possible types of first credentials by using examples.

First type of credential: The first credential is a certificate or a public-private key pair. Herein, a public key and a private key that are of the terminal device are used as an example for description.

In this case, that the terminal device generates the first message authentication code based on a first credential and the first network identifier specifically includes step a and step b.

Step a: The terminal device generates a first digest based on a second preset key derivation function and the first network identifier. It should be noted that, the first digest may be generated by using parameters or content such as the identifier of the first network slice and an EAP ID in addition to the first network identifier. Addition of other parameters or content is not limited in this application.

The second preset key derivation function includes a KDF specified in a 3GPP standard, any KDF, any hash (Hash) function, or an HMAC function.

Step b: The terminal device encrypts the first digest by using the private key of the terminal device, to obtain the first message authentication code.

Specifically, the terminal device performs digital signature on the first digest by using the private key of the terminal device. The "digital signature" herein may also be understood as the "function" in the second preset authentication code generation function.

Optionally, the terminal device may alternatively perform digital signature on the first digest by using a public key of the authentication server.

Second type of credential: The first credential is a first password. To be specific, the EAP authentication method is a password-based EAP method.

Specifically, the terminal device calculates the first message authentication code by using the first password and the first network identifier as input parameters of the second preset authentication code generation function. Optionally, an input parameter of the second preset authentication code generation function further includes at least one of the identifier S-NSSAI of the first network slice, a count of the authentication code, and a random number RAND.

For example, if the first credential=password (the first password), the first message authentication code MAC-I=KDF (key=the first password, the SN-ID, the S-NSSAI, and the RAND).

Manner 2: The terminal device generates the first message authentication code based on a first key Kemsk and the first network identifier.

The first key Kemsk is a key generated in an EAP authentication procedure for a first network slice of the terminal device.

Specifically, the terminal device calculates the first message authentication code by using the first key Kemsk and the first network identifier as input parameters of a second preset authentication code generation function.

Optionally, an input parameter of the second preset authentication code generation function further includes at least one of an identifier S-NSSAI of the first network slice, a count of the authentication code, and a random number RAND. The second preset authentication code generation function is a function similar to the first preset authentication code generation function in the embodiment shown in FIG. 2A.

In this embodiment, the first key Kemsk is generated in a slice authentication process of the first network slice or after slice authentication of the first network slice is completed. This is not specifically limited in this application. The terminal device may generate the first message authentication code after the first key Kemsk is generated. Therefore, the first message authentication code may be generated in the slice authentication process of the first network slice or after the slice authentication of the first network slice is completed.

502: The terminal device sends a third message to the authentication server, where the third message carries the first message authentication code and the identifier S-NSSAI of the first network slice.

Content carried in the third message is similar to that carried in the first message in step 202 in the embodiment shown in FIG. 2A. For details, refer to the related descriptions in step 202 in the embodiment shown in FIG. 2A. The details are not described herein again.

The following describes a possible case in which the third message sent by the terminal device carries first identification information and a possible case in which the third message sent by the terminal device does not carry first identification information.

Case 1: The third message sent by the terminal device carries the first identification information.

In this implementation, an AMF entity may also send the first identification information to an NSSAAF entity or an AUSF entity, where the first identification information is carried in the third message sent by the terminal device or carried in another message.

Case 2: The third message sent by the terminal device does not carry the first identification information.

In this implementation, an AMF entity sends the first identification information to an NSSAAF entity or an AUSF entity, where the first identification information is carried in the third message sent by the terminal device or carried in another message.

In a possible implementation of the case 1, when the third message sent by the terminal device carries the first identification information, the authentication server may determine a second network identifier based on the first identification information, and verify the first message authentication code based on the second network identifier.

In another possible implementation of the case 1, when the AMF entity also sends the first identification information to the NSSAAF entity or the AUSF entity, the authentication server determines a second network identifier based on the first identification information sent by the AMF entity instead of the first identification information carried in the third message sent by the terminal device. Then, the authentication server verifies the first message authentication code based on the second network identifier. The AMF entity may send the first identification information by using the third message or another message. For example, the first identification information is carried in a token (token) of the third message.

Optionally, in the case 1, the authentication server may further verify the second network identifier. For example, the authentication server determines whether the second network identifier verified by using the first message authentication code is the same as a network identifier included in the first identification information carried in the third message sent by the terminal device. Alternatively, the authentication server determines whether the second network identifier verified by using the first message authentication code is the same as a network identifier included in the first identification information sent by the AMF entity. The AMF entity may send the first identification information by using the third message or another message. For example, the first identification information is carried in a token (token) of the third message.

503: The authentication server verifies the first message authentication code based on the second network identifier.

The second network identifier is similar to the second network identifier in step 203 in the embodiment shown in FIG. 2A. For details, refer to the related descriptions in step 203 in the embodiment shown in FIG. 2A. The details are not described herein again.

It can be learned with reference to step 501 that, optionally, step 503 includes the following two possible implementations:

Implementation 1: The authentication server verifies the first message authentication code based on the first credential and the second network identifier.

Specifically, if the first message authentication code is generated according to MAC-I=function (key=the EAP credential, the SN-ID, the S-NSSAI) in step 501, the authentication server may calculate a second message authentication code by using the first credential, the second network identifier, and the identifier of the first network slice as input parameters of the second preset authentication code generation function. If the first message authentication code is generated based on the manner of using the public-private key pair in step 501, the authentication server may also correspondingly calculate a second message authentication code. A specific verification process is described below by using an example.

Implementation 2: The authentication server verifies the first message authentication code based on the first key Kemsk and the first network identifier.

Specifically, the authentication server calculates a second message authentication code by using the first key Kemsk and the second network identifier as input parameters of the second preset authentication code generation function.

For specific forms of the input parameters of the second preset authentication code generation function and specific forms of the second preset authentication code generation functions in the implementation 1 and the implementation 2, refer to the related descriptions in step 501. Details are not described herein again.

Based on the implementation 1 and the implementation 2, the following describes the process in which the authentication server verifies the first message authentication code.

1. The implementation 1 is described based on the first type of credential provided in the manner 1 in step 501. In this case, that the authentication server verifies the first message authentication code based on the first credential and the second network identifier specifically includes step 1 to step 3.

Step 1: The authentication server decrypts the first message authentication code by using the public key of the terminal device, to obtain the first digest.

It should be noted that the terminal device sends the public key of the terminal device to the authentication server simultaneously or in advance. For example, in an extensible authentication protocol-transport layer security (extensible authentication protocol-transport layer security, EAP-TLS) process, the terminal device sends, as an EAP message, a certificate carrying the public key of the terminal device to the authentication server.

If the terminal device encrypts the first digest by using the public key of the authentication server, the authentication server decrypts the first message authentication code by using a private key of the authentication server. Similarly, the authentication server may send, as an EAP message, a certificate carrying the public key of the authentication server to the terminal device.

Step 2: The authentication server generates a second digest based on the second preset key derivation function and the second network identifier.

For details of the second preset key derivation function, refer to the related descriptions in step 501. The details are not described herein again.

Step 3: The authentication server matches the first digest with the second digest to obtain a verification result.

Specifically, the authentication server compares the first digest with the second digest. When the first digest is the same as the second digest, the authentication server determines that the verification succeeds. When the first digest is different from the second digest, the authentication server determines that the verification fails.

When the first digest is the same as the second digest, the authentication server may determine that a slice service of the first network slice is provided by a first network corresponding to the second network identifier for the terminal device. When the first digest is different from the second digest, the authentication server may determine that the second network identifier has been tampered with or the key does not match, and determine that a slice service of the first network slice is not provided by a network corresponding to the second network identifier for the terminal device. For descriptions of the slice service of the first network slice, refer to the related descriptions in step 203 in the embodiment shown in FIG. 2A. Details are not described herein again.

2. The implementation 1 is described based on the second type of credential provided in the manner 1 in step 501. In this case, that the authentication server verifies the first message authentication code based on the first credential and the second network identifier specifically includes step 1 and step 2.

Step 1: The authentication server generates the second message authentication code based on the first password and the second network identifier.

Specifically, the authentication server calculates the second message authentication code by using the first password and the second network identifier as input parameters of the second preset authentication code generation function. Optionally, an input parameter of the second preset authentication code generation function further includes at least one of the identifier S-NSSAI of the first network slice, the count of the authentication code, and the random number RAND.

For details of the second preset authentication code generation function, refer to the related descriptions in step 501. The details are not described herein again.

For example, if the first credential=password (the first password), the second message authentication code MAC-I=KDF (key=the first password, the SN-ID, the S-NSSAI, and the RAND).

Step 2: The authentication server matches the first message authentication code with the second message authentication code to obtain a verification result.

Specifically, the authentication server compares the first message authentication code with the second message authentication code. When the first message authentication code is the same as the second message authentication code, the authentication server determines that the verification succeeds; or when the first message authentication code is different from the second message authentication code, the authentication server determines that the verification fails.

When the first message authentication code is the same as the second message authentication code, the authentication server may determine that a slice service of the first network slice is provided by a first network corresponding to the second network identifier for the terminal device. When the first message authentication code is different from the second message authentication code, the authentication server may determine that the second network identifier has been tampered with, and determine that a slice service of the first network slice is not provided by a first network corresponding to the second network identifier for the terminal device. For descriptions of the slice service of the first network slice, refer to the related descriptions in step 203 in the embodiment shown in FIG. 2A. Details are not described herein again.

3. The implementation 2 is described based on the manner 2 in step 501. In this case, that the authentication server verifies the first message authentication code based on the first key Kemsk and the second network identifier specifically includes step 1 and step 2.

Step 1: The authentication server generates the second message authentication code based on the first key Kemsk and the second network identifier.

Specifically, the authentication server calculates the second message authentication code by using the first key Kemsk and the first network identifier as input parameters of the second preset authentication code generation function.

Optionally, an input parameter of the second preset authentication code generation function further includes at least one of the identifier S-NSSAI of the first network slice, the count of the authentication code, and the random number RAND.

For details of the second preset authentication code generation function, refer to the related descriptions in step 501. The details are not described herein again.

The first key Kemsk is generated in the slice authentication process of the first network slice or after the slice authentication of the first network slice is completed. Therefore, when the first message authentication code is generated in the slice authentication process of the first network slice, the authentication server may verify the first message authentication code in the slice authentication process of the first network slice or after the slice authentication of the first network slice is completed. When the first message authentication code is generated after the slice authentication of the first network slice is completed, the authentication server verifies the first message authentication code after the slice authentication of the first network slice is completed.

Step 2: The authentication server matches the first message authentication code with the second message authentication code to obtain a verification result.

Specifically, the authentication server compares the first message authentication code with the second message authentication code. When the first message authentication code is the same as the second message authentication code, the authentication server determines that the verification succeeds; or when the first message authentication code is different from the second message authentication code, the authentication server determines that the verification fails.

When the first message authentication code is the same as the second message authentication code, the authentication server may determine that a slice service of the first network slice is provided by a first network corresponding to the second network identifier for the terminal device. When the first message authentication code is different from the second message authentication code, the authentication server may determine that the second network identifier has been tampered with, and determine that a slice service of the first network slice is not provided by a first network corresponding to the second network identifier for the terminal device. For descriptions of the slice service of the first network slice, refer to the related descriptions in step 203 in the embodiment shown in FIG. 2A. Details are not described herein again.

In a possible implementation, this embodiment further includes step 504.

504: The authentication server sends a fourth message to the terminal device.

Specifically, the authentication server sends the fourth message to the terminal device through the NSSAAF entity and the AMF entity. The fourth message is an authentication request message, an authentication response message, or a verification success message. For example, in a slice authentication process of a first network slice shown in FIG. 6A and FIG. 6B, the second message may be understood as an authentication request message or an authentication response message.

In this embodiment of this application, the terminal device sends the third message to the authentication server, where the third message carries the identifier of the first network slice and the first message authentication code, and the first message authentication code is obtained after the integrity protection is performed on the first network identifier. Then, the authentication server verifies the first message authentication code based on the second network identifier. The authentication server sends the fourth message to the terminal device when the verification succeeds. It can be learned from this that the authentication server verifies, based on the second network identifier, the first message authentication code sent by the terminal device. When the verification succeeds, the authentication server may determine that the slice service of the first network slice is provided by the network corresponding to the second network identifier for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in the slice authentication process and/or a use process of the network slice.

In embodiments of this application, descriptions are merely provided in the embodiment shown in FIG. 5 by using an example in which the terminal device generates the first message authentication code based on the first network identifier. Optionally, this application further provides another embodiment. This implementation is similar to the embodiment shown in FIG. 5, and differences lie in step 501 and step 503.

Step 501 may be replaced with: A terminal device generates a first message authentication code based on an identifier of a first network slice.

The first message authentication code is obtained after integrity protection is performed on the identifier of the first network slice, and the identifier of the first network slice is an ID of the first network slice or first network slice selection assistance information NSSAI.

In different PLMNs, the identifier of the first network slice of the terminal device may vary with a PLMN currently accessed by the terminal device, and a PLMN corresponding to the identifier of the first network slice may be determined based on the variation. Therefore, the terminal device may generate the first message authentication code by using the identifier of the first network slice. In this way, an authentication server verifies the first message authentication code, to determine a network that provides a slice service of the first network slice for the terminal device.

The terminal device generates the first message authentication code in a plurality of manners, and the following uses examples for description.

Manner 1: The terminal device generates the first message authentication code based on a first credential and the identifier of the first network slice.

For related descriptions of the first credential, refer to the related descriptions in step 501 in the embodiment shown in FIG. 5. Details are not described herein again. With reference to two possible types of first credentials, the following describes a process in which the terminal device generates the first message authentication code.

First type of credential: The first credential is a certificate or a public-private key pair. Herein, a public key and a private key that are of the terminal device are used as an example for description. It can be learned from the embodiment shown in FIG. 5 that, that the terminal device generates the first message authentication code based on a first credential and the identifier of the first network slice specifically includes step a.

In this case, step a may be replaced with: The terminal device generates a first digest based on a second preset key derivation function and the identifier of the first network slice. It should be noted that, the first digest may be generated by using parameters or content such as a first network identifier and an EAP ID in addition to the identifier of the first network slice. Addition of other parameters or content is not limited in this application. For related descriptions of the identifier of the first network slice and the second preset key derivation function, refer to the related descriptions in step 501 in the embodiment shown in FIG. 5. Details are not described herein again.

Second type of credential: The first credential is a first password. To be specific, the EAP authentication method is a password-based EAP method.

Specifically, the terminal device calculates the first message authentication code by using the first password and the identifier of the first network slice as input parameters of a second preset authentication code generation function. For related descriptions of the input parameter of the second preset authentication code generation function, refer to the related descriptions in step 501 in the embodiment shown in FIG. 5. Details are not described herein again.

Manner 2: The terminal device generates the first message authentication code based on a first key Kemsk and the identifier of the first network slice.

For related descriptions of the first key Kemsk, refer to the related descriptions in step 501 in the embodiment shown in FIG. 5. Specifically, the terminal device calculates the first message authentication code by using the first key Kemsk and the identifier of the first network slice as input parameters of a second preset authentication code generation function. For related descriptions of the input parameter of the second preset authentication code generation function, refer to the related descriptions in step 501 in the embodiment shown in FIG. 5. Details are not described herein again.

Step 503 may be replaced with: The authentication server verifies the first message authentication code based on a first identifier.

The first identifier is determined by the authentication server based on the identifier of the first network slice sent by the AMF entity, or is determined by the authentication server based on the identifier of the first network slice carried in the third message sent by the terminal device.

Specifically, based on replaced step 501, the authentication server may verify the first message authentication code in the following two possible implementations.

Implementation 1: The authentication server verifies the first message authentication code based on the first credential and the first identifier.

Implementation 2: The authentication server verifies the first message authentication code based on the first key Kemsk and the first identifier.

Based on the implementation 1 and the implementation 2, the following describes a process in which the authentication server verifies the first message authentication code.

1. The implementation 1 is described based on the first type of credential provided in the manner 1 in replaced step 501. In step 503 in the embodiment shown in FIG. 5, based on the first type of credential in the manner 1 in step 501, that the authentication server verifies the first message authentication code based on the first credential and the second network identifier specifically includes step 1 to step 3. In this case, a difference lies in step 2.

Step 2 may be replaced with: The authentication server generates a second digest based on the second preset key derivation function and the first identifier.

For details of the second preset key derivation function, refer to the related descriptions in step 501. The details are not described herein again.

2. The implementation 1 is described based on the second type of credential provided in the manner 1 in replaced step 501. In step 503 in the embodiment shown in FIG. 5, based on the second type of credential in the manner 1 in step 501, that the authentication server verifies the first message authentication code based on the first credential and the second network identifier specifically includes step 1 to step 3. In this case, a difference lies in step 1.

Step 1 may be replaced with: The authentication server generates the second message authentication code based on the first password and the first identifier.

Specifically, the authentication server calculates the second message authentication code by using the first password and the first identifier as input parameters of the second preset authentication code generation function. For related descriptions of the second preset authentication code generation function, refer to the related descriptions in step 503 in the embodiment shown in FIG. 5.

3. The implementation 2 is described based on the manner 2 in replaced step 501. In step 503 in the embodiment shown in FIG. 5, based on the manner 2 in step 501, that the authentication server verifies the first message authentication code based on the first credential and the second network identifier specifically includes step 1 to step 3. In this case, a difference lies in step 1.

Step 1 may be replaced with: The authentication server generates the second message authentication code based on the first key Kemsk and the first identifier.

Specifically, the authentication server calculates the second message authentication code by using the first key Kemsk and the first identifier as input parameters of the second preset authentication code generation function. For related descriptions of the first key Kemsk and the second preset authentication code generation function, refer to the related descriptions in step 503 in the embodiment shown in FIG. 5.

In this embodiment of this application, optionally, the first message carries the first identification information. In this case, the authentication server determines the second network identifier by using the first identification information. This manner is used as an example for description in the following embodiment.

In embodiments of this application, the embodiment shown in FIG. 5 is executed in the slice authentication process of the first network slice or after the slice authentication of the first network slice is completed. The following separately provides descriptions by using an embodiment shown in FIG. 6A and FIG. 6B and an embodiment shown in FIG. 7.

Figure 6A:
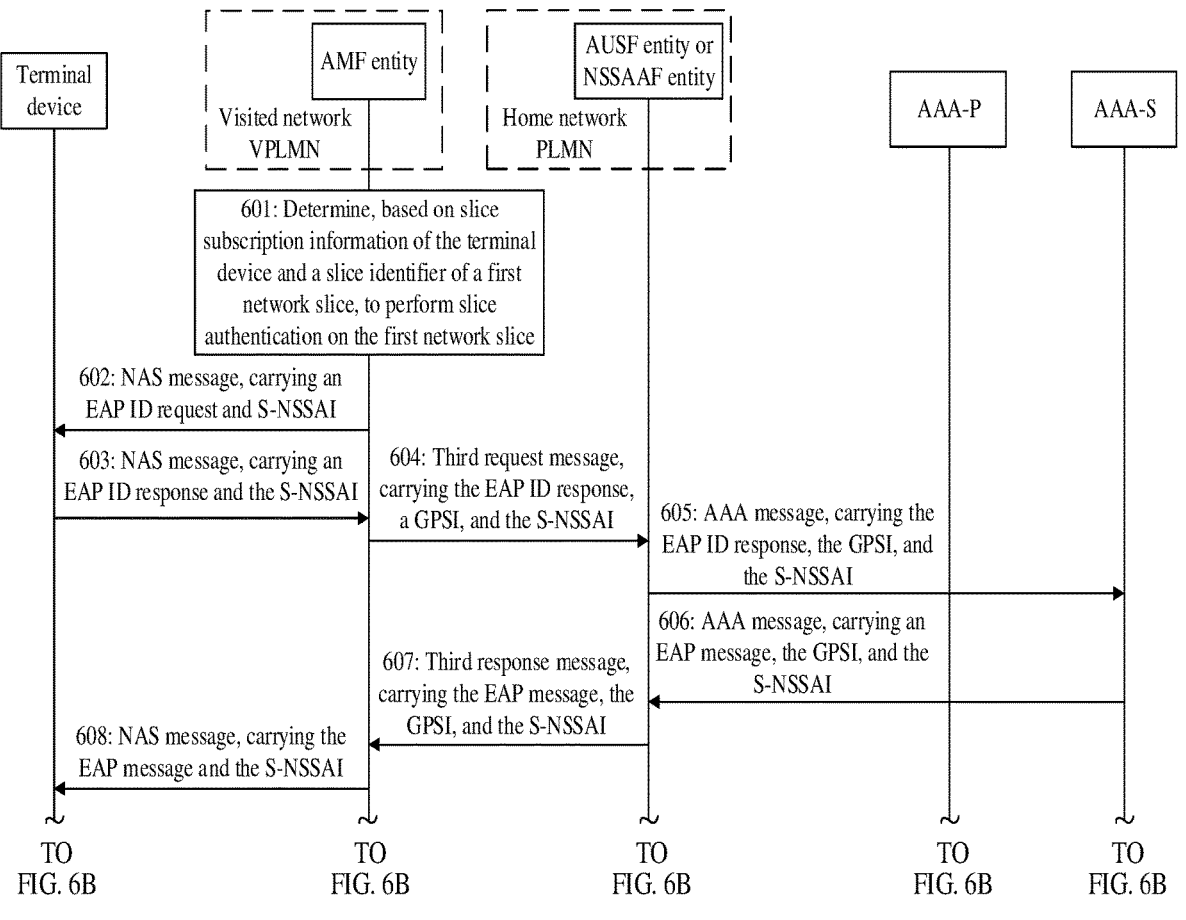

FIG. 6A and FIG. 6B are a schematic diagram of another embodiment of a slice service verification method according to embodiments of this application. In FIG. 6A and FIG. 6B, the method includes the following steps.

601: An AMF entity determines, based on slice subscription information of a terminal device and a slice identifier of a first network slice, to perform slice authentication on the first network slice.

602: The AMF entity sends a NAS message to the terminal device, where the NAS message carries an EAP ID request (request) for the slice authentication and an identifier S-NSSAI of the first network slice. Correspondingly, the terminal device receives the NAS message.

603: The terminal device sends a NAS message to the AMF entity, where the NAS message carries an EAP ID response and the identifier S-NSSAI of the first network slice.

604: The AMF entity sends a third request message to an AUSF entity or an NSSAAF entity, where the third request message carries the EAP ID response, a GPSI, and the identifier S-NSSAI of the first network slice.

605: The AUSF entity or the NSSAAF entity sends an AAA message to an AAA-S, where the AAA message carries the EAP ID response, the GPSI, and the identifier S-NSSAI of the first network slice.

606: The AAA-S sends an AAA message to the AUSF entity or the NSSAAF entity, where the AAA message carries an EAP message, the GPSI, and the identifier S-NSSAI of the first network slice.

607: The AUSF entity or the NSSAAF entity sends a third response message to the AMF entity, where the third response message carries the EAP message, the GPSI, and the identifier S-NSSAI of the first network slice.

608: The AMF entity sends a NAS message to the terminal device, where the NAS message carries the EAP message and the identifier S-NSSAI of the first network slice.

Step 601 to step 604 are similar to step 301 to step 304 in the embodiment shown in FIG. 3A and FIG. 3B, and step 605 to step 608 are similar to step 306 to step 309 in the embodiment shown in FIG. 3A and FIG. 3B. A difference lies in that the first message authentication code and the first identification information are carried in step 301 to step 304 and step 306 to step 309. For details, refer to the related descriptions in step 301 to step 304 and step 306 to step 309 in the embodiment shown in FIG. 3A and FIG. 3B to understand step 601 to step 608.

609: The terminal device sends a NAS message to the AMF entity, where the NAS message carries the EAP message, the identifier S-NSSAI of the first network slice, first identification information, and a first message authentication code.

The first identification information corresponds to a first network identifier. For specific content of the first identification information, refer to the related descriptions in step 202 in the embodiment shown in FIG. 2A. Details are not described herein again.

The first message authentication code is obtained by performing integrity protection on the first network identifier. For a specific generation manner of the first message authentication code, refer to the descriptions in step 501 in the embodiment shown in FIG. 5. Details are not described herein again.

Optionally, the identifier S-NSSAI of the first network slice, the first identification information, and the first message authentication code are parameters carried in the EAP message. Alternatively, the EAP message, the identifier S-NSSAI of the first network slice, the first identification information, and the first message authentication code may be carried in another type of message. A carrying message is not limited in this application.

A specific type of the EAP message is not limited in this application. For example, in different EAP authentication methods, the EAP message may have different names, types, or the like. It may be understood that the descriptions are also applicable to the following.

It may be understood that, for ease of description, an identifier of a network slice below is represented by S-NS-SAI. Identification information of UE may be represented by a publicly used GPSI or SUPI, but this should not be construed as a limitation on embodiments of this application.

610: The AMF entity sends a fourth request message to the AAA-S, where the fourth request message carries the EAP ID response, the GPSI, the identifier S-NSSAI of the first network slice, the first message authentication code, and the first identification information. The fourth request message is a slice authentication request message.

611: The AAA-S verifies the first message authentication code based on a second network identifier.

For related descriptions of step 611, refer to the related descriptions of step 503 shown in FIG. 5.

612: The AAA-S sends an AAA message to the NSSAAF entity or the AUSF entity, where the AAA message carries information indicating that the EAP authentication succeeds or fails, the GPSI, the identifier S-NSSAI of the first network slice, and the second network identifier.

Optionally, the AAA message may further carry a verification result of the first message authentication code.

In a possible implementation, this embodiment further includes step 613.

613: The NSSAAF entity or the AUSF entity stores the second network identifier that is successfully verified and a slice authentication result of the first network slice.

Step 613 is similar to step 315 in the embodiment shown in FIG. 3A and FIG. 3B. For details, refer to the related descriptions in step 315 in the embodiment shown in FIG. 3A and FIG. 3B. The details are not described herein again.

614: The NSSAAF entity or the AUSF entity sends a fourth response message to the AMF entity, where the fourth response message carries the information indicating that the EAP authentication succeeds or fails, the GPSI, and the identifier S-NSSAI of the first network slice.

615: The AMF entity sends a NAS message to the terminal device, where the NAS message carries the information indicating that the EAP authentication succeeds or fails.

The embodiment shown in FIG. 6A and FIG. 6B provides only a solution in which the terminal device sends the first message authentication code to the AAA-S through the AMF entity in step 610. During actual application, the terminal device may alternatively include the first message authentication code in the third request message in step 604, so that the AAA-S verifies the first message authentication code. In a manner in which the terminal device sends the first message authentication code for a plurality of times, the AAA-S may verify the first message authentication code each time the first message authentication code is received; or the AAA-S verifies the first message authentication code when the first message authentication code is received in one of the plurality of times, and the NSSAAF entity stores a verification result of the first message authentication code.

It should be noted that, according to different EAP methods, step 609 and step 610 may be performed for a plurality of times (where content of EAP messages in the plurality of times is different). In a possible implementation, the terminal device includes the first message authentication code and the first identification information in step 609 and step 610 that are performed only in one of the plurality of times. A specific time in which the first message authentication code and the first identification information are carried is not limited in this application.

In this embodiment of this application, in a slice authentication process of the first network slice of the terminal device, the terminal device sends the first message authentication code, the identifier of the first network slice, and the first identification information to the AAA-S. Then, the AAA-S determines the second network identifier based on the first identification information, and verifies the first message authentication code based on the second network identifier. The AAA-S sends the second network identifier to the NSSAAF entity when the verification succeeds. It can be learned from this that the AAA-S verifies, based on the second network identifier, the first message authentication code sent by the terminal device. When the verification succeeds, the AAA-S may determine that the slice authentication of the first network slice is provided by a first network for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in the slice authentication process and/or a use process of the network slice.

Figure 7:
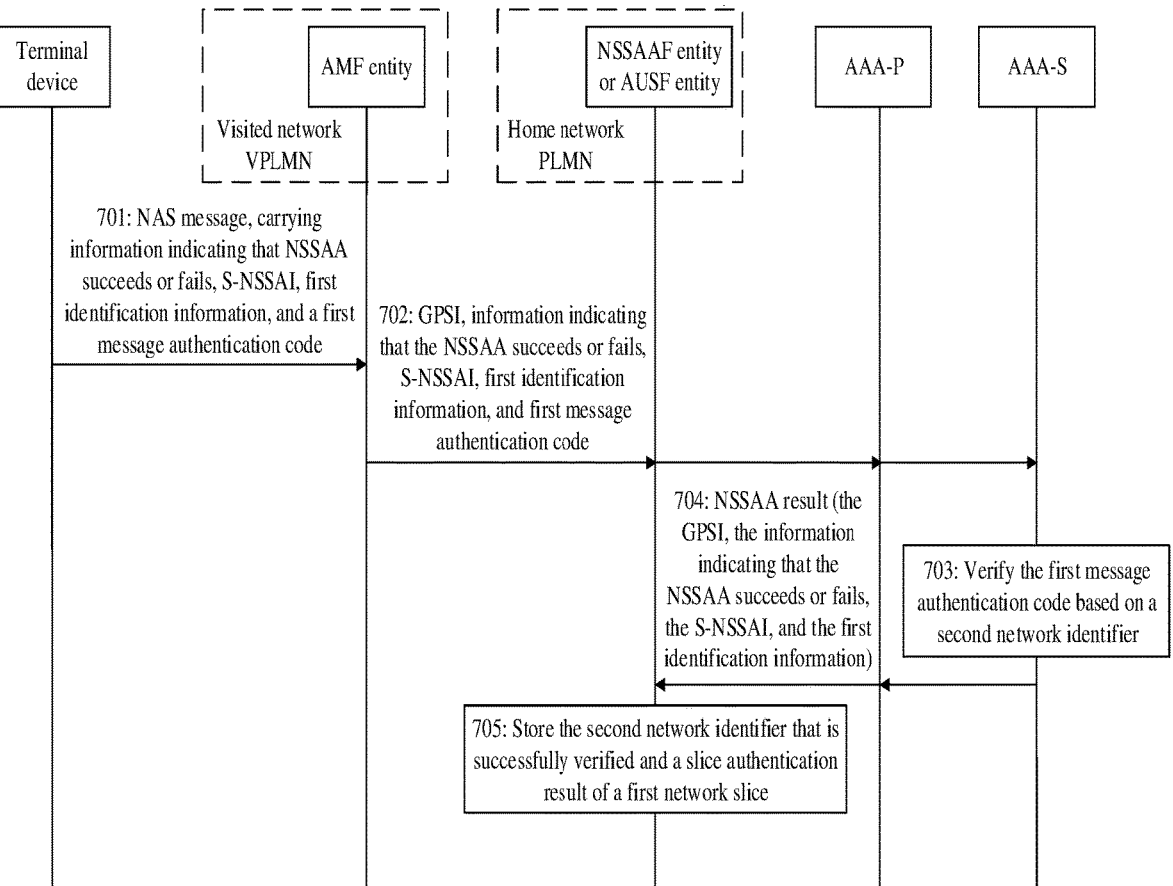
FIG. 7 is a schematic diagram of another embodiment of a slice service verification method according to embodiments of this application.

FIG. 7 is a schematic diagram of another embodiment of a slice service verification method according to embodiments of this application. In FIG. 7, the slice service verification method includes the following steps.

701: A terminal device sends a NAS message to an AMF entity, where the NAS message carries information indicating that NSSAA of a first network slice succeeds or fails, an identifier S-NSSAI of the first network slice, first identification information, and a first message authentication code.

Step 701 is similar to step 401 in the embodiment shown in FIG. 4. For details, refer to the related descriptions in step 401. The details are not described herein again.

702: The AMF entity sends, to an AAA-S, a GPSI, the information indicating that the slice authentication NSSAA of the first network slice succeeds or fails, the identifier S-NSSAI of the first network slice, the first identification information, and the first message authentication code.

For related descriptions of the first identification information and the first message authentication code, refer to the related descriptions in step 501 in the embodiment shown in FIG. 5. Details are not described herein again.

703: The AAA-S verifies the first message authentication code based on a second network identifier.

Step 702 is similar to step 503 in the embodiment shown in FIG. 5. For details, refer to the related descriptions in step 503 in the embodiment shown in FIG. 5. The details are not described herein again.

704: The AAA-S sends a slice authentication NSSAA result (result) of the first network slice to an NSSAAF entity or an AUSF entity, where the NSSAA result carries a GPSI, the information indicating that the slice authentication succeeds or fails, the identifier S-NSSAI of the first network slice, and the first identification information.

In a possible implementation, this embodiment further includes step 705.

Step 705: The NSSAAF entity stores the second network identifier that is successfully verified and the slice authentication result of the first network slice.

Step 705 is similar to step 315 in the embodiment shown in FIG. 3A and FIG. 3B. For details, refer to the related descriptions in step 705 in the embodiment shown in FIG. 3A and FIG. 3B. The details are not described herein again.

In this embodiment of this application, the terminal device sends the first message authentication code, the identifier of the first network slice, and the first identification information to the AAA-S after the slice authentication of the first network slice of the terminal device is completed. The AAA-S verifies the first message authentication code based on the second network identifier. The AAA-S sends the second network identifier to the NSSAAF entity when the verification succeeds. It can be learned from this that the AAA-S verifies, based on the second network identifier, the first message authentication code sent by the terminal device. When the verification succeeds, the AAA-S may determine that the slice authentication of the first network slice is provided by a first network for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in a slice authentication process and/or a use process of the network slice.

In the embodiment shown in FIG. 2A and the embodiments shown in FIG. 3A and FIG. 3B to FIG. 7, in terms of the slice authentication of the network slice, the slice service verification function entity or the authentication server verifies the first message authentication code sent by the terminal device, to determine the first network that provides the slice service of the network slice for the terminal device, where the first message authentication code is obtained by performing integrity protection on the first network identifier. In this way, the home network may determine a specific network that initiates the slice authentication of the first network slice for the terminal device, may determine whether the visited network has initiated the slice authentication of the first network slice for the terminal device, or may determine a serving network that initiates and completes the slice authentication of the first network slice for the terminal device. Therefore, the behavior that the visited network currently accessed by the terminal device deceives the home network of the terminal device can be avoided or prevented, to improve the network security.

An embodiment of this application further provides another slice service verification method. An AMF entity binds a first key $K_{AMF}$ to slice information of a first network slice and/or an identifier of a first network currently accessed by a terminal device, where the first key $K_{AMF}$ is for (data or signaling) transmission between the terminal device and the first network. In this way, a home network of the terminal device can determine, by using the first key $K_{AMF}$ used by the terminal device or an access network device, that a slice service of the first network slice is provided by a visited network for the terminal device. The slice service of the first network slice includes slice data transmission or signaling transmission.

In this embodiment of this application, the slice service is verified by updating the first key $K_{AMF}$. The following uses examples to describe scenarios to which this embodiment of this application is applicable:

Scenario 1: Roaming Scenario in which the Terminal Device Roams to the Visited Network To prevent a potential deception behavior of the visited network, the first network currently accessed by the terminal device is the visited network. When updating the first key $K_{AMF}$, the AMF entity binds the first key $K_{AMF}$ to the slice information of the first network slice and/or the identifier of the first network currently accessed by the terminal device. In this way, the home network can determine, by using the first key $K_{AMF}$, that the visited network provides the slice service of the first network slice for the terminal device. The slice service of the first network slice includes the slice data transmission or the signaling transmission. This avoids a case in which the visited network provides only the slice service of the first network slice for the terminal device but falsely reports that the visited network provides, for the terminal device, a slice service of another network slice with higher performance than the first network slice, to avoid network deception and improve network security.

Scenario 2: Non-Roaming Scenario in which the Network Currently Accessed by the Terminal Device is the Home Network of the Terminal Device When updating the first key $K_{AMF}$, the AMF entity in the home network binds the first key $K_{AMF}$ to the slice information of the first network slice and/or the identifier of the home network currently accessed by the terminal device. In this way, the home network can determine, by using the first key $K_{AMF}$, that the home network provides the slice service of the first network slice for the terminal device. The slice service of the first network slice includes the slice data transmission or the signaling transmission. This avoids an abnormal behavior of the AMF entity in the home network, to improve network security.

In the following embodiment, the scenario 1 is used as an example for description.

Figure 8:
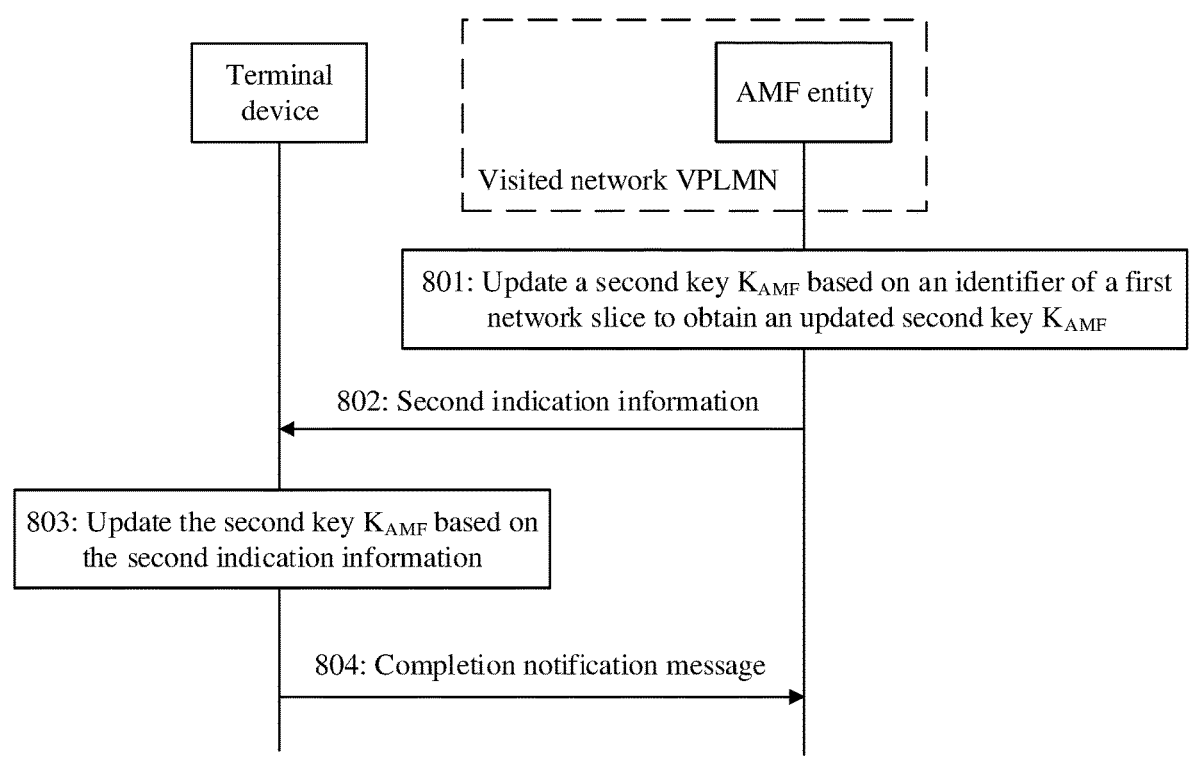
FIG. 8 is a schematic diagram of another embodiment of a slice service verification method according to embodiments of this application.

In an embodiment shown in FIG. 8, a solution to updating the second key $K_{AMF}$ is described by using an AMF entity as an execution body. A main reason for selecting the AMF entity to perform the embodiment shown in FIG. 8 is as follows: After primary authentication of a terminal device, both a control signaling key and a data key that are related to the terminal device are derived based on a first key $K_{AMF}$, and the AMF entity can directly participate in a slice authentication process of the terminal device and obtain a slice authentication result. Therefore, in FIG. 8, updating of the first key $K_{AMF}$ is described by using the AMF entity as the execution body. During actual application, another function entity or network element may alternatively be configured to perform the solution shown in FIG. 8. This is not specifically limited in this application.

Both the control signaling key and the data key that are related to the terminal device are derived based on the first key $K_{AMF}$. Specifically, refer to FIG. 2B. It can be learned from FIG. 2B that $K_{AMF}$ is for generating NAS signaling keys: a NAS integrity key $K_{NASint}$ and a NAS cipher key $K_{NASenc}$; $K_{AMF}$ is further for generating an access stratum (Access Stratum, AS) key $K_{gNB}$ and a non-3GPP network interworking anchor key $K_{N3IWF}$; and the access stratum key $K_{gNB}$ is further for generating access stratum control keys, namely, an access stratum control signaling integrity key $K_{RRCint}$ and an access stratum control signaling cipher key $K_{RRCenc}$, a data plane integrity key $K_{UPint}$, and a data plane cipher key $K_{UPenc}$.

FIG. 8 is a schematic diagram of another embodiment of a slice service verification method according to embodiments of this application. In FIG. 8, the method includes the following steps.

801: An AMF entity updates a second key $K_{AMF}$ based on an identifier of a first network slice to obtain an updated second key $K_{AMF}$.

The first network slice is a network slice that is of a terminal device and whose slice authentication has succeeded. The updated second key $K_{AMF}$ is for transmission (including slice data transmission or signaling transmission) between the terminal device and a first network, and the first network is a network currently accessed by the terminal device.

Specifically, the AMF entity calculates the updated second key $K_{AMF}$ by using the identifier of the first network slice and the non-updated second key $K_{AMF}$ as input parameters of a first preset key derivation function. For example, new $K_{AMF}$=KDF ($K_{AMF}$, NSSAI, . . . ), where the NSSAI is an identifier set of one or more network slices, of the terminal device, whose slice authentication has succeeded. If slice authentication of only a network slice 1 of the terminal device succeeds, the NSSAI=S-NSSAI1. " . . . " indicates that an input parameter of the function KDF may further include another parameter. This is not limited in this application.

In a possible implementation, step 801 specifically includes the following sub-step:

The AMF entity updates the second key $K_{AMF}$ based on the identifier of the first network slice and a third key to obtain the updated second key $K_{AMF}$.

The third key is a key generated or a credential used in an EAP authentication procedure for the first network slice of the terminal device.

When the third key is the key generated in the EAP authentication procedure for the first network slice of the terminal device, the third key may be generated in a slice authentication process of the first network slice or after the slice authentication of the first network slice is completed. This is specifically determined based on setting of the EAP authentication procedure.

Specifically, the slice authentication process of the first network slice of the terminal device includes the EAP authentication procedure, and the AMF entity may calculate the updated second key $K_{AMF}$ by using the third key generated in the EAP authentication procedure and the identifier of the first network slice as input parameters of the first preset key derivation function.

Optionally, an input parameter further includes an identifier of the first network.

The identifier of the first network includes an identity SN-ID of the first network, a PLMN identifier corresponding to the first network, a name SNN of the first network, or a network identifier NID of the first network.

Alternatively, the identifier of the first network may be an identifier of a function entity in the first network, for example, an identifier of an AMF entity, a name of the AMF entity, or a globally unique identifier of the AMF entity, where the AMF entity is a function entity that is in the first network and that initiates the slice authentication of the first network slice for the terminal device.

For example, new $K_{AMF}$=KDF ($K_{AMF}$, Kaaa/Kemsk, the NSSAI, the SN-ID, . . . ). " . . . " indicates that an input parameter of the function KDF may further include another parameter. This is not limited in this application.

In this embodiment, the AMF entity updates the second key $K_{AMF}$ after the slice authentication of the first network slice succeeds, and the terminal device performs the slice authentication process of the first network slice based on an existing slice authentication process or based on the slice authentication process in the embodiment shown in FIG. 3A and FIG. 3B or in the embodiment shown in FIG. 6A and FIG. 6B. This is not specifically limited in this application.

802: The AMF entity sends second indication information to the terminal device.

In a possible implementation, the second indication information carries the identifier of the first network slice, and indicates to update the second key $K_{AMF}$ for the first network slice.

In another possible implementation, the second indication information indicates the terminal device to update the second key $K_{AMF}$ for the network slice that is of the terminal device and whose slice authentication has succeeded.

Optionally, when there are a plurality of updating manners, the second indication information further carries an updating manner of and/or an updating parameter for updating the second key $K_{AMF}$. For example, the updating parameter includes the identifier S-NSSAI of the network slice, an identifier list (namely, the NSSAI) of the network slice, or another related parameter for updating the second key $K_{AMF}$.

It should be noted that, with reference to the schematic diagram of FIG. 3A and FIG. 3B, the second indication information in step 802 may be sent to the terminal device in step 317, and step 801 may be performed after the AMF entity receives, in step 316, the response message indicating that the slice authentication succeeds. This is not specifically limited in this application.

803: The terminal device updates the second key $K_{AMF}$ based on the second indication information.

In a possible implementation, the second indication information carries the identifier of the first network slice, and indicates to update the second key $K_{AMF}$ for the first network slice.

Specifically, the terminal device determines the identifier of the first network slice based on the second indication information, and then updates the second key $K_{AMF}$ based on the identifier of the first network slice to obtain the updated second key $K_{AMF}$. A specific updating process is similar to the process in which the AMF entity updates the second key $K_{AMF}$. For details, refer to the related descriptions in step 801.

In another possible implementation, the second indication information indicates the terminal device to update the second key $K_{AMF}$ for the network slice that is of the terminal device and whose slice authentication has succeeded.

Specifically, the terminal device determines the identifier of the first network slice whose slice authentication has succeeded, and then updates the second key $K_{AMF}$ based on the identifier of the first network slice to obtain the updated second key $K_{AMF}$. A specific updating process is similar to the process in which the AMF entity updates the second key $K_{AMF}$. For details, refer to the related descriptions in step 801.

Optionally, the second indication information further carries the updating manner and/or the updating parameter, and the terminal device updates the second key $K_{AMF}$ based on the updating manner and the updating parameter.

In a possible implementation, this embodiment further includes step 804.

804: The terminal device sends a completion notification message to the AMF entity.

The completion notification message is for notifying the AMF entity that the terminal device completes updating the second key $K_{AMF}$.

Specifically, the terminal device sends the completion notification message to the AMF entity after completing the updating, and starts the updated second key $K_{AMF}$.

It can be learned from the embodiment shown in FIG. 8 that, in terms of data transmission and signaling transmission, in the process of updating the second key $K_{AMF}$ for the slice data transmission or the signaling transmission, the second key $K_{AMF}$ is bound to the first network and the slice information of the network slice. In addition, network slices may have same or different $K_{AMF}$. In this way, the updated second key $K_{AMF}$ is a slice-level key. A home network may determine, by using the updated second key $K_{AMF}$, whether the first network actually provides a slice service of the first network slice for the terminal device, or may determine, by using the updated second key $K_{AMF}$, that the first network provides a slice service of the first network slice for the terminal device. For example, this can avoid a behavior that the first network provides only the slice service of the first network slice for the terminal device but falsely reports that the first network provides, for the terminal device, a slice service of another network slice with higher performance than the first network slice, and charges the home network an addition service fee.

In the embodiment shown in FIG. 8, the solution to updating the second key $K_{AMF}$ is described by using an example in which the updating is performed based on the identifier of the first network slice. Optionally, when the terminal device has a plurality of network slices whose slice authentication succeeds, the NSSAI may be a set of identifiers of the plurality of network slices. For example, if the network slices that are of the terminal device and whose slice authentication has succeeded include a network slice 1 and a network slice 2, NSSAI=S-NSSAI1|S-NSSAI2. "|" represents concatenation of the two identifiers. Alternatively, the AMF entity updates or generates corresponding $K_{AMF}$ for each network slice. For example, $K_{AMF1}$ is a key obtained through updating based on the identifier S-NSSAI1 of the network slice 1, and is used by the terminal device to perform transmission with the first network on the network slice 1. $K_{AMF2}$ is a key obtained through updating based on the identifier S-NSSAI2 of the network slice 2, and is used by the terminal device to perform transmission with the first network on the network slice 2.

In this embodiment of this application, the AMF entity updates the second key $K_{AMF}$ based on the identifier of the first network slice to obtain the updated second key $K_{AMF}$, and then sends the second indication information to the terminal device. The terminal device updates the second key $K_{AMF}$ based on the second indication information, where the updated second key $K_{AMF}$ is for the transmission (including the slice data transmission or the signaling transmission) between the terminal device and the first network, so that the home network can determine, by using the updated first key $K_{AMF}$, that the slice service of the first network slice is provided by the first network for the terminal device, where the slice service of the first network slice includes the slice data transmission or the signaling transmission. Therefore, the foregoing solution can avoid or prevent a behavior that a visited network currently accessed by the terminal device deceives the home network of the terminal device, to improve network security. For example, the slice service verification method in this embodiment of this application can enhance control of the home network on access of the terminal device and use of the network slice by the terminal device, to prevent the visited network from deceiving the home network in a use process of the network slice.

Figure 9:
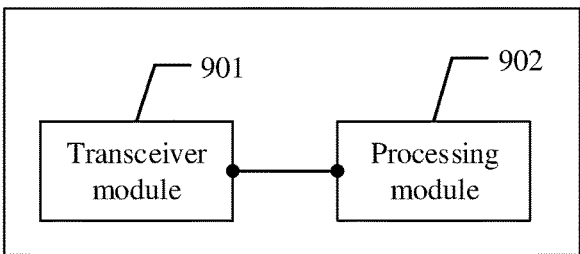
FIG. 9 is a schematic diagram of a structure of a slice service verification function entity according to an embodiment of this application.

The following describes a slice service verification function entity provided in embodiments of this application. FIG. 9 is a schematic diagram of a structure of a slice service verification function entity according to an embodiment of this application. The slice service verification function entity may be configured to perform the steps performed by the slice service verification function entity in the embodiments shown in FIG. 2A, FIG. 3A and FIG. 3B, and FIG. 4. Refer to the related descriptions in the foregoing method embodiments.

The slice service verification function entity includes a transceiver module 901 and a processing module 902.

The transceiver module 901 is configured to receive a first message sent by a terminal device, where the first message carries an identifier of a first network slice and a first message authentication code, and the first message authentication code is calculated based on a first network identifier.

The processing module 902 is configured to verify the first message authentication code based on a second network identifier.

The transceiver module 901 is configured to send the second network identifier to an authentication server when the verification succeeds.

In a possible implementation, the processing module 902 is specifically configured to:

obtain a second integrity key $K_{NSSAAF}$;

generate a second message authentication code based on the second integrity key $K_{NSSAAF}$ and the second network identifier; and match the first message authentication code with the second message authentication code to obtain a verification result.

In another possible implementation, the processing module 902 is specifically configured to:

obtain the second message authentication code based on the second integrity key $K_{NSSAAF}$, the identifier of the first network slice, and the second network identifier.

In another possible implementation, the slice service verification function entity is an NSSAAF entity, and the processing module 902 is specifically configured to:

receive the second integrity key $K_{NSSAAF}$ sent by an AUSF entity, where the second integrity key $K_{NSSAAF}$ is generated by the AUSF entity based on a first intermediate key $K_{AUSF}$.

In another possible implementation, the processing module 902 is specifically configured to:

generate a second message authentication code based on a first intermediate key $K_{AUSF}$ and the second network identifier; and match the first message authentication code with the second message authentication code to obtain a verification result.

In another possible implementation, the first message further includes first identification information, and the second network identifier is determined by the slice service verification function entity based on the first identification information. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network.

The identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

In this embodiment of this application, the transceiver module 901 receives the first message sent by the terminal device, where the first message carries the identifier of the first network slice and the first message authentication code, and the first message authentication code is obtained after integrity protection is performed on the first network identifier. Then, the processing module 902 verifies the first message authentication code based on the second network identifier. The slice service verification function entity sends the second network identifier to the authentication server when the verification succeeds. It can be learned from this that the processing module 902 verifies, based on either or both of the second network identifier and the identifier of the first network slice, the first message authentication code sent by the terminal device. When the verification succeeds, the processing module 902 may determine that a slice service of the first network slice is provided by a network corresponding to the second network identifier for the terminal device. Therefore, the foregoing solution can avoid or prevent a behavior that a visited network currently accessed by the terminal device deceives a home network of the terminal device, to improve network security. For example, the slice service verification method in this embodiment of this application can enhance control of the home network on access of the terminal device and use of the network slice by the terminal device, to prevent the visited network from deceiving the home network in a slice authentication process and/or a use process of the network slice.

Figure 10:
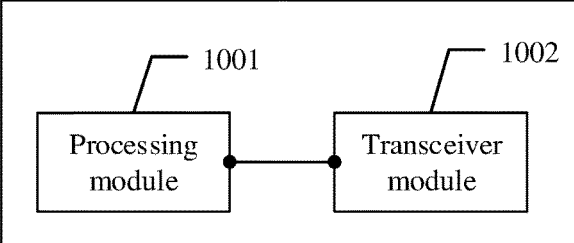
FIG. 10 is a schematic diagram of a structure of a terminal device according to an embodiment of this application.

The following describes a terminal device provided in embodiments of this application. FIG. 10 is a schematic diagram of a structure of a terminal device according to an embodiment of this application. The terminal device may be configured to perform the steps performed by the terminal device in the embodiments shown in FIG. 2A, FIG. 3A and FIG. 3B, and FIG. 4. Refer to the related descriptions in the foregoing method embodiments.

The terminal device includes a processing module 1001 and a transceiver module 1002.

The processing module 1001 is configured to generate a first message authentication code based on a first network identifier.

The transceiver module 1002 is configured to send a first message to a slice service verification function entity, where the first message carries an identifier of a first network slice and the first message authentication code.

In a possible implementation, the processing module 1001 is further configured to:

generate a first intermediate key $K_{AUSF}$ based on a first cipher key CK and a first integrity key IK; and generate a second integrity key $K_{NSSAAF}$ based on the first intermediate key $K_{AUSF}$.

The processing module 1001 is specifically configured to:

generate the first message authentication code based on the first network identifier and the second integrity key $K_{NSSAAF}$.

In another possible implementation, the processing module 1001 is further configured to:

generate a second cipher key CK' and a third integrity key IK' based on a first cipher key CK and a first integrity key IK;

generate a first intermediate key $K_{AUSF}$ based on the second cipher key CK' and the third integrity key IK'; and generate a second integrity key $K_{NSSAAF}$ based on the first intermediate key $K_{AUSF}$.

The processing module 1001 is specifically configured to:

generate the first message authentication code based on the first network identifier and the second integrity key $K_{NSSAAF}$.

In another possible implementation, the processing module 1001 is further configured to:

generate a first intermediate key $K_{AUSF}$ based on a first cipher key CK and a first integrity key IK.

The processing module is specifically configured to:

generate the first message authentication code based on the first network identifier and the first intermediate key $K_{AUSF}$.

In another possible implementation, the processing module 1001 is specifically configured to:

generate the first message authentication code based on the second integrity key $K_{NSSAAF}$, the identifier of the first network slice, and the first network identifier.

In another possible implementation, the first message further includes first identification information, and the first network identifier corresponds to the first identification information. The first identification information is an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network.

The identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

In this embodiment, the processing module 1001 generates the first message authentication code based on the first network identifier. The transceiver module 1002 sends the first message to the slice service verification function entity, where the first message carries the first message authentication code, so that the slice service verification function entity verifies the first message authentication code, to avoid or prevent a behavior that a visited network currently accessed by the terminal device deceives a home network of the terminal device. This improves network security.

Figure 11:
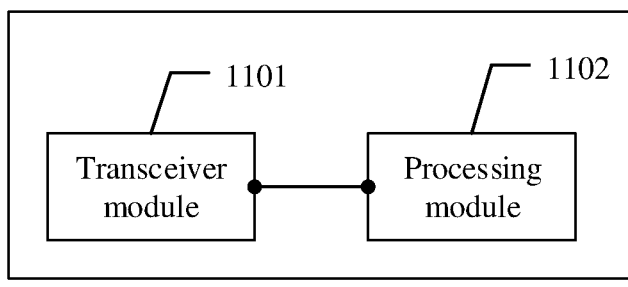
FIG. 11 is a schematic diagram of a structure of an authentication server according to an embodiment of this application.

The following describes an authentication server provided in embodiments of this application. FIG. 11 is a schematic diagram of a structure of an authentication server according to an embodiment of this application. The authentication server may be configured to perform the steps performed by the authentication server in the embodiments shown in FIG. 5, FIG. 6A and FIG. 6B, and FIG. 7. Refer to the related descriptions in the foregoing method embodiments.

The authentication server includes a transceiver module 1101 and a processing module 1102.

The transceiver module 1101 is configured to receive a second message sent by a terminal device, where the second message carries an identifier of a first network slice and a first message authentication code, and the first message authentication code is calculated based on a second network identifier.

The processing module 1102 is configured to verify the first message authentication code based on the second network identifier.

The transceiver module 1101 is configured to: when the verification succeeds, determine that a slice service of the first network slice is provided by a network corresponding to the second network identifier for the terminal device.

In a possible implementation, the processing module 1102 is specifically configured to:

verify the first message authentication code based on a first credential and the second network identifier, where the first credential is for slice authentication between the terminal device and the authentication server for the first network slice.

In another possible implementation, the first credential is a public key and a private key that are of the terminal device, and the processing module 1102 is specifically configured to:

decrypt the first message authentication code based on the public key of the terminal device to obtain a first digest; generate a second digest based on the second network identifier and a first preset key derivation function; and match the first digest with the second digest to obtain a verification result.

In another possible implementation, the first credential is a first password, and the processing module 1102 is specifically configured to:

generate a second message authentication code based on the first password and the second network identifier; and match the first message authentication code with the second message authentication code to obtain a verification result.

In another possible implementation, the processing module 1102 is specifically configured to:

generate a second message authentication code based on a first key Kemsk and the second network identifier; and match the first message authentication code with the second message authentication code to obtain a verification result.

In another possible implementation, the second message further carries first identification information, and the second network identifier is determined by the authentication server based on the first identification information. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network.

The identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

In this embodiment of this application, the transceiver module 1101 receives the second message sent by the terminal device, where the second message carries the identifier of the first network slice and the first message authentication code, and the first message authentication code is calculated based on the second network identifier. Then, the processing module 1102 verifies the first message authentication code based on the second network identifier. When the verification succeeds, the processing module 1102 determines that a slice service of the first network slice is provided by a network corresponding to the second network identifier for the terminal device. In this way, a behavior that a visited network currently accessed by the terminal device deceives a home network of the terminal device can be avoided or prevented, to improve network security.

Figure 12:
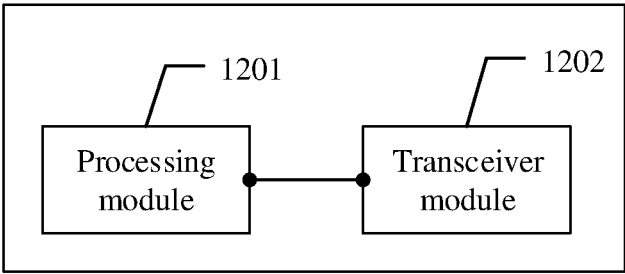
FIG. 12 is another schematic diagram of a structure of a terminal device according to an embodiment of this application.

The following describes a terminal device provided in embodiments of this application. FIG. 12 is a schematic diagram of a structure of a terminal device according to an embodiment of this application. The terminal device may be configured to perform the steps performed by the terminal device in the embodiments shown in FIG. 5, FIG. 6A and FIG. 6B, and FIG. 7. Refer to the related descriptions in the foregoing method embodiments.

The terminal device includes a processing module 1201 and a transceiver module 1202.

The processing module 1201 is configured to generate a first message authentication code based on a first network identifier.

The transceiver module 1202 is configured to send a second message to an authentication server, where the second message carries an identifier of a first network slice and the first message authentication code.

In a possible implementation, the processing module 1201 is specifically configured to:

generate the first message authentication code based on a first credential and the first network identifier, where the first credential is for slice authentication between the terminal device and the authentication server for the first network slice.

In another possible implementation, the first credential is a public key and a private key that are of the terminal device, and the processing module 1201 is specifically configured to:

generate a first digest based on the first network identifier and a first preset key derivation function; and encrypt the first digest based on the private key of the terminal device to obtain the first message authentication code.

In another possible implementation, the first credential is a first password, and the processing module 1201 is specifically configured to:

generate the first message authentication code based on the first password and the first network identifier.

In another possible implementation, the processing module 1201 is specifically configured to:

generate the first message authentication code based on a first key Kemsk and the first network identifier, where the first key Kemsk is a key generated in an EAP authentication procedure for the first network slice of the terminal device.

In another possible implementation, the second message further carries first identification information, and the first identification information corresponds to the first network identifier. The first identification information includes an identifier of a first network or an identifier of a function entity in the first network, and the first network is a network currently accessed by the terminal device.

In another possible implementation, the identifier of the first network includes:

an identity SN-ID of the first network, a PLMN identifier corresponding to the first network, a name SNN of the first network, or a network identifier NID of the first network.

The identifier of the function entity in the first network includes:

an identifier of an AMF entity, a name of the AMF entity, or a globally unique identifier of the AMF entity, where the AMF entity is a function entity that is in the first network and that initiates slice authentication of the first network slice for the terminal device.

In this embodiment of this application, the processing module 1201 generates the first message authentication code based on the first network identifier. The transceiver module 1202 sends the first message to the authentication server, where the first message carries the first message authentication code, so that the authentication server verifies the first message authentication code, to avoid or prevent a behavior that a visited network currently accessed by the terminal device deceives a home network of the terminal device. This improves network security.

Figure 13:
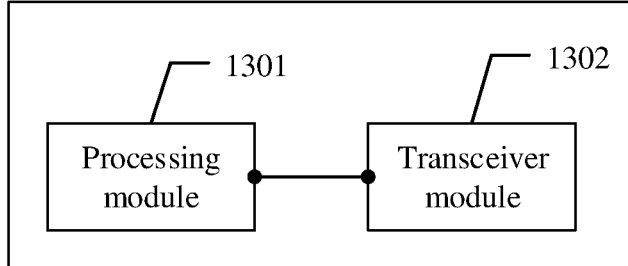
FIG. 13 is a schematic diagram of a structure of an AMF entity according to an embodiment of this application.

The following describes an AMF entity provided in embodiments of this application. FIG. 13 is a schematic diagram of a structure of an AMF entity according to an embodiment of this application. The AMF entity may be configured to perform the steps performed by the AMF entity in the embodiment shown in FIG. 8. Refer to the related descriptions in the foregoing method embodiment.

The AMF entity includes a processing module 1301. Optionally, the AMF entity further includes a transceiver module 1302.

The processing module 1301 is configured to update a second key $K_{AMF}$ based on an identifier of a first network slice to obtain an updated second key $K_{AMF}$, where the first network slice is a network slice that is of a terminal device and whose slice authentication has succeeded, the updated second key $K_{AMF}$ is for transmission between the terminal device and a first network, and the first network is a network currently accessed by the terminal device.

In a possible implementation, the AMF entity further includes the transceiver module 1302.

The transceiver module 1302 is configured to send second indication information to the terminal device, where the second indication information indicates to update the second key $K_{AMF}$ for the first network slice.

In another possible implementation, the processing module 1301 is specifically configured to:

update the second key $K_{AMF}$ based on the identifier of the first network slice and a third key, where the third key is a key generated or a credential used in an EAP authentication procedure for the first network slice of the terminal device.

In another possible implementation, the transceiver module 1302 is further configured to:

receive a completion notification message sent by the terminal device, where the completion notification message is for notifying the AMF entity that the terminal device completes updating the second key $K_{AMF}$.

In this embodiment of this application, the processing module 1301 updates the second key $K_{AMF}$ based on the identifier of the first network slice to obtain the updated second key $K_{AMF}$, where the first network slice is the network slice that is of the terminal device and whose slice authentication has succeeded, the updated second key $K_{AMF}$ is for the transmission (including slice data transmission or signaling transmission) between the terminal device and the first network, and the first network is the network currently accessed by the terminal device. In this way, in a roaming scenario, a home network of the terminal device can determine, by using the updated first key $K_{AMF}$, that a slice service of the first network slice is provided by the first network for the terminal device. The slice service of the first network slice includes the slice data transmission or the signaling transmission. Therefore, the foregoing solution can avoid or prevent a behavior that a visited network currently accessed by the terminal device deceives the home network of the terminal device, to improve network security.

Figure 14:
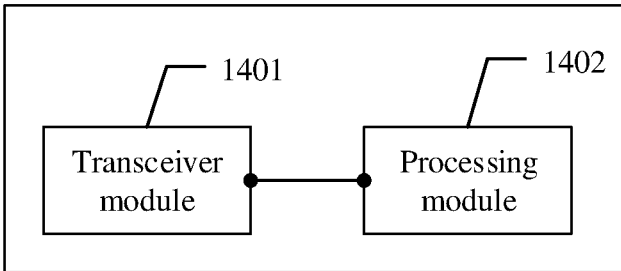
FIG. 14 is another schematic diagram of a structure of a terminal device according to an embodiment of this application.

The following describes a terminal device provided in embodiments of this application. FIG. 14 is a schematic diagram of a structure of a terminal device according to an embodiment of this application. The terminal device may be configured to perform the steps performed by the terminal device in the embodiment shown in FIG. 8. Refer to the related descriptions in the foregoing method embodiment.

The terminal device includes a transceiver module 1401 and a processing module 1402.

The transceiver module 1401 is configured to receive second indication information sent by an AMF entity.

The processing module 1402 is configured to update a second key $K_{AMF}$ based on the second indication information, where an updated second key $K_{AMF}$ is for transmission between the terminal device and a first network, and the first network is a network currently accessed by the terminal device.

In a possible implementation, the processing module 1402 is specifically configured to:

determine, based on the second indication information, to update the second key $K_{AMF}$ for a first network slice; and update the second key $K_{AMF}$ based on an identifier of the first network slice.

In another possible implementation, the processing module 1402 is specifically configured to:

update the second key $K_{AMF}$ based on the identifier of the first network slice and a third key, where the third key is a key generated or a credential used in an EAP authentication procedure for the first network slice of the terminal device.

In another possible implementation, the transceiver module 1401 is further configured to:

send a completion notification message to the AMF entity, where the completion notification message is for notifying the AMF entity that the terminal device completes updating the second key $K_{AMF}$.

Figure 15:
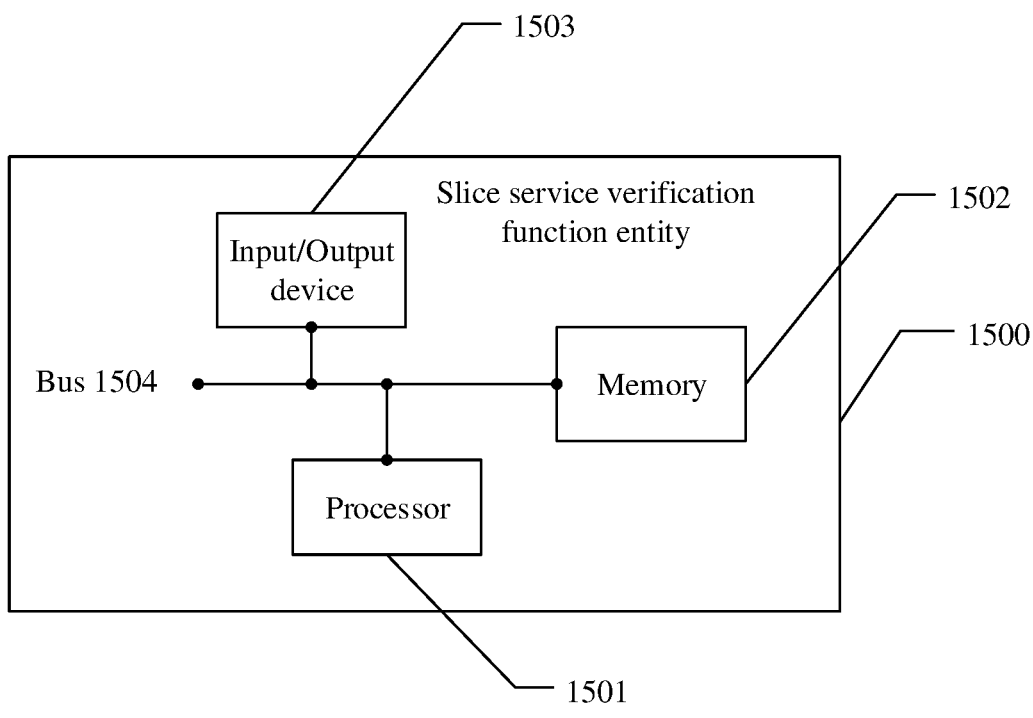
FIG. 15 is another schematic diagram of a structure of a slice service verification function entity according to an embodiment of this application.

This application further provides a slice service verification function entity 1500. FIG. 15 is another schematic diagram of a structure of a slice service verification function entity according to an embodiment of this application. The slice service verification function entity may be configured to perform the steps performed by the slice service verification function entity in the embodiments shown in FIG. 2A, FIG. 3A and FIG. 3B, and FIG. 4. Refer to the related descriptions in the foregoing method embodiments.

The slice service verification function entity 1500 includes a processor 1501, a memory 1502, an input/output device 1503, and a bus 1504.

In a possible implementation, the processor 1501, the memory 1502, and the input/output device 1503 are separately connected to the bus 1504, and the memory stores computer instructions.

The processing module 902 in the foregoing embodiment may be specifically the processor 1501 in this embodiment. Therefore, a specific implementation of the processor 1501 is not described again. The transceiver module 901 in the foregoing embodiment may be specifically the input/output device 1503 in this embodiment.

Figure 16:
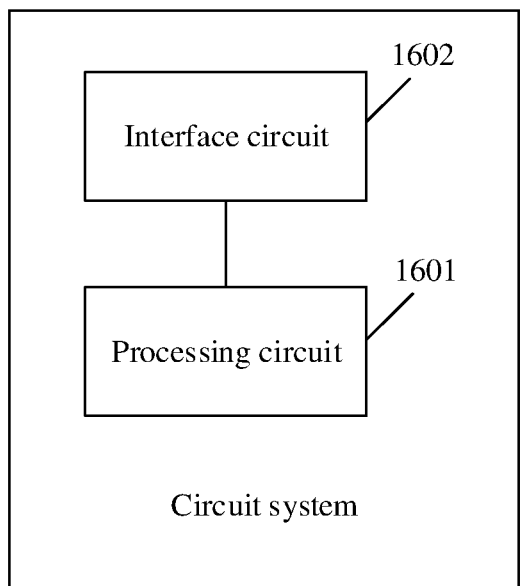
FIG. 16 is a schematic diagram of a structure of a circuit system according to an embodiment of this application.

This application further provides a circuit system. FIG. 16 is a schematic diagram of a structure of a circuit system according to an embodiment of this application. The circuit system may be configured to perform the steps performed by the slice service verification function entity in the embodiments shown in FIG. 2A, FIG. 3A and FIG. 3B, and FIG. 4. Refer to the related descriptions in the foregoing method embodiments.

The circuit system includes a processing circuit 1601 and an interface circuit 1602. The processing circuit 1601 may be a chip, a logic circuit, an integrated circuit, a processing circuit, a system-on-a-chip (system-on-a-chip, SoC), or the like. The interface circuit 1602 may be a communication interface, an input/output interface, or the like.

The processing module 902 in the foregoing embodiment may be specifically the processing circuit 1601 in this embodiment. Therefore, a specific implementation of the processing circuit 1601 is not described again. The transceiver module 901 in the foregoing embodiment may be specifically the interface circuit 1602 in this embodiment. Therefore, a specific implementation of the interface circuit 1602 is not described again.

Figure 17:
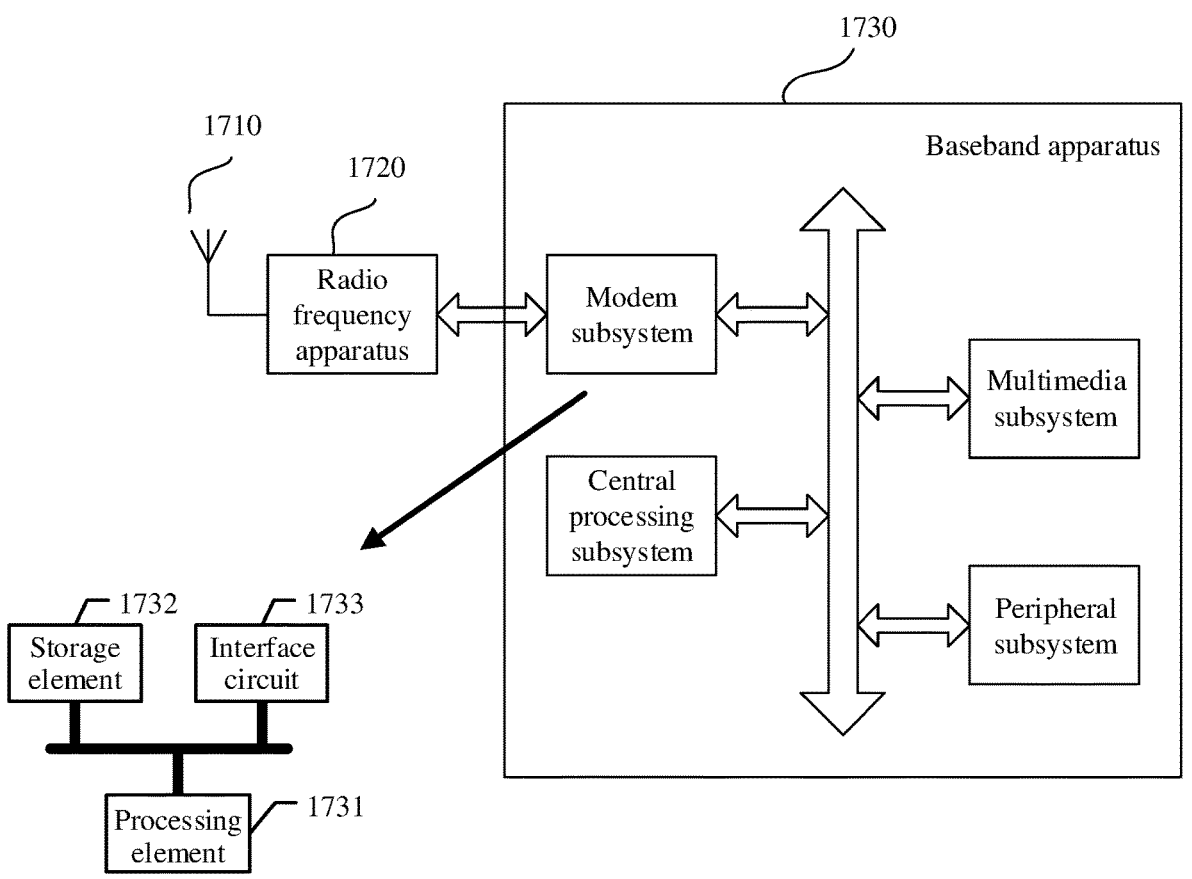
FIG. 17 is another schematic diagram of a structure of a terminal device according to an embodiment of this application.

FIG. 17 is a schematic diagram of a structure of a terminal device according to an embodiment of this application. The terminal device may be the terminal device in the foregoing embodiments and is configured to implement the operations of the terminal device in the foregoing embodiments. As shown in FIG. 17, the terminal device includes an antenna 1710, a radio frequency part 1720, and a signal processing part 1730. The antenna 1710 is connected to the radio frequency part 1720. In a downlink direction, the radio frequency part 1720 receives, through the antenna 1710, information sent by a network device, and sends, to the signal processing part 1730 for processing, the information sent by the network device. In an uplink direction, the signal processing part 1730 processes information of the terminal device, and sends the information to the radio frequency part 1720. The radio frequency part 1720 processes the information of the terminal device, and then sends the processed information to the network device through the antenna 1710.

The signal processing part 1730 may include a modem subsystem, configured to process data at each communication protocol layer. The signal processing part 1730 may further include a central processing subsystem, configured to process an operating system and an application layer of the terminal device. In addition, the signal processing part 1730 may further include other subsystems such as a multimedia subsystem and a peripheral subsystem. The multimedia subsystem is configured to control a camera, a screen display, or the like of the terminal. The peripheral subsystem is configured to connect to another device. The modem subsystem may be a chip that is separately disposed. Optionally, the foregoing apparatus used in the terminal device may be located in the modem subsystem.

The modem subsystem may include one or more processing elements 1731, for example, include one main control CPU and another integrated circuit. In addition, the modem subsystem may further include a storage element 1732 and an interface circuit 1733. The storage element 1732 is configured to store data and a program. However, a program for performing the methods performed by the terminal device in the foregoing methods may not be stored in the storage element 1732, but is stored in a memory outside the modem subsystem, and is loaded by the modem subsystem for use. The interface circuit 1733 is configured to communicate with another subsystem. The foregoing apparatus used in the terminal device may be located in the modem subsystem, and the modem subsystem may be implemented by a chip. The chip includes at least one processing element and an interface circuit. The processing element is configured to perform the steps in any method performed by the terminal device. The interface circuit is configured to communicate with another apparatus. In an implementation, units, in the terminal device, for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, that is, is an on-chip storage element.

In another implementation, a program for performing the methods performed by the terminal device in the foregoing methods may be in a storage element that is on a different chip from the processing unit, that is, is an off-chip storage element. In this case, the processing element invokes or loads the program from the off-chip storage element to an on-chip storage element, to invoke and perform the methods performed by the terminal device in the foregoing method embodiments.

In still another implementation, units, in the terminal device, for implementing the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units, in the terminal device, for implementing the steps in the foregoing methods may be integrated together, and implemented in a form of a system-on-a-chip (system-on-a-chip, SOC). The SOC is configured to implement the foregoing methods. At least one processing element and a storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

It can be learned that the foregoing apparatus used in the terminal device may include at least one processing element and an interface circuit. The at least one processing element is configured to perform any one of the methods performed by the terminal device that are provided in the foregoing method embodiments. The processing element may perform, in a first manner, namely, a manner of invoking the program stored in the storage element, some or all steps performed by the terminal device; may perform, in a second manner, namely, a manner of using a combination of a hardware integrated logic circuit in the processing element and instructions, some or all steps performed by the terminal device; or may certainly perform, by combining the first manner and the second manner, some or all steps performed by the terminal device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two types of the integrated circuits.

The storage element may be one memory, or may be a general term of a plurality of storage elements.

Figure 18:
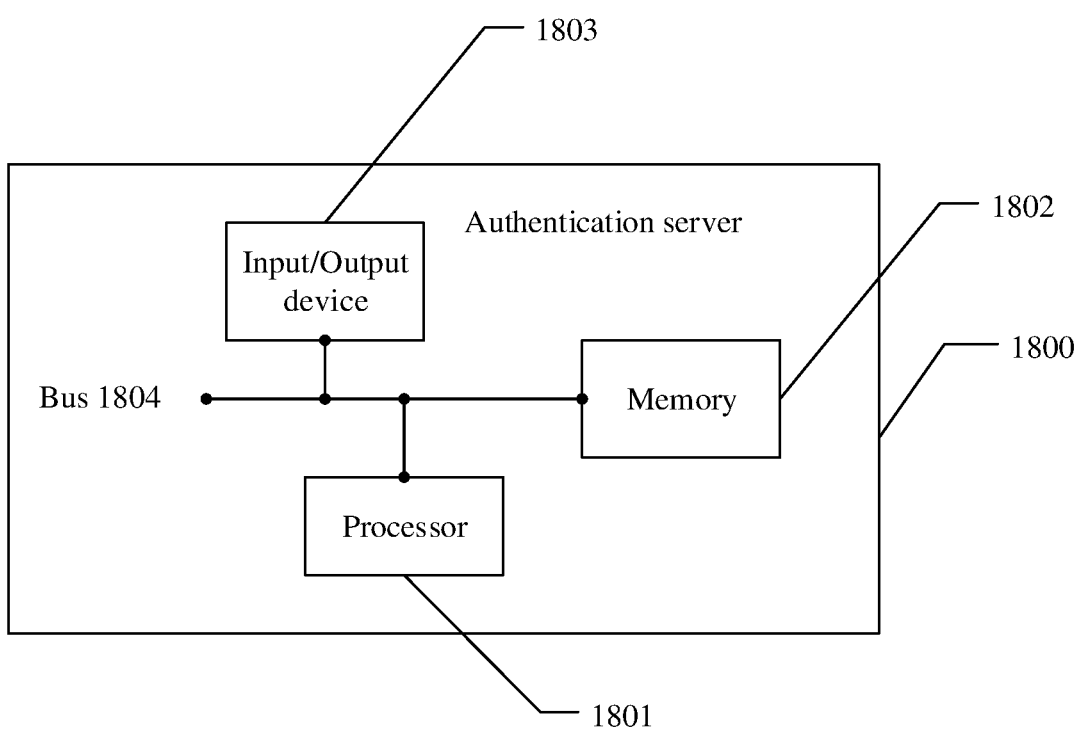
FIG. 18 is another schematic diagram of a structure of an authentication server according to an embodiment of this application.

This application further provides an authentication server 1800. FIG. 18 is another schematic diagram of a structure of an authentication server according to an embodiment of this application. The authentication server may be configured to perform the steps performed by the authentication server in the embodiments shown in FIG. 5, FIG. 6A and FIG. 6B, and FIG. 7. Refer to the related descriptions in the foregoing method embodiments.

The authentication server 1800 includes a processor 1801, a memory 1802, an input/output device 1803, and a bus 1804.

In a possible implementation, the processor 1801, the memory 1802, and the input/output device 1803 are separately connected to the bus 1804, and the memory stores computer instructions.

The processing module 1102 in the foregoing embodiment may be specifically the processor 1801 in this embodiment. Therefore, a specific implementation of the processor 1801 is not described again. The transceiver module 1101 in the foregoing embodiment may be specifically the input/output device 1803 in this embodiment. Therefore, a specific implementation of the input/output device 1803 is not described again.

FIG. 16 is reused. FIG. 16 may alternatively be configured to perform the steps performed by the authentication server in the embodiments shown in FIG. 5, FIG. 6A and FIG. 6B, and FIG. 7. Refer to the related descriptions in the foregoing method embodiments.

The circuit system includes a processing circuit 1601 and an interface circuit 1602. The processing circuit 1601 may be a chip, a logic circuit, an integrated circuit, a processing circuit, a system-on-a-chip (system-on-a-chip, SoC), or the like. The interface circuit 1602 may be a communication interface, an input/output interface, or the like.

The processing module 1102 in the foregoing embodiment may be specifically the processing circuit 1601 in this embodiment. Therefore, a specific implementation of the processing circuit 1601 is not described again. The transceiver module 1101 in the foregoing embodiment may be specifically the interface circuit 1602 in this embodiment. Therefore, a specific implementation of the interface circuit 1602 is not described again.

Figure 19:
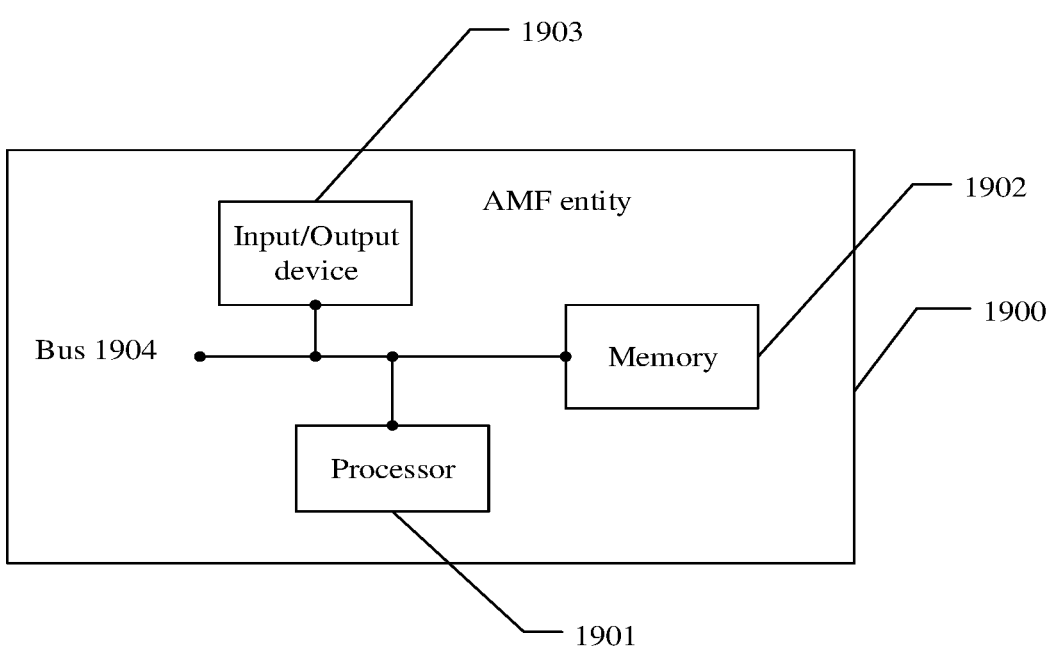
FIG. 19 is another schematic diagram of a structure of an AMF entity according to an embodiment of this application.

This application further provides an AMF entity 1900. FIG. 19 is another schematic diagram of a structure of an AMF entity according to an embodiment of this application. The AMF entity may be configured to perform the steps performed by the AMF entity in the embodiment shown in FIG. 8. Refer to the related descriptions in the foregoing method embodiment.

The AMF entity 1900 includes a processor 1901, a memory 1902, an input/output device 1903, and a bus 1904.

In a possible implementation, the processor 1901, the memory 1902, and the input/output device 1903 are separately connected to the bus 1904, and the memory stores computer instructions.

The processing module 1301 in the foregoing embodiment may be specifically the processor 1901 in this embodiment. Therefore, a specific implementation of the processor 1901 is not described again. The transceiver module 1302 in the foregoing embodiment may be specifically the input/output device 1903 in this embodiment. Therefore, a specific implementation of the input/output device 1903 is not described again.

FIG. 16 is reused. FIG. 16 may alternatively be configured to perform the steps performed by the AMF entity in the embodiment shown in FIG. 8. Refer to the related descriptions in the foregoing method embodiment.

The circuit system includes a processing circuit 1601 and an interface circuit 1602. The processing circuit 1601 may be a chip, a logic circuit, an integrated circuit, a processing circuit, a system-on-a-chip (system-on-a-chip, SoC), or the like. The interface circuit 1602 may be a communication interface, an input/output interface, or the like.

The processing module 1301 in the foregoing embodiment may be specifically the processing circuit 1601 in this embodiment. Therefore, a specific implementation of the processing circuit 1601 is not described again. The transceiver module 1302 in the foregoing embodiment may be specifically the interface circuit 1602 in this embodiment. Therefore, a specific implementation of the interface circuit 1602 is not described again.

Figure 20:
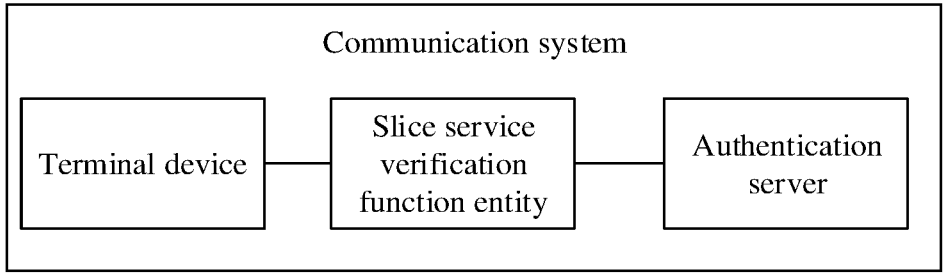
FIG. 20 is a schematic diagram of a communication system according to an embodiment of this application.

Refer to FIG. 20. An embodiment of this application further provides a communication system. The communication system includes a terminal device, a slice service verification function entity, and an authentication server. Specifically, the slice service verification function entity may be the slice service verification function entity shown in FIG. 9, and the terminal device may be the terminal device shown in FIG. 10. The slice service verification function entity shown in FIG. 9 is configured to perform all or some of the steps performed by the slice service verification function entity in the embodiments shown in FIG. 2A, FIG. 3A and FIG. 3B, and FIG. 4. The terminal device shown in FIG. 10 is configured to perform all or some of the steps performed by the terminal device in the embodiments shown in FIG. 2A, FIG. 3A and FIG. 3B, and FIG. 4.

Figure 21:
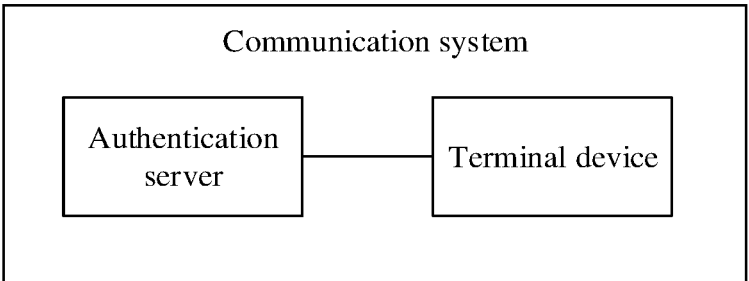
FIG. 21 is another schematic diagram of a communication system according to an embodiment of this application.

Refer to FIG. 21. An embodiment of this application further provides a communication system. The communication system includes an authentication server and a terminal device. Specifically, the authentication server may be the authentication server shown in FIG. 11, and the terminal device may be the terminal device shown in FIG. 12. The authentication server shown in FIG. 11 is configured to perform all or some of the steps performed by the authentication server in the embodiments shown in FIG. 5, FIG. 6A and FIG. 6B, and FIG. 7. The terminal device shown in FIG. 12 is configured to perform all or some of the steps performed by the terminal device in the embodiments shown in FIG. 5, FIG. 6A and FIG. 6B, and FIG. 7.

Figure 22:
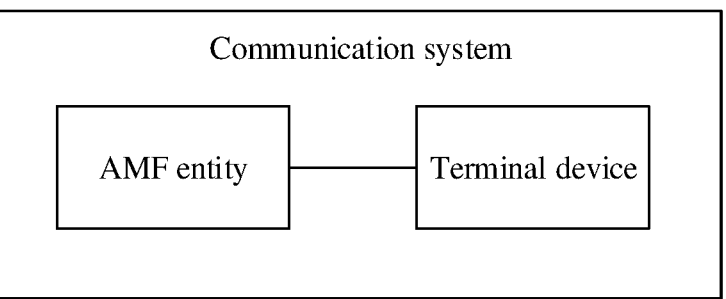
FIG. 22 is another schematic diagram of a communication system according to an embodiment of this application.

Refer to FIG. 22. An embodiment of this application further provides a communication system. The communication system includes an AMF entity and a terminal device. Specifically, the AMF entity may be the AMF entity shown in FIG. 13, and the terminal device may be the terminal device shown in FIG. 14. The authentication server shown in FIG. 13 is configured to perform all or some of the steps performed by the authentication server in the embodiment shown in FIG. 8. The terminal device shown in FIG. 14 is configured to perform all or some of the steps performed by the terminal device in the embodiment shown in FIG. 8.

An embodiment of this application provides a chip, including a memory and a processor. The memory is configured to store a computer program, and the processor is configured to invoke the computer program from the memory and run the computer program, so that the processor performs the slice service verification methods in the embodiments shown in FIG. 2A, FIG. 3A and FIG. 3B, FIG. 4, FIG. 5, FIG. 6A and FIG. 6B, FIG. 7, and FIG. 8.

An embodiment of this application further provides a computer program product including instructions. When the computer program product runs on a computer, the computer is enabled to perform the slice service authentication methods in the embodiments shown in FIG. 2A, FIG. 3A and FIG. 3B, FIG. 4, FIG. 5, FIG. 6A and FIG. 6B, FIG. 7, and FIG. 8.

An embodiment of this application further provides a computer-readable storage medium, including instructions. When the instructions are run on a computer, the computer is enabled to perform the methods in the embodiments shown in FIG. 2A, FIG. 3A and FIG. 3B, FIG. 4, FIG. 5, FIG. 6A and FIG. 6B, FIG. 7, and FIG. 8.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

The invention claimed is:

1. A slice service verification method, comprising:
generating, by an apparatus, a first intermediate key $K_{AUSF}$ based on a first cipher key CK and a first integrity key IK;
generating, by the apparatus, a first message authentication code based on a first network identifier, an identifier of a first network slice, and the first intermediate key $K_{AUSF}$, wherein the first network identifier is an identifier of a first network or an identifier of a function entity in the first network, and the first network is a network accessed by the apparatus; and sending, by the apparatus, a first message to a slice service verification function entity, wherein the first message comprises the identifier of the first network slice and the first message authentication code.

2. The method according to claim 1, wherein the generating, the first message authentication code comprises:

generating, by the apparatus, the first message authentication code based on the first network identifier, the identifier of the first network slice, and a second integrity key $K_{NSSAAF}$; wherein the second integrity key $K_{NSSAAF}$ is generated by the apparatus based on the first intermediate key $K_{AUSF}$.

3. The method according to claim 1, wherein generating the first intermediate key $K_{AUSF}$ based on the first cipher key CK and the first integrity key IK comprises:

generating, by the apparatus, a second cipher key CK' and a third integrity key IK' based on a first cipher key CK and the first integrity key IK;

generating, by the apparatus, the first intermediate key $K_{AUSF}$ based on the second cipher key CK' and the third integrity key IK'; and wherein the generating the first message authentication code comprises:

generating, by the apparatus, the first message authentication code based on the first network identifier, the identifier of the first network slice and a second integrity key $K_{NSSAAF}$; wherein the second integrity key $K_{NSSAAF}$ is generated by the apparatus based on the first intermediate key $K_{AUSF}$.

4. The method according to claim 1, wherein the first message further comprises the first network identifier.

5. The method according to claim 1, wherein the identifier of the first network comprises:

a serving network identity (SN-ID) of the first network, a public land mobile network (PLMN) identifier corresponding to the first network, a serving network name (SNN) of the first network, or a network identifier (NID) of the first network; and the identifier of the function entity in the first network comprises:

an identifier of an access and mobility management function entity, a name of the access and mobility management function entity, or a globally unique identifier of the access and mobility management function entity, wherein the access and mobility management function entity is a function entity that is in the first network and that initiates slice authentication of the first network slice for the apparatus.

6. An apparatus, comprising:

at least one processor; and one or more memories coupled to the at least one processor and storing programming instructions for execution by the at least one processor to cause the apparatus to:

generate a first intermediate key $K_{AUSF}$ based on a first cipher key CK and a first integrity key IK;

generate a first message authentication code based on a first network identifier, an identifier of a first network slice, and the first intermediate key $K_{AUSF}$, wherein the first network identifier is an identifier of a first network or an identifier of a function entity in the first network, and the first network is a network accessed by the apparatus; and send a first message to a slice service verification function entity, wherein the first message comprises the identifier of the first network slice and the first message authentication code.

7. The apparatus according to claim 6, wherein the instructions cause the apparatus to generate the first message authentication code by:

generating the first message authentication code based on the first network identifier, the identifier of the first network slice, and a second integrity key $K_{NSSAAF}$;

wherein the second integrity key $K_{NSSAAF}$ is generated by the apparatus based on the first intermediate key $K_{AUSF}$.

8. The apparatus according to claim 6, wherein the instructions cause the apparatus to generate the first intermediate key $K_{AUSF}$ by:

generating a second cipher key CK' and a third integrity key IK' based on the first cipher key CK and the first integrity key IK;

generating the first intermediate key KAUF based on the second cipher key CK' and the third integrity key IK'; and wherein the instructions cause the apparatus to generate the first message authentication code by:

generating the first message authentication code based on the first network identifier, the identifier of the first network slice, and the second integrity key $K_{NSSAAF}$; wherein the second integrity key $K_{NSSAAF}$ is generated by the apparatus based on the first intermediate key $K_{AUSF}$.

9. The apparatus according to claim 6, wherein the first message further comprises the first network identifier.

10. The apparatus according to claim 9, wherein the identifier of the first network comprises:

a serving network identity (SN-ID) of the first network, a public land mobile network (PLMN) identifier corresponding to the first network, a serving network name (SNN) of the first network, or a network identifier (NID) of the first network; and the identifier of the function entity in the first network comprises:

an identifier of an access and mobility management function entity, a name of the access and mobility management function entity, or a globally unique identifier of the access and mobility management function entity, wherein the access and mobility management function entity is a function entity that is in the first network and that initiates slice authentication of the first network slice for the apparatus.

* * * * *